United States Patent [19]
Sato

[11] Patent Number: 5,329,401
[45] Date of Patent: Jul. 12, 1994

[54] SUPER WIDE ANGLE ZOOM LENS

[75] Inventor: Haruo Sato, Kawasaki, Japan

[73] Assignee: Nikon Corporation, Tokyo, Japan

[21] Appl. No.: 115,668

[22] Filed: Sep. 2, 1993

Related U.S. Application Data

[63] Continuation of Ser. No. 814,424, Dec. 30, 1991, abandoned.

[30] Foreign Application Priority Data

Jan. 11, 1991 [JP] Japan .................................. 3-2284
Jan. 11, 1991 [JP] Japan .................................. 3-2285

[51] Int. Cl.[5] ..................... G02B 15/14; G02B 13/18
[52] U.S. Cl. ................................. 359/686; 359/684;
359/689; 359/691; 359/708
[58] Field of Search ............... 359/684, 686, 689, 708,
359/691

[56] References Cited

U.S. PATENT DOCUMENTS 4,653,873  3/1987  Kawamura ........................ 359/686
5,076,677  12/1991  Sato ............................ 359/691 X

FOREIGN PATENT DOCUMENTS 2-201310  8/1990  Japan .

OTHER PUBLICATIONS

Nakagawa, Jihei, "Lens Design Engineering", pp. 113-123, (with partial translation).

Primary Examiner—Scott J. Sugarman
Attorney, Agent, or Firm—Shapiro and Shapiro

[57] ABSTRACT

A super wide angle zoom lens comprises: a front group having a first lens group including, in the order from the object side, a first lens element having a negative refracting power, a second lens element having a negative refracting power, and a third lens element having a positive refracting power, the front group having a negative refracting power as a whole, at least one surface of the lens elements of the front group being aspherical; and a rear group including, in the order from the object side, a second lens group having a positive refracting power, a third lens group having a negative refracting power and a fourth lens group having a positive refracting power, the rear group having a positive refracting power as a whole. When variable power operation is performed from the wide angle end side to the telephoto end side, lens groups move relatively along the optical axis so that air space between the first lens group and the second lens group reduces, air space between the second lens group and the third lens group increases, and air space between the third lens group and the fourth lens group reduces.

42 Claims, 15 Drawing Sheets

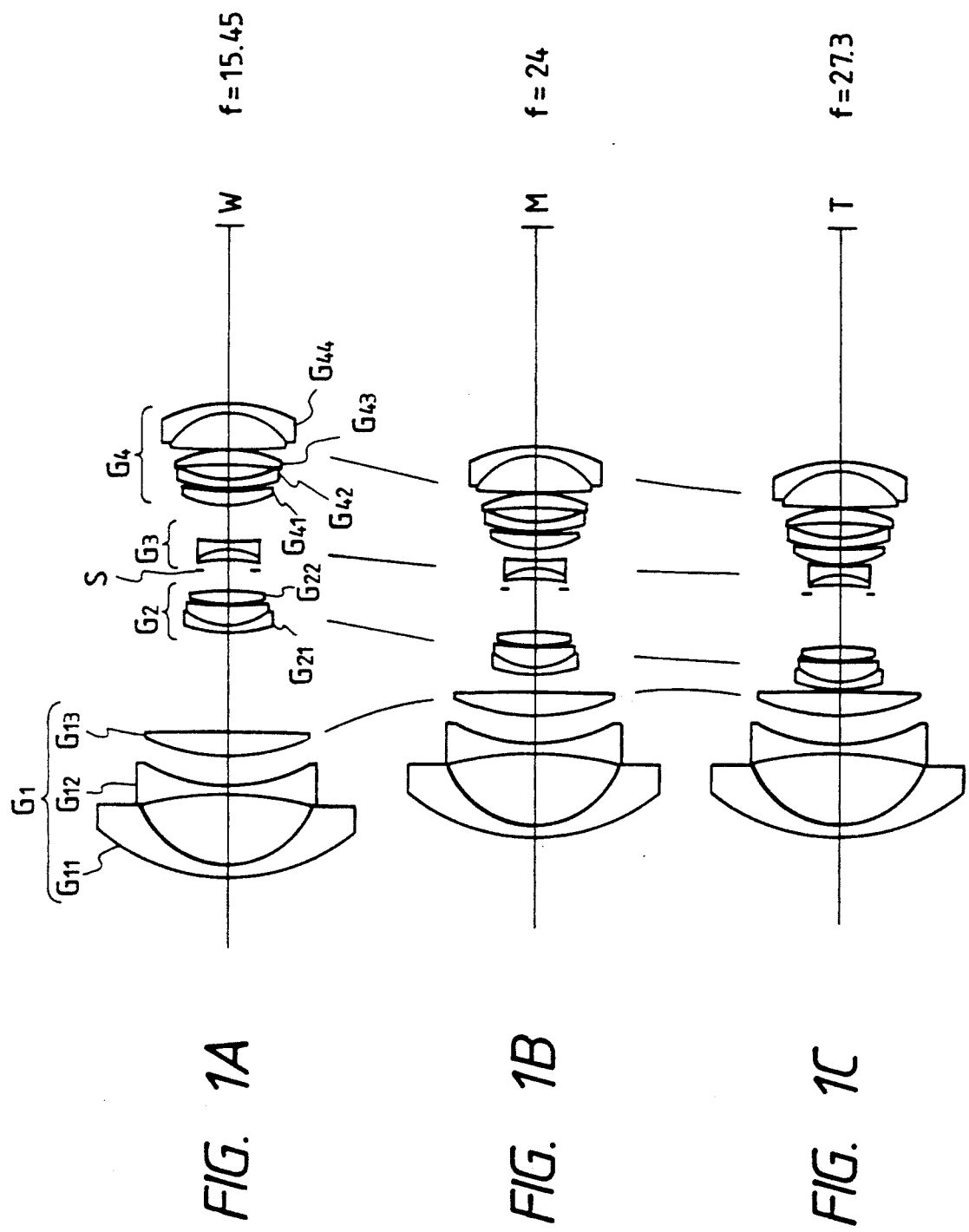

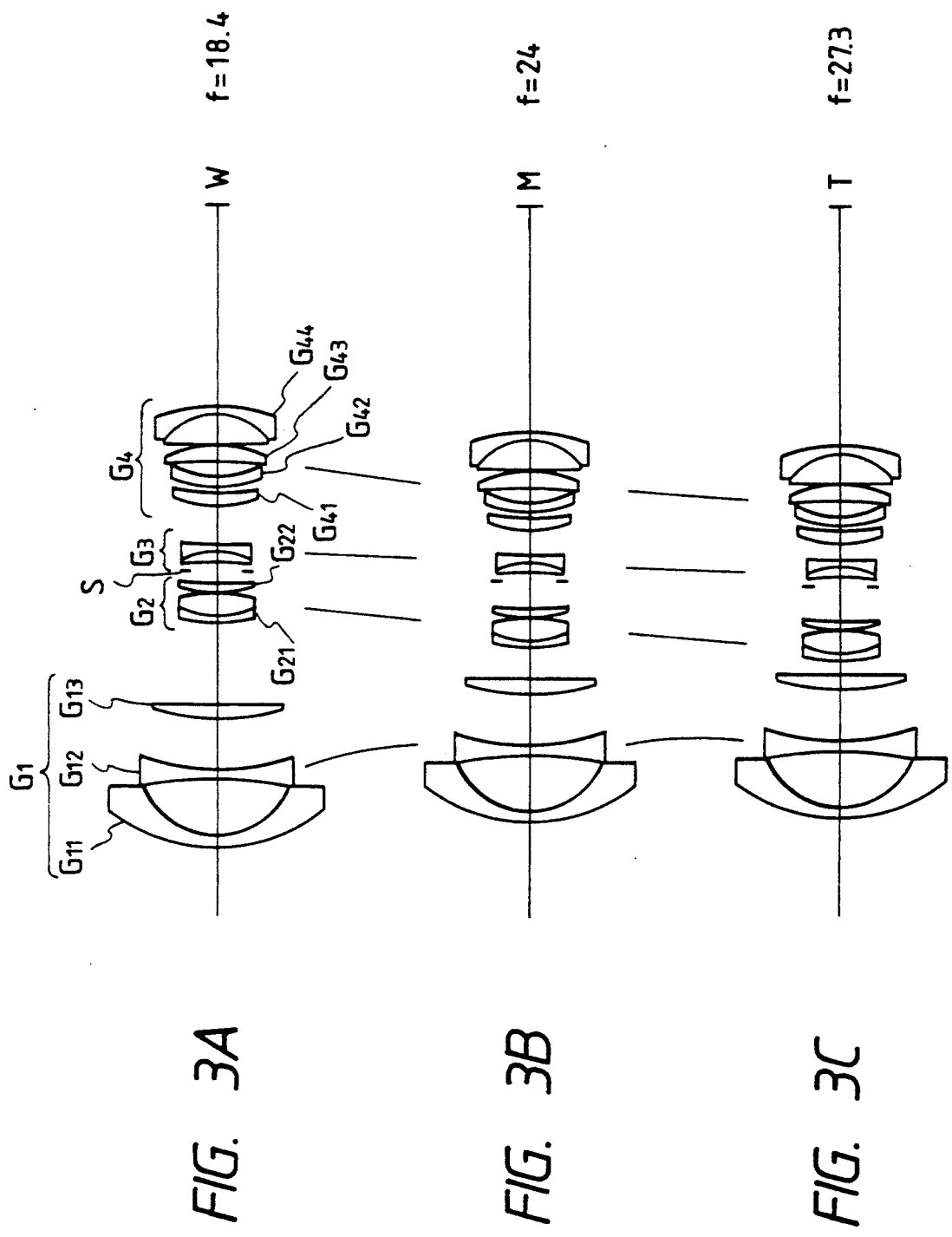

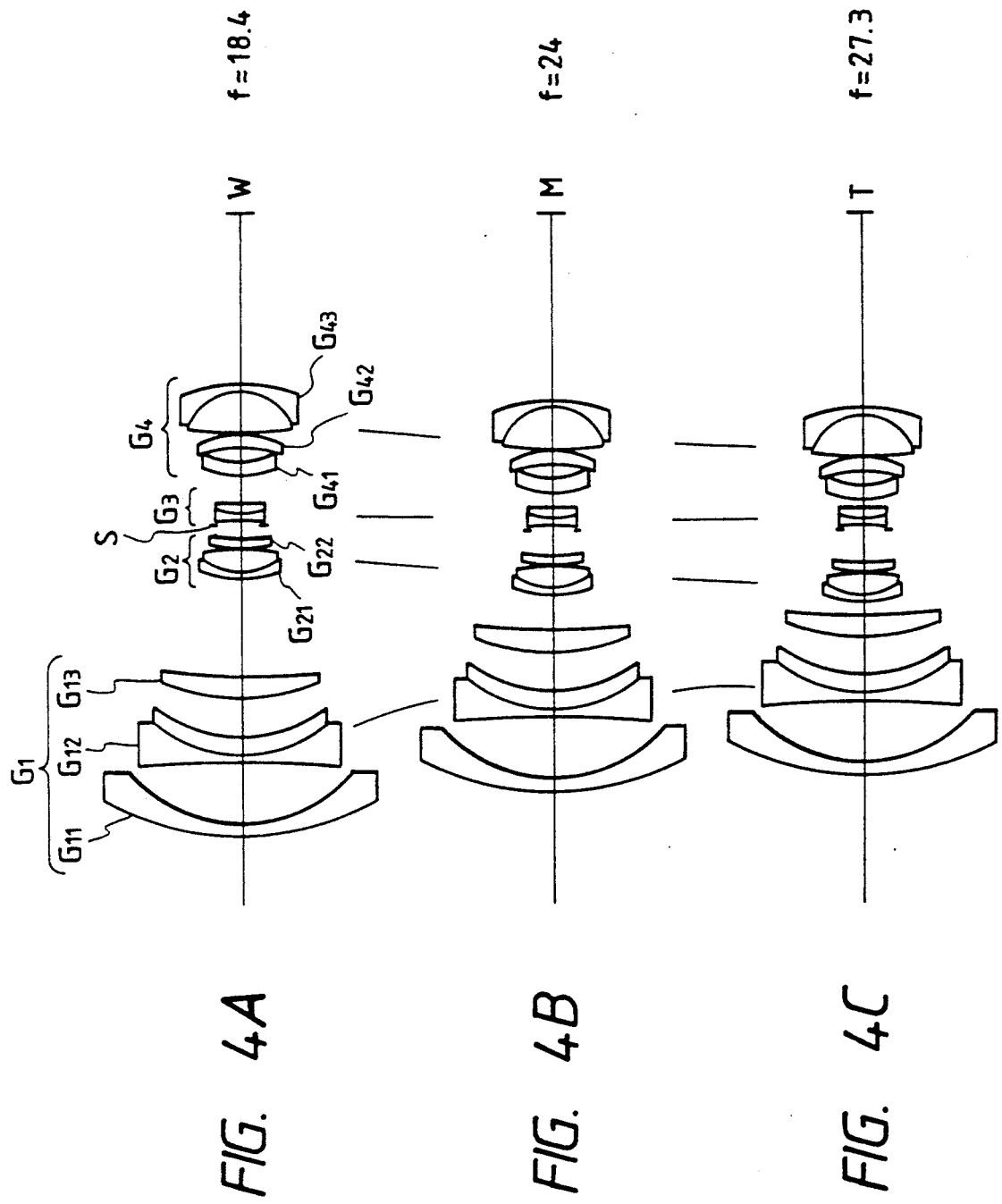

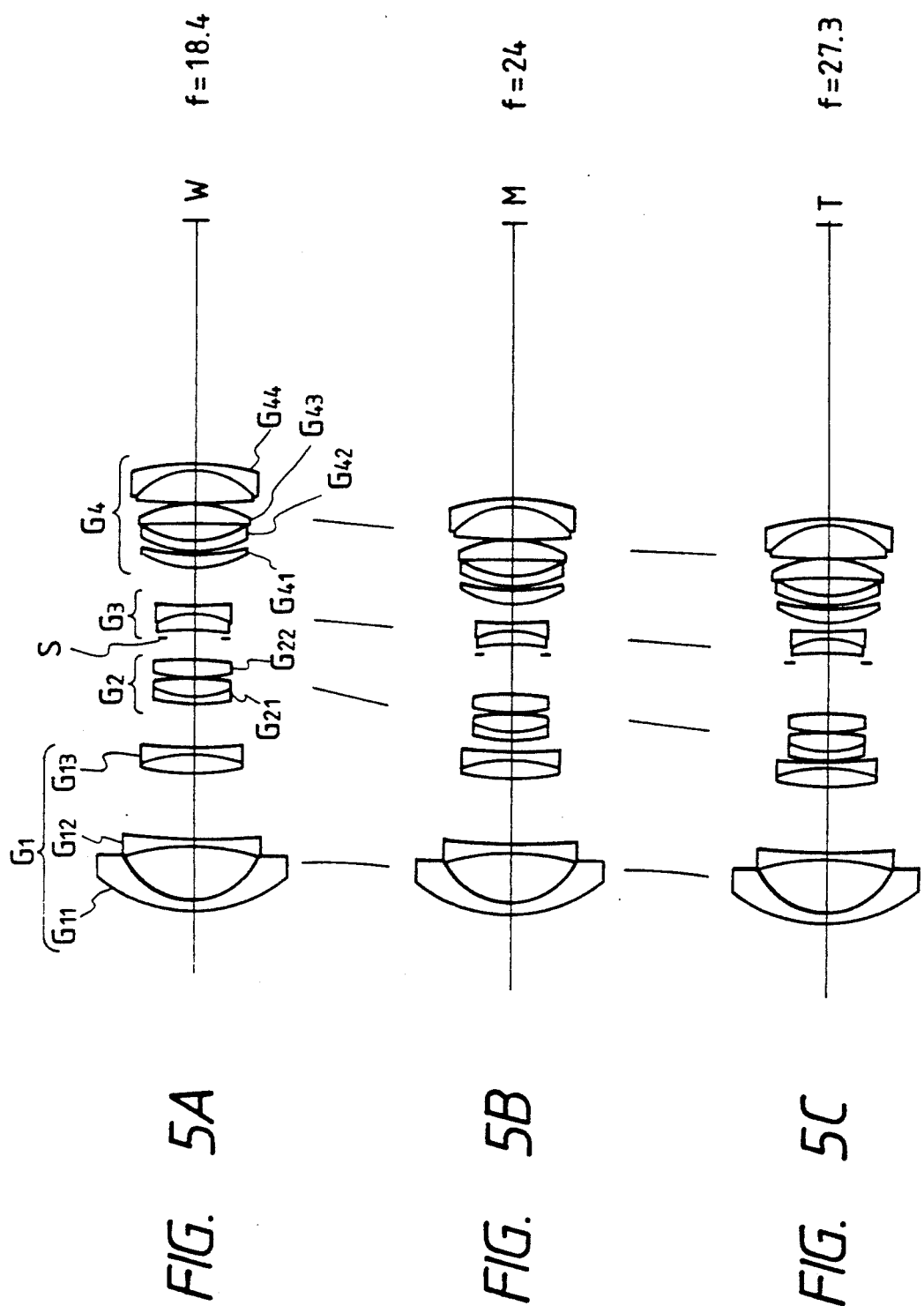

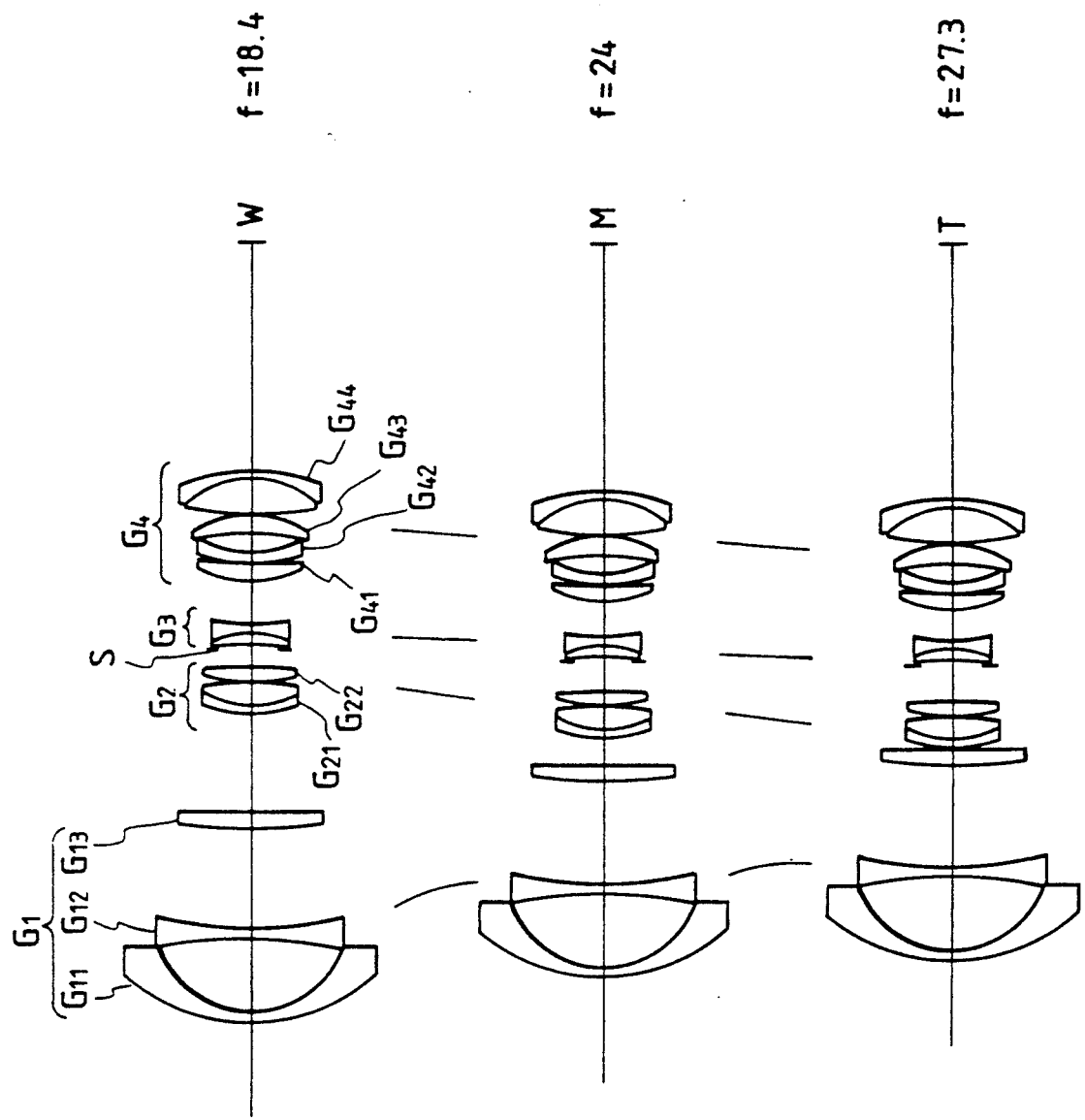

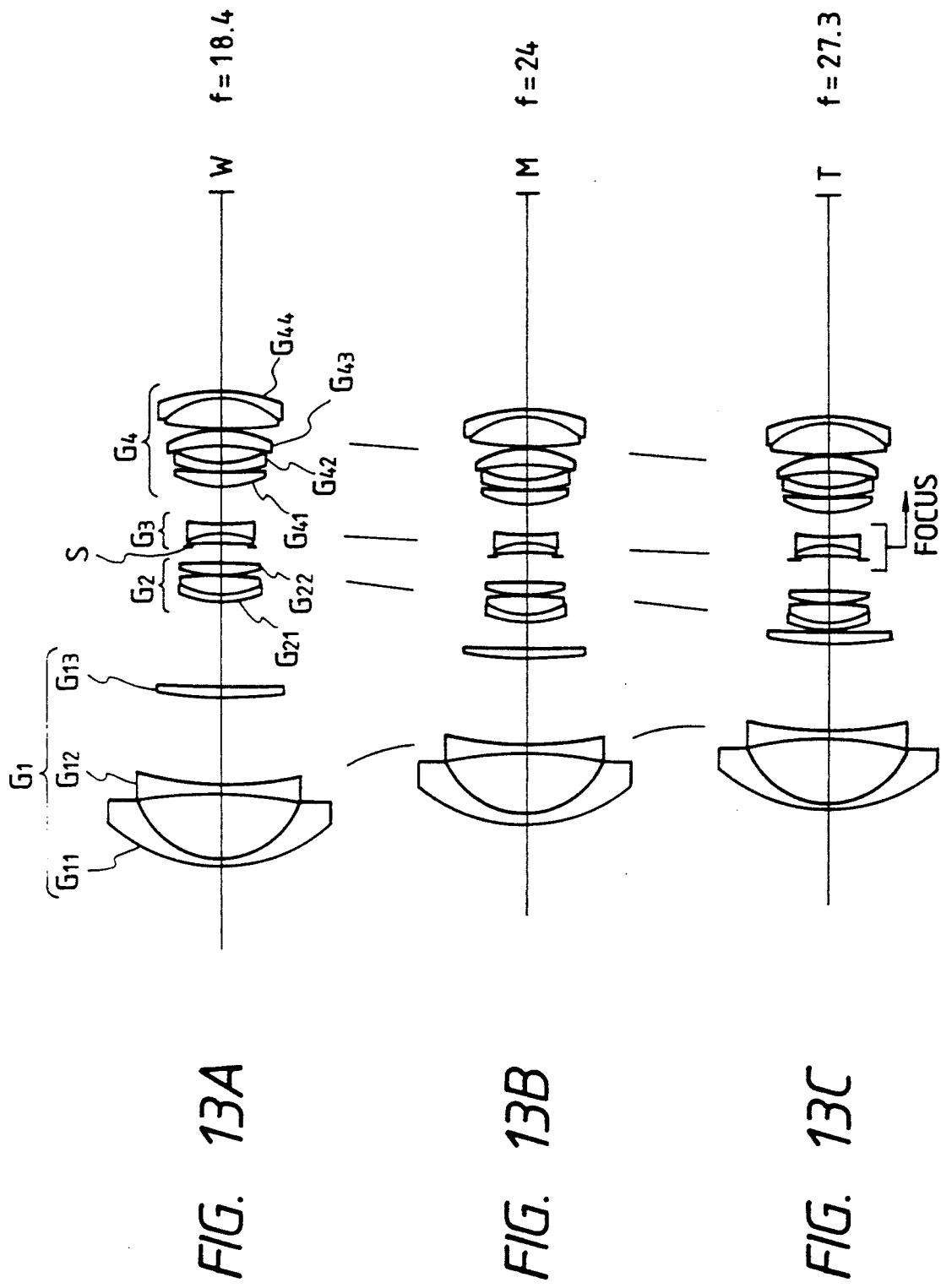

SUPER WIDE ANGLE ZOOM LENS

This is a continuation of application Ser. No. 814,424 filed Dec. 30, 1991, now abandoned.

BACKGROUND OF THE INVENTION

1. Field of the Invention

The present invention relates generally to a zoom lens and, more particularly, to a super wide angle zoom lens having a view angle of 100° or more at the wide angle end and a sufficient back focal distance and suitable for use with a single-lens reflex camera of a Leica 35 mm format, an electronic still camera, a TV camera and the like.

2. Related Background Art

Proposed as a zoom lens having a large view angle were a multiplicity of conventional wide angle zoom lenses of a negative lens forefront type in which a negative lens group is disposed closest to an object, the zoom lens being composed of, e.g., negative/positive/negative/positive type four or more lens groups. However, each of a variety of the disclosed wide angle zoom lenses based on the negative/positive/negative/positive four group construction or having a greater number of lens groups has a view angle of 95° or smaller. A super wide angle zoom lens having a view angle of 100° or larger is not yet proposed. The wide angle zoom lenses based on, e.g., the negative/positive/negative/positive four group construction are, though already known, disclosed in Japanese Patent Laid-Open Application No. 2-201310 and U.S. Pat. No. 4,653,873. The former wide angle zoom lens disclosed in Japanese Patent Laid-Open Application No. 2-201310 has an view angle of approximately 93° at the wide angle end. The wide angle zoom lens disclosed in U.S. Pat. No. 4,653,873 has a view angle of approximately 85° at the wide angle end.

In the zoom lenses shown in Japanese Patent Laid-Open Application No. 2-201310 and U.S. Pat. No. 4,653,873, a first lens group is relatively complicatedly constructed and large in thickness. A positive lens positioned second from the object in the first lens group refracts an oblique ray exhibiting a large view angle greatly in the optical-axis direction. It is therefore quite difficult to make the angle much wider while the construction of the first lens group remains as it is. Supposing that the first lens group is provided with the much wider angle while the construction thereof remains it is, the negative lens closest to the object and the positive lens positioned second from the object in the first lens group augment in size. In addition, the first lens group as a whole increases in terms of thickness. Further, when obtaining a super wide angle zoom lens having a view angle of 100° or greater on the basis of the construction of the first lens group described above, the positive lens disposed send from the object in the first lens group exhibits larger refractive action on the oblique ray with a wider view angle. An incident angle of the oblique ray incident on the lens positioned closer to an image than the second lens abruptly increases. The lens eventually does not transmit the beam. This problem becomes more conspicuous with a larger refracting power of the positive lens positioned second from the object in the first lens group or with a larger aerial spacing between the positive lens and a lens disposed just behind this positive lens.

On the other hand, when seeing the wide angle zoom lenses disclosed in Japanese Patent Laid-Open Application No. 2-201310 and U.S. Pat. No. 4,653,873 in terms of aberration, with widening of the view angle, a field curvature increases, an astigmatism and a distortion augment, and a chromatic aberration in a large view angle position is also deteriorated.

In particular, the zoom lens disclosed in U.S. Pat. No. 4,653,873 has a view angle of approximately 85°. However, the distortion at the wide angle end, the astigmatism and the field curvature are all large. A compensation of upper chromatic aberration is insufficient and greatly produced in the plus direction. Fluctuations in the chromatic aberration which are caused on the occasion of variable power are also large. This zoom lens is not satisfactory in terms of the aberration. Hence, it is hard to further widen the view angle in terms of the aberration.

As explained above, in the wide angle zoom lenses disclosed in Japanese Patent Laid-Open Application No. 2-201310 and U.S. Pat. No. 4,653,873, it is extremely difficult to obtain the view angle of 100° or larger in terms of lens construction and the aberration as well.

On the other hand, it is a common practice that focusing is effected by moving the first lens group disposed closest to the object in the zoom lens. A wide angle zoom lens adopting an internal focusing system such as an inner focus system or a rear focus system is, though already known, also disclosed in Japanese Patent Laid-Open Application No. 2-201310.

By the way, when seeing a conventionally oft-used system for extending the whole first lens group in terms of the aberration as a focusing system of the wide angle zoom lens, the fluctuations in the chromatic aberration which are caused during focusing and in the field curvature are large. Especially in the super wide angle zoom lens having a view angle of 100° or greater, this phenomenon appears more conspicuously. Besides, according to the focusing system for extending the whole first lens group, the principal ray passes through a position far away from the optical axis at the short distance, and hence a front lens diameter increases. This leads to a rise in size of the entire system. As a result, unfavorably a marginal light quantity is remarkably reduced. In particular, this problem becomes more conspicuous as the view angle increases.

Therefore, as a focusing system other than the focusing system for extending the whole first lens group, a system for moving some lenses as a focusing group within the first lens group was proposed in Japanese Patent Laid-Open Application No. 2-201310 described above.

According to this focusing system proposed therein, however, it is required to secure an aerial spacing enough to move the focusing group within the first lens group. This is therefore undesirable because of bringing about scale-ups of the first lens group and the diameter of the lens closest to the object. Additionally, a relatively large lens is employed for focusing, and a weight of the moving lens group (focusing group) is thereby increased. On the occasion of auto-focusing (AF), there is caused such a defect that quick focusing is not attainable.

Further, with a movement of the focusing lens group, there remarkably varies a height of entering principal ray having the maximum view angle which is incident on the focusing lens group set inwardly of the first lens group. Hence, undesirably the fluctuations both in the field curvature and in the chromatic aberration of magnification are large. Further, in the case of widening, as in the present invention, the view angle well over 100°, the aberration is undesirably outstandingly deteriorated.

SUMMARY OF THE INVENTION

It is a first object of the present invention to provide a super wide angle zoom lens which is relatively compact, requires a small number of lens elements despite the fact that a view angle exceeds 100° at the wide angle end and exhibits an excellent image forming performance by compensating well aberrations in all variable power areas.

It is a second object of the present invention to provide, in the super wide angle zoom lens having a view angle of 100° or larger at the wide angle end, a super wide angle zoom lens capable of compensating well various aberrations, securing an excellent image forming performance from the infinity object point to the short distance object point in respective magnification states by a so-called internal focusing system (inner focus system or rear focus system) based on focusing with lens groups that are relatively small both in weight and in size, attaining quick focusing and exhibiting a high performance with a relatively compact construction requiring a small number of lens elements.

To accomplish the first object described above, according to the present invention, there is provided a super wide angle zoom lens comprising: a front group including, sequentially from an object, a first negative lens element, a second negative lens element and a third positive lens element, this front group having a negative synthetic refracting power; an aspherical surface formed on at least one surface of lens surfaces constituting the lens elements of the front group; and a rear group disposed closer to an image than the front group, relatively movable to reduce an axial aerial spacing between the front group and the rear group on the occasion of variable power from the wide angle side to the telephoto side.

To accomplish the second object described above, according to the present invention, there is provided a super wide angle zoom lens comprising: a front group including, sequentially from an object, a first negative lens element, a second negative lens element and a third positive lens element, this front group having a negative synthetic refracting power and an aspherical surface formed on at least one surface thereof; and a rear group including a second lens group disposed sequentially toward an image of the first lens group and having a positive refracting power, a third lens group having a negative refracting power and a fourth lens group having a positive refracting power, characterized in that; the lens groups make relative movements to reduce an aerial spacing between the first lens group and the second lens group on the occasion of variable power from the wide angle side to the telephoto side, increase an aerial spacing between the second lens group and the third lens group and simultaneously reduce an aerial spacing between the third lens group and the fourth lens group; and at least the third lens group among the plurality of lens groups disposed closer to the image than the second lens group is constructed to move in the optical-axis direction on the occasion of variable power from the infinity object point to the shortest distance object point.

Based on the above-mentioned fundamental construction, the front groups is constructed to satisfy the following conditions:

$$(300/f\,w) \leq |f_1| \leq (680/f\,w)$$

$$0.12 \leq d_{23}/f\,w \leq 2.0$$

where
- f1 : the focal distance of the front group;
- fw : the focal distance of the whole system at the wide angle end;
- d23 : the axial aerial spacing between the closest-to-image surface of the second lens element in the front group.

The aspherical surface formed in the front group is constructed to desirably satisfy the following condition for mainly compensating a negative distortion:

$$0.01 \leq |AS-S|/f\,w \leq 0.5$$

where
- AS-S: the difference in the optical-axis direction between the aspherical surface in the effective diameter outermost periphery and the reference spherical surface having a predetermined vertex curvature radius.

According to the present invention, each lens group is composed compactly of a small number of lens elements. It is also possible to obtain the super-widening of the view angle exceeding 100° at the wide angle end. Further, various aberrations in all the variable power areas from the wide angle end to the telephoto end are extremely well compensated. Besides, in all the variable power areas from the wide angle end to the telephoto end, the various aberrations are extremely well compensated during focusing from the infinity object point to the short distance object point, thereby making it possible to obtain the super wide angle zoom lens exhibiting an excellent image forming performance.

Other objects, features and advantages of the present invention will sufficiently become apparent during the following discussion taken in conjunction with the accompanying drawings.

BRIEF DESCRIPTION OF THE DRAWINGS

FIGS. 1A–1C are diagrams of lens constructions, each showing a lens placement at a wide angle end (shortest focal distance state) and a displacement state of each lens group in an intermediate focal distance state and at a telephoto end (longest focal distance state) in a first embodiment of the present invention;

FIGS. 3A–3C are diagrams of lens constructions, each showing a lens placement at the wide angle end (shortest focal distance state) and a displacement state of each lens group in the intermediate focal distance state and at the telephoto end (longest focal distance state) in a third embodiment of the present invention;

FIGS. 4A–4C are diagrams of lens constructions, each showing a lens placement at the wide angle end (shortest focal distance state) and a displacement state of each lens group in the intermediate focal distance state and at the telephoto end (longest focal distance state) in a fourth embodiment of the present invention;

FIGS. 5A-5C are diagrams of lens constructions, each showing a lens placement at the wide angle end (shortest focal distance state) and a displacement state of each lens group in the intermediate focal distance state and at the telephoto end (longest focal distance state) in a fifth embodiment of the present invention;

FIGS. 6A-6C are diagrams of lens constructions, each showing a lens placement at the wide angle end (shortest focal distance state) and a displacement state of each lens group in the intermediate focal distance state and at the telephoto end (longest focal distance state) in a sixth embodiment of the present invention;

FIGS. 13A-13C are diagrams of lens constructions, each showing a lens placement at the wide angle end (shortest focal distance state), a displacement state of each lens group in the intermediate focal distance state and at the telephoto end (longest focal distance state) and also a lens group for focusing in a thirteenth embodiment of the present invention;

DETAILED DESCRIPTION OF THE PREFERRED EMBODIMENTS

Figures 2A, 2B, 2C:
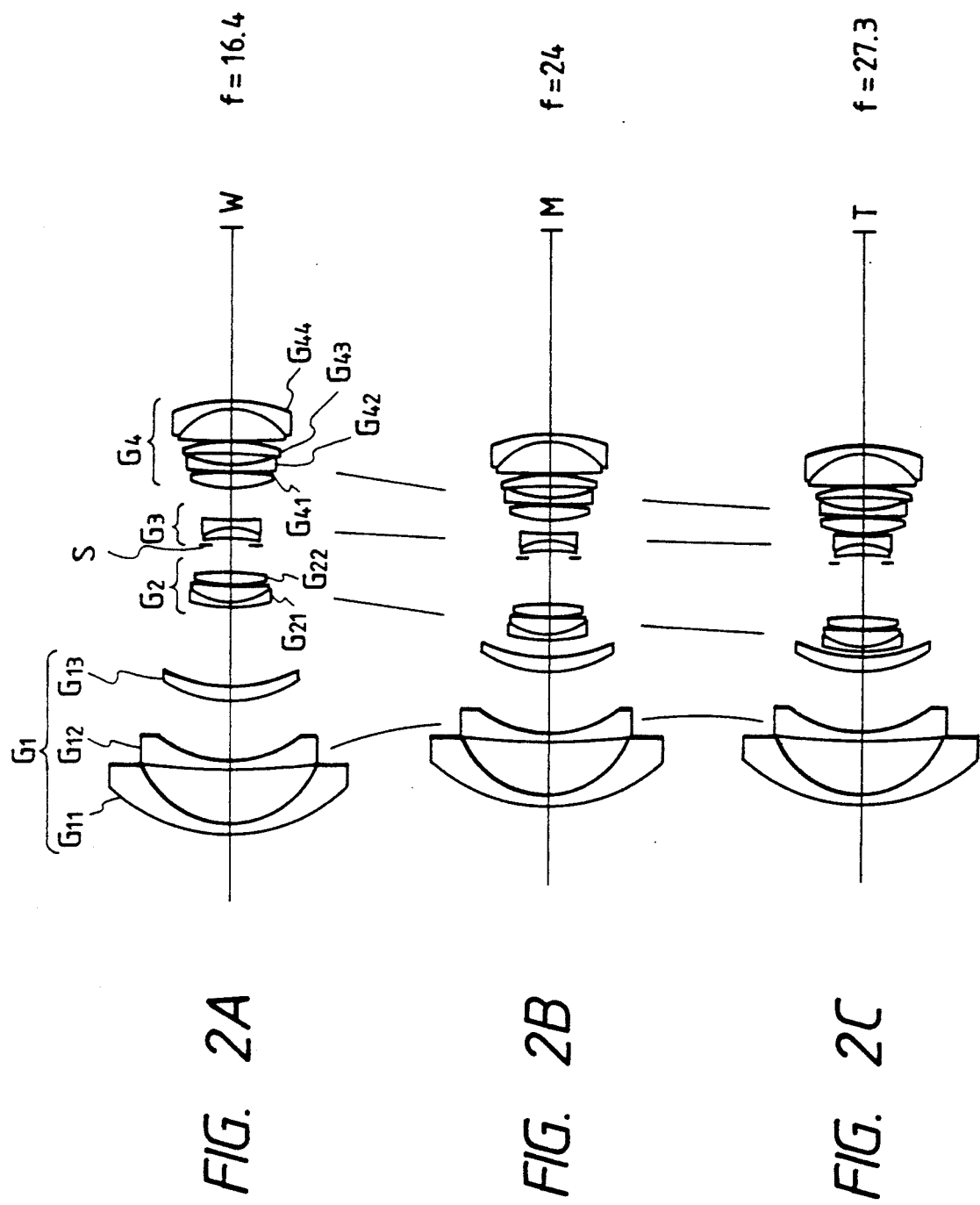
FIGS. 2A–2C are diagrams of lens constructions, each showing a lens placement at the wide angle end (shortest focal distance state) and a displacement state of each lens group in the intermediate focal distance state and at the telephoto end (longest focal distance state) in a second embodiment of the present invention.
Figures 7A, 7B, 7C:
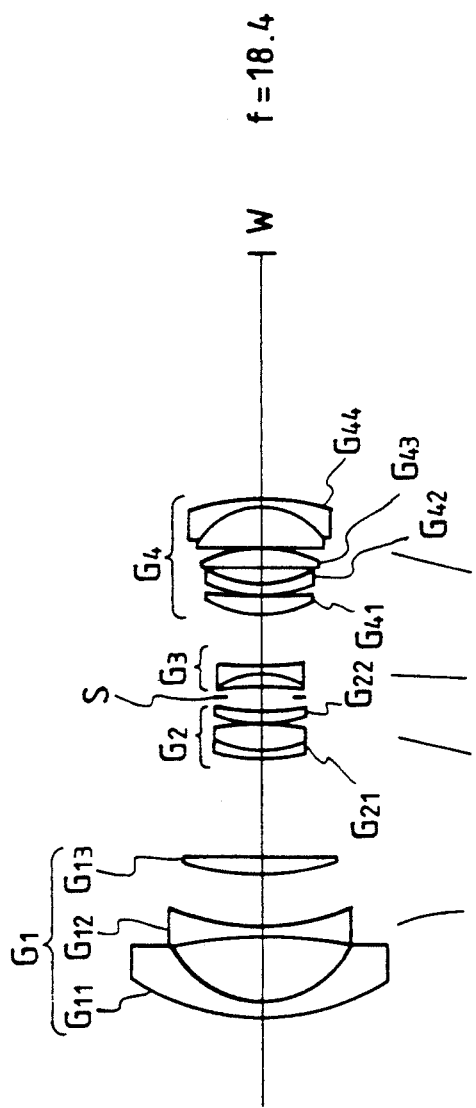
FIGS. 7A-7C are diagrams of lens constructions, each showing a lens placement at the wide angle end (shortest focal distance state) and a displacement state of each lens group in the intermediate focal distance state and at the telephoto end (longest focal distance state) in a seventh embodiment of the present invention.

Embodiments of the present invention will hereinafter be described in detail with reference to the accompanying drawings.

FIGS. 1A-1C through 7A-7C are diagrams of lens constructions in accordance with first to seventh embodiments, each illustrating a super wide angle zoom lens according to the present invention. FIGS. 8A-8C through 14A-14C are diagrams of lens constructions in accordance with eighth to fourteenth embodiments, each depicting a super wide angle zoom lens based on an internal focusing system according to the present invention. FIGS. 15A, 15B, 16A and 16B are explanatory diagrams each illustrating a lens type of a diverging lens group (first negative lens group) disposed closest to the object in a retrofocus type wide angle lens or a super wide angle zoom lens.

Each of the embodiments of the present invention provide a super wide angle zoom lens having a view angle of 100° or greater at the wide angle end.

In each embodiment, as illustrated in FIGS. 1A-1C, the super wide angle zoom lens fundamentally consists of, sequentially from an object, a front group of a first lens group G1 exhibiting a negative refracting power and a rear group including a second lens group G2 exhibiting a positive refracting power, a third lens group G3 having the negative refracting power and a fourth lens group G4 exhibiting the positive refracting power. On the occasion of variable power from the wide angle end to a telephoto end, the first lens group G1 moves curvilinearly (non-linearly) to an image, while the second lens group G2, the third lens group G3 and the fourth lens group G4 respectively move almost straight (linearly) to the object with different moving quantities. An aerial spacing between the first lens group G1 and the second lens group G2 is reduced the movements of the respective lens groups in association with the above-mentioned variable power from the wide angle end to the telephoto end. An aerial spacing between the second lens group G2 and the third lens group G3 increases, whereas an aerial spacing between the third lens group G3 and the fourth lens group is reduced. Note that in each embodiment, an aspherical surface is formed on a surface closest to the object in a negative meniscus lens (first lens element) G11 having a convex surface directed to the object which is provided closest to the object in the first lens group G1. An aperture stop S is disposed closer to the object in the third lens group G3.

In general, a problem in terms of designing the super wide angle zoom lens having a larger view angle at the wide angle end lies in how the rises both in an astigmatism and in a negative distortion are restrained, further a magnification chromatic aberration and a curve of a field curvature due to a difference in the view angle are reduced, and simultaneously a sagittal coma flare or the like is aberration-compensated well. What is important in designing the super wide angle zoom lens which presents the problem discussed above is the adequate allocation of the refracting powers of the respective lens groups, especially the refracting power and construction of the first lens group G1 exhibiting the negative refracting power which contributes largely to an out-of-axis aberration.

On the other hand, generally the aberration compensation of the super wide angle lens gives a large burden on the aberration compensation with respect to out-of-axis rays rather than the aberration with respect to axial rays. Especially, the distortion increases in proportion to a cube of a height of oblique entering ray. Hence, in the super wide angle lens having a large view angle, it is a highly important subject to compensate the distortion.

Originally, in the super wide angle lens for use with a single-lens reflex camera, a TV camera etc., it is required that a back focal distance be secured sufficiently. Hence, there is no alternative but to use the retrofocus type lens based on the placement of a negative/positive lens group exhibiting a high asymmetry in regards to the refracting power allocation. For this reason, this retrofocus type lens has such a tendency that the negative distortion basically increases. It is therefore required that the negative distortion be compensated enough by a .diverging group (negative lens group) closest to the object in the retrofocus lens.

If only the distortion is forced to be compensated by this diverging group, however, the field curvature is extremely deteriorated. Hence, in general, a plurality of negative and positive lenses each assuming a meniscus configuration are used. The out-of-axis rays are moderately refracted, thus keeping a balance of compensation with respect to the out-of-axis aberration.

If the super wide angle lens having a view angle of 100° or larger is obtained based on the conventional method discussed above, the number of lens elements increases because of the large view angle, and correspondingly the diverging group becomes more and more complicated with an increase in thickness. For this reason, the principal ray passes though the position far way from the optical axis. It is hard to secure the marginal light quantity. Originally, in the super wide angle lens having a view angle over 100°, the view angle is outstandingly large, so that the marginal light quantity is remarkably decreased based on the cosine-fourth-power law ($\cos^4\theta$ law). Hence, it is necessary to secure the marginal light quantity till a utilization level is obtained with a construction to highly improve a vignetting factor.

When securing the marginal light quantity, however, this further promotes the scale-up of the front lens diameter of the lens system and the increase in the thickness of the lens system. Especially in terms of the aberration compensation, it is further difficult to compensate the chromatic aberration produced in a large image height (position of large view angle) and the sagittal coma flare.

As described above, for the purpose of attaining, as in the present invention, the super wide angle zoom lens having the view angle of 100° or greater, all the problems given above are surmounted. Besides, the fundamental problems inherent in the ordinary zoom lenses also have to be surmounted. Namely, it is necessary to sufficiently compensate the variable-power-caused fluctuations in the chromatic aberration, the spherical aberration, the astigmatism, the field curvature and the distortion, and further the fluctuations in the chromatic aberration which are concomitant with the variable power and the variations in the image height. Simultaneously, it is also required to restrain the size of the entire optical system down to the utilization level. From the reasons elucidated above, almost no super wide angle zoom lens having a large view angle over 100° has hitherto been proposed.

The present invention is based on the retrofocus type lens construction in which the negative lens group is placed closest to the object. An optimum lens construction and refracting power of the front group (first lens group) are set to correspond well to the super-widening of the view angle to exceed 100°. Besides, for making it possible to correspond to transforming into a zoom lens under the super-widening of the view angle, the refracting powers of the respective lens groups are properly allocated, while the aerial spacings between the respective lens groups are adequately changed. The super wide angle zoom lens is thereby attainable.

Herein, in particular, the diverging group closest to the object plays a significant role for compensating the distortion, the field curvature, the astigmatism and the magnification chromatic aberration. Similarly, the construction and refracting power of the first lens group G1 in the super wide angle zoom lens according to the present invention are, as in the case of the foregoing retrofocus lens, quite important in attaining the super-widening of the view angle to exceed 100°.

For this purpose, according to the present invention, the first lens element G11 closest to the object in the first lens group G1 having the negative refracting power is formed, as a negative lens forefront type, of a negative lens element (a single negative lens, a joint negative lens of negative and positive lenses or a separate type negative lens exhibiting a negative synthetic refracting power in which the negative and positive lenses are slightly separated).

Figure 15A:
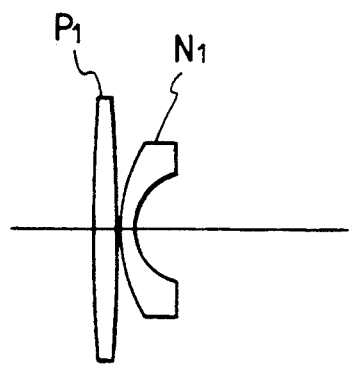
FIGS. 15A-15B are explanatory diagrams each illustrating a lens type of a diverging lens group (negative lens group) disposed closest to the object in a retrofocus type wide angle lens or a wide angle zoom lens.
Figure 15B:
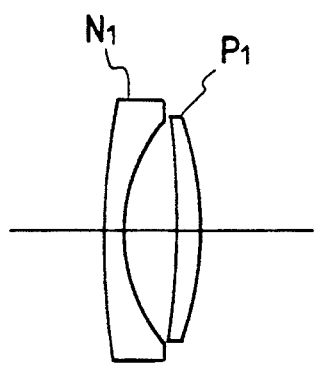

The reason for this will be elucidated in greater detail with reference to FIGS. 15A, 15B, 16A and 16B. The diverging group closest to the object in the retrofocus type wide angle lens and in the super wide angle zoom lens is, as illustrated in FIGS. 15A and 15B, basically classified into two types. One type is defined as a positive lens forefront type shown in FIG. 15A. The other type is defined as a negative lens forefront type shown in FIG. 15B. When the view angle is approximately 90°, almost no critical difference in the aberration structure between both types. If a view angle larger than 90° is provided, however, the following problems are to be arise.

An addition of a positive lens P1 to the first negative lens group disposed closest to the object presents an effect to compensate the negative distortion. While on the other hand, there exists such a contradiction that the refracting power of a negative lens N1 has to be intensified, resulting in a rise in occurrence of the negative distortion. Hence, originally the positive refracting power is desirably small. For this reason, a product of a height of entering principal ray having the maximum view angle in the positive lens P1 and the refracting power of the positive lens P1 is an index for indicating a compensating capability of the distortion.

Now, supposing that a value of product of the height of the entering principal ray having the maximum view angle in the positive lens P1 and the refracting power of the positive lens P1 is set equal in the two types illustrated in FIGS. 15A and 15B, the refracting power of the positive lens P1 is reduced in the type having a larger height of the entering principal ray having the maximum view angle in the positive lens P1. Therefore, the refracting power of the positive lens P1 can be reduced more easily in the positive lens forefront type arrangement shown in FIG. 15A than in the negative lens forefront type arrangement shown in FIG. 15B. The positive lens forefront type is a little bit advantageous to the wide angle lens having a view angle of approximately 90°.

In this positive lens forefront type, however, in the case of a wide angle lens having a maximum view angle of approximately 90° or greater, the compensating effect of the negative distortion is accelerated, and the distortion is extremely overcompensated at the maximum view angle. For this reason, for instance, the distortion becomes largely negative at an intermediate view angle. Whereas at the maximum view angle, the distortion changes in the positive direction and becomes positive in some cases. Produced is an intensive distortion exhibiting a so-called camp-hat-like configuration. Further, an influence caused thereby appears also in the magnification chromatic aberration. The variations in the magnification chromatic aberration which are due to the view angle augment, and it follows that a large curve is exhibited. Besides, the positive lens P1 increases both in size and in thickness in terms of the lens structure, which is not favorable in the manufacturing aspect.

Contrastingly, in the case of the negative lens forefront type shown in FIG. 15B, the principal ray having the maximum view angle undergoes higher diverging action from the negative lens N1 than in the type shown in FIG. 15A. An incident angle of the principal ray having the maximum view angle in the positive lens P1 is decreased. Relieved are adverse influences of the type shown in FIG. 15A on the distortion and the magnification chromatic aberration. The fluctuations in these aberrations do not appear so conspicuously. Hence, when attaining the wide angle lens having the maximum view angle of 90° or greater, it can be understood that the negative lens forefront type depicted in FIG. 15B is desirable. Note that this is described in detail on, e.g., pp. 113-123 of [LENS DESIGN ENGINEERING] written by Jihei Nakagawa (published by Tokai University).

In the case of the super wide angle lens having the maximum view angle of approximately 100° or larger, however, even in the positive lens P1 of the type shown in FIG. 15B, the curves of the magnification chromatic aberration and distortion increase as seen in the type of FIG. 15A. Therefore, generally the distortion is compensated without deteriorating the astigmatism and the field curvature. For this purpose, it is necessary in both types of FIGS. 15A and 15B to take such an arrangement that the negative lens N1 and the positive lens P1 are divided into a plurality of lenses, and the oblique ray is moderately refracted. This results in a problem wherein the number of lens elements increases enough to bring about a scale-up of the lens system.

It is assumed that the two types illustrated in FIGS. 15A and 15B are further developed to achieve transforming into the zoom lens while ignoring the problem about the scale-up concomitant With the super-widening of the view angle. It is quite difficult to secure a principal point spacing between the first negative lens group disposed closest to the object and the second positive lens group disposed closer to the image than this first lens group. For the variable power, the aerial spacing between the first lens group and the second lens group can not be varied. Hence, in the two negative/positive lens forefront types shown in FIGS. 15A and 15B, transforming into the super wide angle lens is hard to attain. These two types can not be easily adopted.

Figure 16A:
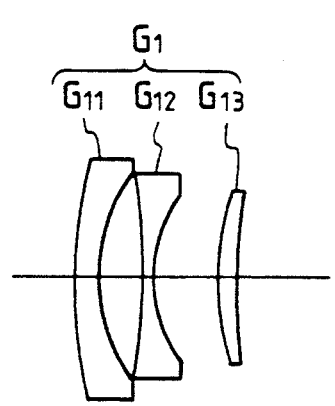
FIGS. 16A-16B are explanatory diagrams each illustrating a lens type of the diverging lens group (negative lens group) disposed closest to the object in a super wide angle lens or a super wide angle zoom lens.
Figure 16B:
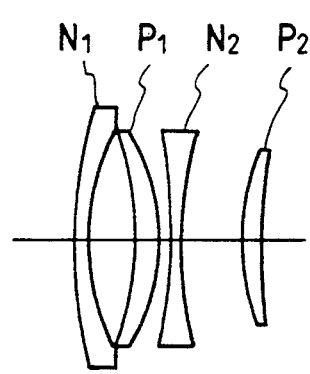

Now, a negative/positive/negative/positive lens type depicted in FIG. 16B (see Japanese Patent Laid-Open Application No. 2-201310) will be exemplified as a first lens construction of the zoom lens capable of achieving transforming into the zoom lens by shifting the principal point of the first negative lens group towards the image.

Where the lens of the type shown in FIG. 16B is applied as a first lens group of the super wide angle zoom lens having the view angle exceeding 100°, as discussed above, the positive lens positioned second from the object acts to cause a large distortion and magnification chromatic aberration. Besides, the oblique ray incident on or emerging from the positive lens P1 is refracted largely in the optical-axis direction. The astigmatism and the field curvature are thereby deteriorated. Further, the chromatic aberration also goes bad. If further, widening of the view angle is effected under this condition, the refractive action on the oblique ray of the second positive lens P2 grows, with the result that the incident angle of the oblique ray incident on the second lens group positioned closer to the image than the second positive lens P2 abruptly increases. The ray eventually does not pass therethrough.

To summarize the above-mentioned, for attaining the super wide angle zoom lens having the maximum view angle of 100° or larger according to the present invention, there is adopted, from the reasons elucidated in FIG. 15B, a construction advantageous to the view angle exceeding 90°, i.e., the negative lens forefront type in which the first lens element G11 closest to the object in the first lens group G1 is, as illustrated in FIG. 16A, composed of a negative lens element. Next, the following construction is taken in order to obviate the adverse influences caused by the positive lens P1 positioned second from the object when attaining, as described referring to FIG. 16B, the super-widening of the view angle. This positive lens P1 is omitted, and the lens element G12 disposed second from the object is, is illustrated in FIG. 16A, composed of a negative lens element. The oblique ray is moderately refracted, thereby restraining the occurrences of the astigmatism and the field curvature down to a small level. In addition to this construction, a third lens element G13 exhibiting the positive refracting power is disposed third from the object. This placement contributes enough to the compensations mainly of the downward comatic aberration and further the magnification chromatic aberration. Finally, an aspherical surface is introduced in the first lens group G1, thereby effectively compensating the negative distortion produced in the first and second lens elements exhibiting the negative refracting power.

More specifically, according to the present invention, as depicted in FIG. 16A, three pieces of negative/negative/positive lens elements G11, G12, G13 are combined to constitute the first lens group G1, which lens construction is advantageous to attaining the super wide angle zoom lens. Based on this lens construction, there is further introduced an aspherical surface which contributes chiefly to the compensation of the distortion generated in the two negative lens elements G11, G12 positioned from the object with the super-widening of the view angle. The super wide angle zoom lens having the maximum view angle of 100° or larger can be thereby actualized in principle. Besides, according to the construction of this invention, the principal ray having the maximum view angle which passes through the first negative lens group G1 travels through a position in closer proximity to the optical axis than in the prior art lens types. Produced consequently is a new effect in which the marginal light quantity can be incremented.

Based on the principle construction according to the present invention, it is further desirable to satisfy the following conditional formulae:

$$0.12 \leq d_{23}/f_w \leq 2.0 \quad (1)$$

$$(300/f) \leq |f_1| \leq (680/f_w) \quad (2)$$

$$0.01 \leq |AS-S|/F_w \leq 0.5 \quad (3)$$

where fw: the focal distance of the entire system at the wide angle end;

f1: the focal distance of the first lens group G1;

d23: the axial aerial spacing between the closest-to-image surface of the second negative lens element G12 in the first lens group G1 and the closest-to-object surface of the third positive lens element G13; and AS-S: the difference in the optical-axis direction between the aspherical surface in the effective diameter maximal periphery and the reference spherical surface having a predetermined vertext curvature radius.

The conditional formula (1) prescribes a proper value of the axial aerial spacing d23 between the closest-to-image surface of the second negative lens element G12 in the first lens group G1 and the closest-to-object surface of the third positive lens element G13. This aerial spacing d23 is highly effective in a compensation of the downward chromatic aberration, especially in a well-balanced compensation of fluctuations in the downward chromatic aberration due to the variable power. This aerial spacing d23 also functions effectively to decrease the height of the entering principal ray having the maximum view angle which is incident on the closest-to-object surface (first surface) in the first lens group G1. Therefore, the aerial spacing d23 is set to a proper value. The marginal light quantity is thereby increased while restricting diameters of the lens elements constituting the first lens group G1. Besides, it is possible to achieve the well-compensated aberration in all the variable power areas originating from the wide angle end with the view angle exceeding 100° under such conditions that a desired variable power ratio is secured.

If under a lower limit of the conditional formula (1), the aerial spacing d23 between the second lens element G12 and the third lens element G13 becomes too small. The downward chromatic aberration, particularly the fluctuation due to the image-height-difference associated with the variable power increases. The principal ray deviates outstandingly from the optical axis. Not only the marginal light quantity is reduced, but also the diameters of the first and second lens elements G11, G12 are also enlarged. This conduces to a rise in thickness of the first lens group G1 as a whole. Whereas if over an upper limit of the conditional formula (1), the aerial spacings d23 between the second lens element G12 and the third lens element G13 increases. The aerial spacing between the first lens group G1 and the second lens group G2 is, though advantageous to the compensation of the chromatic aberration, remarkably diminished. In the case of the variable power at the telephoto end, a physical interference takes place, which is unfavorable. Note that a lower limit value of the conditional formula (1) is set to 0.25, while an upper limit value thereof is set to 1.4, and this range is preferably satisfied with the intention of making possible the more sufficient compensation of the aberrations and further miniaturizing the first lens group G1.

The conditional formula (2) prescribes a proper focal distance of the first lens group G1. If under the lower limit of the conditional formula (2), the negative refracting power in the first lens group G1 is remarkably intensified. The negative distortion is thereby increased. A value of Petzval's sum shifts outstandingly in the negative direction. The astigmatism and the field curvature also become worse. Further, it is undesirable that there increase the fluctuations caused by the changes in the magnification chromatic aberration which are produced by variations in the view angle and the variable-power-caused fluctuations in the downward chromatic aberration. Whereas if over the upper limit of the conditional formula (2), the negative refracting power of the first lens group G1 is conspicuously weakened. The oblique ray falls on the first lens group G1 in a position spaced further away from the optical axis. This brings about a scale-up of the first lens group G1 and an increase in thickness thereof. As a result, the marginal light quantity is undesirably reduced. If the refracting power of the first lens group G1 is remarkably reduced, a balance in allocation of the refracting powers in the respective groups is lost so much. Even if the variable-power-caused fluctuations in the aberration are decreased, especially the downward chromatic aberration and the field curvature are resultantly deteriorate. Hence a desirable range does not exceed this upper limit in terms of utilization.

Now, the first lens group G1 of the present invention is provided with the aspherical surface for attaining the well-balanced compensation mainly of the distortion. This aspherical surface effectively functions to compensate the downward chromatic aberration at the wide angle end with a view angle exceeding 100°, the astigmatism and the field curvature. For this reason, preferably the conditional formula (3) is satisfied to draw the effect of this aspherical surface to the greatest possible degree.

The conditional formula (3) presents a condition, associated with the effect of the aspherical surface provided in the first lens group G1, for properly setting an intensity of the spherical surface, i.e., a difference in the optical-axis direction between the aspherical surface and the reference spherical surface created by the predetermined reference vertex curvature radius in the effective diameter position determined by the ray traveling remotest from the optical axis.

If under the lower limit of the conditional formula (3), the effect of the aspherical surface sharply declines, whereby the distortion is compensated with a difficulty. If the distortion is forced to be compensated by other lens groups, as a result of this, the out-of-axis aberrations such as a field curvature and a chromatic aberration unfavorably become worse outstandingly. Whereas if over the upper limit of the conditional formula (3), there is seen a tendency to exhibit an abrupt displacement from the intermediate portion to the outermost periphery of the downward chromatic aberration due to an influence of a high-order aberration. Besides, the aspherical surface in this case is manufacture unfavorably with a difficulty.

Incidentally, it is more desirable to set a lower limit value of the conditional formula (3) to 0.095 and satisfy this range in order to effectively obtain the effect of the aspherical surface provided in the first lens group G1. Basically, the above-described effect of the aspherical surface can be acquired even when forming the aspherical surface on any lens in the first lens group G1. However, the aspherical surface is provided preferably on the lens relatively remote from the stop but close to the object, whereby the aspherical surface can be made to function more effectively in compensating the out-of-axis aberrations because of the oblique ray passing through a portion remoter from the optical axis. Hence, the aspherical surface is incorporated more preferably into the first lens element G12 to obtain the maximum effect of the aspherical surface.

In the super wide angle zoom lens of this invention, the aberrations are compensated enough in all the variable power areas. For this purpose, preferably the following conditions are satisfied.

$$1 \leq f_2 f_w \leq 5 \quad (4)$$

$$1.1 \leq |f_3|/f_4 \leq 3.5, \; f_3 < 0 \quad (5)$$

$$1.4 \leq f_w/f_w \leq 4 \quad (6)$$

$$0.16 \leq d_{23}/L \leq 0.6 \quad (7)$$

where
- f2 : the focal distance of the second lens group G2;
- f3 : the focal distance of the third lens group G3;
- f4 : the focal distance of the fourth lens group G4;
- d23 : the axial aerial spacing between the closest-to-image surface of the second negative lens element G12 in the first lens group G1 and the closest-to-object surface of the third positive lens element G13; and
- L : the distance (axial thickness of the first lens group G1) from the lens vertex on the close-to-object surface of the closest-to-object lens in the first lens group G1 to the lens vertex of the close-to-image surface of the closest-to-image lens in the first lens group G1.

The conditional formula (4) prescribed an optimum ratio of the focal distance of the second lens group G2 to the focal distance at the wide angle end of the entire system. If under the lower limit of the conditional formula (4), the positive refracting power of the second lens group G2 becomes quite intensive. Increased are the variable-power-caused fluctuations in the astigmatism and the field curvature. The spherical aberration at the telephoto end is unfavorably deteriorated. Whereas if over the upper limit of the conditional formula (4), the positive refracting power is outstandingly weakened. A value of Petzval's sum changes in the negative direction. For this reason, the field curvature particularly on the side of the wide angle goes bad. The astigmatism also unfavorably augments. Incidentally, it is more preferable to provide a construction for setting the lower limit value of the conditional formula (4) to 1.45 and the upper limit value to 3 and satisfy this range for the purpose of attaining more sufficient compensation of the aberration.

The conditional formula (5) prescribes an optimum ratio of the focal distance of the third lens group G3 to the focal distance at the wide angle end of the whole system. If under the lower limit of the conditional formula (5), the negative refracting power of the third lens group G3 is remarkably intensified. In particular, the spherical aberration at the telephoto end becomes worse. Not only the compensation thereof becomes difficult, but also the variable-power-caused fluctuations in the spherical aberration grow. In addition, the upward chromatic aberration is compensated with a difficulty. The fluctuations in the upward chromatic aberration which are caused due to the variable power also unfavorably increase. Whereas if over the upper limit of the conditional formula (5), the negative refracting power is weakened so much. A balance of the aberration in the third lens group G3 is greatly lost. Resultantly, the upward chromatic aberration goes bad. Besides, the axial chromatic aberration is also deteriorated. The variable-power-caused fluctuations in the axial chromatic aberration become large. Note that, more preferably, the lower limit value of the conditional formula (5) is set to 1.5, while the upper limit value is set to 3.2, and this range is satisfied in order to sufficiently restrain the variable-power-caused fluctuation in the aberration while performing more ample compensation of the aberration.

The conditional formula (6) prescribes an optimum ratio of the focal distance of the fourth lens group G4 to the focal distance at the wide angle end of the whole system. If under the lower limit of the conditional formula (6), the positive refracting power of the fourth lens group G4 becomes outstandingly intensive. The upward chromatic aberration is deteriorated. The variable-power-caused fluctuations in the upward chromatic aberration also augment. Additionally, the variable-power-caused fluctuations in the magnification chromatic aberration likewise unfavorably increase. Reversely, if over the upper limit of the conditional formula (6), the positive refracting power of the fourth lens group G4 is remarkably weakened. A balance of the aberration with respect to the third lens group G3 is largely lost. As a result of this, the upward chromatic aberration extremely goes bad. Especially, it is difficult to compensate the chromatic aberration on the side of the wide angle. Note that, more preferably, the lower limit value of the conditional formula (6) is set to 1.7, while the upper limit is set to 3.0, and this range is met in order to attain a further well-balanced compensation of the aberration.

The conditional formula (7) prescribes an adequate ratio of the aerial spacing d23 between the second negative lens element G12 and the third positive lens element G13 to the total thickness (axial thickness) of the first lens group G1. The aerial spacing d23 between the second negative lens element G12 and the third positive lens element G13 has, as described in the conditional formula (1), an important role in terms of compensating well the downward chromatic aberration, the astigmatism and the field curvature. Increasing this aerial spacing d23 within a proper range is highly significant in terms of securing a degree of freedom when compensating the out-of-axis aberrations such as the chromatic aberration, the astigmatism and the field curvature. To be specific, the aerial spacing d23 is increased, with the result that the oblique ray incident on the positive lens element G13 positioned closest to the image in the first lens group G1 strikes on a position remoter from the optical axis. The out-of-axis ray and the axial ray in the positive lens element G13 are thereby separated well. In consequence of this, the out-of-axis aberrations are highly favorably compensated without exerting a considerably influence on the axial aberration in the positive lens element G13.

The increase in the aerial spacing d23, however, leads to an increment in the thickness of the first lens group G1. Unless a given limit is prescribed with respect to a value of the aerial spacing d23, there are induced defects such as a reduction in the marginal light quantity and a scale-up of the whole system. Hence, the conditional formula (7) prescribes a proper ratio of the aerial spacing d23 between the second negative lens element G12 and the third positive lens element G13 to the total thickness (axial thickness) of the first lens group G1. If under the lower limit of the conditional formula (7), the downward chromatic aberration is hard to compensate. In addition, the principal ray penetrating the third lens element G13 passes through a position remoter from the optical axis. Unfavorably, a lack of the marginal light quantity is induced. Whereas if over the upper limit of the conditional formula (7), the first lens group G1 increases both in thickness and in size. This is unfavorable even in the case of moving the first lens group G1 on the occasion of the variable power.

Further, for performing the well-balanced and sufficient compensation of the aberration, the super wide angle zoom lens according to the present invention preferably comprises: the third lens group G3 exhibiting the negative refracting power which includes a joint negative lens element in which the positive and negative lenses are joined; and the fourth positive lens group G4 including a joint positive lens element G44 in which the positive and negative lenses are joined. In this case, the following conditions are desirably met.

$$(60/f_w) \leq 4_p \leq (185/f_w) \quad (8)$$

$$|3_n \cdot n_{3p}| \leq 0.13 \quad (9)$$

$$-50 \leq v_{3p} - v_{3n} \leq -20 \quad (10)$$

$$0.1 \leq n_{4n} - n_{4p} \leq 0.4 \quad (11)$$

$$25 \leq v_{4p} - v_{4n} \quad (12)$$

where d4p : the axial thickness of the positive lens of the joint positive lens element G44 positioned closest to the image in the fourth lens group G4;

n3n : the refractive index with respect to a d-line (587.6 nm) of the negative lens of the joint negative lens element in the third lens group G3;

n3p : the refractive index with respect to the d-line (587.6 nm) of the positive lens of the joint negative lens element in the third lens group G3;

ν3n : the Abbe number of the negative of the joint negative lens element in the third lens group G3;

ν4p : the Abbe number of the positive lens of the joint negative lens element in the third lens group G3;

n4n : the refractive index with respect to the d-line (587.6 nm) of the negative lens of the joint positive lens element G44 positioned closest to the image in the fourth lens group G4;

n4p : the refractive index with respect to the d-line (587.6 nm) of the positive lens of the joint positive lens element G44 positioned closest to the image in the fourth lens group G4;

ν4n : the Abbe number of the negative lens of the joint positive lens element positioned closest to the image in the fourth lens group G4; and ν4p : the Abbe number of the positive lens of the joint positive lens element G44 positioned closest to the image in the fourth lens group G4.

The conditional formula (8) is associated with the joint positive lens element G44 positioned closest to the image in the fourth positive lens group G4. If under the lower limit of the conditional formula (8), the positive lens of the joint positive lens element G44 is thinned, resulting in no edge thickness. Manufacturing thereof becomes difficult. Reduced are the compensation of the aberration with respect to the oblique ray and the effect to compensate the magnification chromatic aberration. This is not favorable. Whereas if over the upper limit of the conditional formula (8), the curvature radius of the joint surface of the joint positive lens element G44 is decreased. Similarly, the edge thickness of the positive lens of the joint positive lens element G44 disappears. Manufacturing thereof becomes difficult. Besides, the high-order aberration remarkably largely takes place. This in turn unfavorably brings above deteriorations in the aberrations with respect to the oblique ray, especially in the upward chromatic aberration, the astigmatism and the field curvature. Note that in this joint positive lens element G44, desirably the positive lens and the negative lens are joined sequentially from the object. Namely, this configuration does not provide the joint surface with an extremely large refracting power for the incidence of the oblique ray.

The conditional formula (9) prescribes a difference in the optimum refractive index between the positive lens and the negative lens which constitute the joint negative lens element in the third lens group G3. The conditional formula (10) prescribes a difference in the Abbe number between the positive lens and the negative lens which constitute the joint negative lens element in the third lens group G3.

According to the present invention, it is required that the aperture stop S be disposed in the second lens group G2 or between the second lens group G2 and the third lens group G3 or in the third lens group G3 or just behind the third lens group G3. Particularly, this aperture stop S is disposed desirably in front and in rear of the third lens group G3 or in the third lens group G3 in terms of compensating the aberration. Where the aperture stop S is disposed within the third lens group G3 or, as illustrated in the Figure, in the vicinity of the third lens group G3, the function to compensate the aberration in the third lens group G3 aims mainly at the compensation of the axial aberrations rather than the compensation of the out-of-axis aberrations relative to the oblique ray. In this case, the joint negative lens in the third lens group G3 incorporates the function to compensate chiefly the axial chromatic aberration and the spherical chromatic aberration. Therefore, for the purpose of effectively compensating these aberrations, it is desirable that no considerable difference in the refractive index is given, but a difference in the Abbe number is set large between the positive and negative lenses which form the joint negative lens in the third lens group G3. The conditional formulae (9) and (10) are given for compensating well the axial chromatic aberration and the spherical chromatic aberration.

If larger than the upper limit of the conditional formula (9), not only an adverse influence is exerted on the spherical aberration, but also the value of Petzval's sum largely varies. A sufficient difference between the Abbe numbers is hard to obtian because of a constraint of existent glass materials. It is impossible to compensate well the aberrations such as axial chromatic and spherical aberrations. Note that desirably the upper limit of the conditional formula (9) is set to 0.07, and this range is satisfied in order to compensate the axial aberrations more successfully.

If in excess of the upper limit of the conditional formula (10), the effect to compensate the chromatic aberrations is reduced. The variable-power-caused fluctuations in the axial chromatic aberrations increase. Whereas if under the lower limit of the conditional formula (10), for instance, a special glass material exhibiting a low refractive index and a low dispersion has to be employed. In addition, the costs undesirably go up due to such problems that the manufacturing process requires a skillful technique and so on.

The conditional formula (11) prescribes a difference in the refractive index between the positive and negative lenses constituting the joint positive lens element G44 disposed closest to the image in the fourth lens group G4. The conditional formula (12) prescribes a difference in the Abbe number between the positive and negative lenses configuring the joint positive lens element G44 disposed closest to the image in the fourth lens group G4.

If under the lower limit of the conditional formula (11), the value of Petzval's sum varies in the negative direction, as a result of which the field curvature and the astigmatism are unfavorably deteriorated. Whereas if above the upper limit of the conditional formula (11), though the value of Petzval's sum can be adequately kept, the refractive index of the positive lens of the joint positive lens element G44 is remarkably decreased. In consequence of this, the curvature radius of the joint surface is reduced, and the edge thickness of the positive lens of the joint positive lens element G44 disappears. The difficulty is induced in terms of manufacture. Besides, the high-order aberration occurs so much. The aberration with respect to the oblique ray, especially the upward chromatic aberration, the astigmatism and the field curvature are deteriorated.

If under the lower limit of the conditional formula (12), the magnification chromatic aberration is hard to compensate.

Note that the first lens group G1 exhibiting the negative refracting power, as will be described in respective embodiment of the present invention comprises: the first negative lens element G11 formed of a single negative lens including an aspherical surface; the second negative lens element G12 consisting of a single negative lens or a negative/positive joint lens; and the third positive lens element G13 consisting of a single positive lens or, as will be shown in a fifth embodiment, a positive/negative joint lens. This construction is advantageous to reductions both in thickness of the first lens group G1 and in the costs.

Next, the constructions of the first to seventh embodiment of the present invention will be described in detail.

The super wide angle zoom lens in the first embodiment according to the present invention has a focal distance $f = 15.5$ to $27.3$, a view angle $2\omega = 111.2°$ to $76.4°$, and an F-number of 4.1. The following is a concrete lens configuration of the first embodiment. As obvious from FIG. 1, the first negative lens group G1 is composed of a negative meniscus lens (first lens element) G11 having its convex surface directed to the object, a double-concave negative lens (second lens element) G12 and a positive lens (third lens element) G13 having its surface exhibiting a higher curvature and directed to the object. The second positive lens group G2 comprises: a joint positive lens (fourth lens element) G21 formed of a negative meniscus lens having its convex surface directed to the object and a positive lens joined thereto and having its surface exhibiting a high curvature and directed to the object; and a double-convex positive lens (fifth lens element) G22. The third negative lens group G3 is constructed of a joint negative lens (sixth lens element) consisting of a positive meniscus lens having its convex surface directed to the image and a negative lens joined thereto and having its surface exhibiting a higher curvature and directed to the image. The fourth positive lens group G4 is composed of: a positive meniscus lens (seventh lens element) G41 having its convex surface directed to the object; a negative meniscus lens (eighth lens element) G42 having its convex surface directed to the object; a positive meniscus lens (ninth lens element) G43 having its convex surface directed to the image; and a joint positive lens (tenth lens element) G45 consisting of a positive lens having a surface exhibiting a higher curvature and directed to the image and a negative meniscus lens joined thereto and having its convex surface directed to the image.

Next, the super wide angle zoom lens in the second embodiment of the present invention has a focal distance $f = 16.4$ to $27.3$, a view angle $2\omega = 108.2°$ to $76.4°$, and an F-number of 4.1. The concrete lens configuration in the second embodiment is basically, as illustrated in FIG. 2, the same with the zoom lens in the first embodiment. In the first lens group G1, however, the second negative lens element G12 is composed of a negative meniscus lens having its convex surface directed to the object. The third positive lens element G13 consists of a positive meniscus lens the convex surface of which is directed to the object. In the fourth positive lens group G4 also, the positive lens (seventh lens element) G41 closest to the object is composed of a double-convex positive lens.

The super wide angle zoom lens in the third embodiment of the present invention has a focal distance $f = 18.4$ to $27.3$, a view angle $2\omega = 101.2°$ to $76.4°$, and an F-number of 4.1. The concrete lens configuration in the third embodiment is basically, as illustrated in FIG. 3, the same with the zoom lens in the first embodiment. However, the third positive lens element G13 in the first lens group G1 consists of a positive meniscus lens having its convex surface directed to the object. In the second lens group G2, the positive lens of the joint positive lens (fourth lens element) G21 is composed of a double-convex lens. The positive lens closer to the image than this joint positive lens (fourth lens element) G21 is constructed of a meniscus lens.

Next, the super wide angle zoom lens in the fourth embodiment of this invention has a focal distance $f = 18.4$ to $27.3$, a view angle $2\omega = 101.5°$ to $76.4°$, and an F-number of 4.1 to 4.6. The concrete lens configuration in the fourth embodiment is basically, as illustrated in FIG. 4, the same with the zoom lens in the third embodiment with respect to the second lens group G2.

However, the first lens group G1, the third lens group G3 and the fourth lens group G4 are different in their configurations. More specifically, the second negative lens element G12 in the first lens group G1 consists of a double-concave negative lens and a positive meniscus lens joined thereto and having its convex surface directed to the object. The third lens group G3 is composed of a joint negative lens in which the negative and positive lenses are joined in this sequence. The fourth lens group G4 is constructed of totally four lenses, i.e., a meniscus lens (seventh lens element) G41 having its convex surface directed to the object and exhibiting an extremely small negative refracting power, a positive meniscus lens (eighth lens element) G42 having its convex surface directed to the image, and a joint positive lens (ninth lens element) G43 including a positive lens having a higher curvature surface directed to the image and a negative meniscus lens joined thereto and having its convex surface directed to the image.

The super wide angle zoom lens in the fifth embodiment of this invention has a focal distance f=18.4 to 27.3, a view angle 2ω=101.3° to 76.4°, and an F-number of 4.6. The concrete lens configuration in the fifth embodiment is basically, as depicted in FIG. 5, the same with the zoom lens in the fourth embodiment with respect to the third and fourth lens groups G3, G4. However, the first and second lens groups G1, G2 are different in their configurations. To be specific, in the first lens group G1, the second negative lens element G12 is composed of a negative lens having a higher curvature surface directed to the object. The third lens element G13 consists of a joint lens including a double-convex positive lens and a negative lens joined thereto and having a higher curvature surface directed to the object. The positive lens of the joint positive lens element G21 in the second lens group G2 assumes a double-convex shape.

The super wide angle zoom lens in the sixth embodiment of the present invention has a focal distance f=18.4 to 27.3, a view angle 2ω=101.4° to 76.4°, and an F-number of 4.1. The concrete lens configuration in the sixth embodiment is basically, as depicted in FIG. 6, the same with the zoom lens in the first embodiment. In the second lens group G2, however, the positive lens of the joint lens element G21 in the second lens group G2 is constructed of a double-convex positive lens.

The super wide angle lens in the seventh embodiment of this invention has a focal distance f=18.4 to 27.3, a view angle 2ω=101.4° to 76.4°, and an F-number of 4.1. The concrete lens configuration in the seventh embodiment is basically, as illustrated in FIG. 7, the same with the zoom lens in the first embodiment. In the second lens group G2, however, the positive lens of the joint positive lens G21 consists of a double-convex lens. A positive lens G22 closer to the image than this joint positive lens G21 is composed of a meniscus lens.

The following is a description of values of items in the first through seventh embodiments of the present invention and condition corresponding numerical values which are given in sequence.

However, the leftmost numeral indicates the order from the object, r is the radius of curvature of the lens surface, d is the lens surface spacing, ν is the Abbe number, n is the refractive index in the d-line (λ=587.6 nm), f is the focal distance of the whole system. $F_{NO}$ is the F-number, and $\phi$ is the effective diameter of the aspherical surface lens. The aspherical surface indicated by the values of items is expressed such as:

$$X(h) = (h^2/r)/[1 + (1 - Kh^2/r^2)^{1/2}] + C_2 h^2 + C_4 h^4 + C_6 h^6 + C_8 h^8 + C_{10} h^{10}$$

where X(h) is the distance along the optical-axis direction from the nodal plane of the vertex of each aspherical surface at the height y in the vertical direction from the optical axis, r is the reference paraxial curvature radius, k is the conical coefficient, Cn is the n-order aspherical surface coefficient, and $E^{-n}$ at the left end in the n-order aspherical surface coefficient Cn indicates $10^{-n}$.

TABLE 1

[First Embodiment]

$f = 15.5 \sim 27.3$, $2\omega = 111.2° \sim 76.4°$, $F_{NO} = 4.1$

| | r | d | ν | n |
|---|---|---|---|---|
| 1 | 69.600 | 2.50 | 45.4 | 1.79668 |
| 2 | 20.275 | 15.50 | | |
| 3 | −80.398 | 2.00 | 45.4 | 1.79668 |
| 4 | 37.112 | 6.00 | | |
| 5 | 46.526 | 5.30 | 35.2 | 1.74950 |
| 6 | −815.420 | (d₆) | | |
| 7 | 26.848 | 1.60 | 33.9 | 1.80384 |
| 8 | 14.972 | 4.50 | 65.8 | 1.46450 |
| 9 | 97.280 | 0.20 | | |
| 10 | 38.990 | 3.00 | 41.4 | 1.57501 |
| 11 | −50.400 | (d₁₁) | | |
| 12 | −36.378 | 2.30 | 28.3 | 1.72825 |
| 13 | −13.883 | 1.50 | 55.6 | 1.69680 |
| 14 | 128.521 | (d₁₄) | | |
| 15 | 24.647 | 3.00 | 54.6 | 1.51454 |
| 16 | 73.993 | 0.50 | | |
| 17 | 41.947 | 2.00 | 26.1 | 1.78470 |
| 18 | 24.197 | 3.20 | | |
| 19 | −103.008 | 3.00 | 67.9 | 1.59319 |
| 20 | −28.765 | 0.10 | | |
| 21 | 217.566 | 8.00 | 65.4 | 1.60300 |
| 22 | −15.505 | 2.00 | 23.0 | 1.86074 |
| 23 | −30.196 | (Bf) | | |
| f | 15.450 | 24.000 | 27.300 | |
| d6 | 21.412 | 3.704 | 0.398 | |
| d11 | 6.575 | 11.685 | 13.610 | |
| d14 | 7.671 | 2.561 | 0.636 | |
| Bf | 38.211 | 47.501 | 51.002 | |

Aspherical Surface (First Surface)

Reference Paraxial Curvature Radius: r = 69.600
Conical Coefficient: k = 1
Aspherical Surface Coefficient
$c_2 = 0.0$, $c_4 = 0.79789^{-05}$, $c_6 = -0.39445^{-08}$,
$c_8 = 0.24046^{-11}$, $c_{10} = 0.31560^{-14}$ Conditional Formula Corresponding Values $d_{23}/fw = 0.388$, $|f_1| = 24.942$
$|AS-S|/fw = 0.25367$ ($\phi = 55.66$)
$f_2/fw = 2.330$, $|f_3|/fw = 2.773$
$f_4/fw = 2.307$, $d_{23}/L = 0.192$
$d_{4p} = 8.0$, $|n_{3r}-n_{3p}| = 0.03145$
$\nu_{3p}-\nu_{3n} = -27.3$, $n_{4r}-n_{4n} = 0.2577$
$\nu_{4p}-\nu_{4n} = 42.4$

TABLE 2

[Second Embodiment]

$f = 16.4 \sim 27.3$, $2\omega = 108.2° \sim 76.4°$, $F_{NO} = 4.1$

| | r | d | ν | n |
|---|---|---|---|---|
| 1 | 56.830 | 2.50 | 45.4 | 1.79668 |
| 2 | 22.588 | 13.00 | | |
| 3 | 203.239 | 2.00 | 43.4 | 1.84042 |
| 4 | 29.159 | 14.20 | | |
| 5 | 29.712 | 3.50 | 25.5 | 1.80458 |
| 6 | 37.859 | (d₆) | | |
| 7 | 35.294 | 1.30 | 33.9 | 1.80384 |
| 8 | 16.316 | 4.00 | 70.4 | 1.48749 |
| 9 | 160.741 | 0.20 | | |
| 10 | 35.749 | 3.00 | 38.0 | 1.60342 |
| 11 | −53.604 | (d₁₁) | | |

TABLE 2-continued

[Second Embodiment]

| | | | | |
|---|---|---|---|---|
| 12 | −30.014 | 2.50 | 27.8 | 1.69911 |
| 13 | −12.979 | 1.50 | 60.0 | 1.64000 |
| 14 | 141.313 | (d$_{14}$) | | |
| 15 | 29.674 | 3.50 | 58.9 | 1.51823 |
| 16 | −229.981 | 0.10 | | |
| 17 | 92.266 | 2.00 | 28.6 | 1.79504 |
| 18 | 28.825 | 2.50 | | |
| 19 | −150.071 | 3.00 | 65.4 | 1.60300 |
| 20 | −34.756 | 0.10 | | |
| 21 | 205.091 | 8.00 | 57.5 | 1.67025 |
| 22 | −15.837 | 1.80 | 23.0 | 1.86074 |
| 23 | −34.904 | (Bf) | | |

| | | | |
|---|---|---|---|
| f | 16.400 | 24.000 | 27.300 |
| d6 | 18.553 | 4.145 | 0.916 |
| d11 | 8.282 | 13.087 | 15.115 |
| d14 | 7.722 | 2.917 | 0.888 |
| Bf | 39.789 | 47.798 | 51.178 |

Aspherical Surface (First Surface)

Reference Paraxial Curvature Radius: r = 56.830
Conical Coefficient: k = 1
Aspherical Surface Coefficient
$C_2 = 0.0$, $C_4 = 0.41777E^{-05}$, $C_6 = 0.36563E^{-09}$,
$C_8 = -0.98160E^{-12}$, $C_{10} = 0.21972E^{-14}$ Conditional Formula Corresponding Values $d_{23}/fw = 0.8659$, $|f_1| = 24.941$
$|AS-S|/fw = 0.1800$ ($\phi = 55.73$)
$f_2/fw = 2.195$, $|f_3|/fw = 2.612$
$f_4/fw = 2.174$, $d_{23}/L = 0.4034$
$d_{4p} = 8.0$, $|n_{3n}-n_{3p}| = 0.05911$
$v_{3p}-v_{3n} = -32.2$, $n_{4n}-n_{4p} = 0.19049$
$v_{4p}-v_{4n} = 34.5$

TABLE 3

[Third Embodiment]

$f = 18.4 \sim 27.3$, $2\omega = 101.2° \sim 76.4°$, $F_{NO} = 4.1$

| | r | d | ν | n |
|---|---|---|---|---|
| 1 | 49.794 | 2.50 | 40.9 | 1.79631 |
| 2 | 17.702 | 12.00 | | |
| 3 | −83.638 | 2.00 | 45.4 | 1.79668 |
| 4 | 47.407 | 10.70 | | |
| 5 | 50.613 | 3.00 | 27.8 | 1.69911 |
| 6 | 511.053 | (d$_6$) | | |
| 7 | 28.622 | 1.50 | 35.7 | 1.90265 |
| 8 | 17.512 | 5.00 | 65.8 | 1.46450 |
| 9 | −37.213 | 0.10 | | |
| 10 | 28.185 | 2.00 | 54.6 | 1.51454 |
| 11 | 54.221 | (d$_{11}$) | | |
| 12 | −50.475 | 2.00 | 25.5 | 1.73038 |
| 13 | −17.366 | 1.50 | 52.3 | 1.74810 |
| 14 | 90.015 | (d$_{14}$) | | |
| 15 | 21.344 | 3.00 | 60.3 | 1.51835 |
| 16 | 47.510 | 1.00 | | |
| 17 | 25.698 | 2.00 | 25.5 | 1.80458 |
| 18 | 19.106 | 3.20 | | |
| 19 | −108.848 | 3.50 | 54.6 | 1.51454 |
| 20 | −24.560 | 0.10 | | |
| 21 | −1489.718 | 6.50 | 60.6 | 1.60311 |
| 22 | −13.865 | 1.50 | 25.5 | 1.80458 |
| 23 | −34.842 | (Bf) | | |

| | | | |
|---|---|---|---|
| f | 18.400 | 24.000 | 27.300 |
| d6 | 17.323 | 6.811 | 2.987 |
| d11 | 4.870 | 7.898 | 9.649 |
| d14 | 8.112 | 5.084 | 3.333 |
| Bf | 42.968 | 48.575 | 51.818 |

Aspherical Surface (First Surface)

Reference Paraxial Curvature Radius: r = 49.794
Conical Coefficient: k = 1
Aspherical Surface Coefficient
$C_2 = 0.0$, $C_4 = 0.89224E^{-05}$, $C_6 = -0.47558E^{-08}$,
$C_8 = 0.82136E^{-11}$, $C_{10} = 0.33662E^{-14}$ Conditional Formula Corresponding Values $d_{23}/fw = 0.5816$, $|f_1| = 26.262$

TABLE 3-continued

[Third Embodiment]

$|AS-S|/fw = 0.10589$ ($\phi = 43.33$)
$f_2/fw = 1.9565$, $|f_3|/fw = 2.2581$
$f_4/fw = 2.0842$, $d_{23}/L = 0.3543$
$d_{4p} = 6.5$, $|n_{3n}-n_{3p}| = 0.017721$
$v_{3p}-v_{3n} = -26.8$, $n_{4n}-n_{4p} = 0.20147$
$v_{4p}-v_{4n} = 35.1$

TABLE 4

[Fourth Embodiment]

$f = 18.4 \sim 27.3$, $2\omega = 101.5° \sim 76.4°$, $F_{NO} = 4.07 \sim 4.60$

| | r | d | ν | n |
|---|---|---|---|---|
| 1 | 90.937 | 2.50 | 45.4 | 1.79668 |
| 2 | 31.382 | 13.00 | | |
| 3 | −278.297 | 1.50 | 43.4 | 1.84042 |
| 4 | 27.974 | 4.00 | 49.5 | 1.77279 |
| 5 | 30.032 | 8.01 | | |
| 6 | 43.281 | 4.70 | 25.5 | 1.80458 |
| 7 | 215.269 | (d$_7$) | | |
| 8 | 22.602 | 1.50 | 27.6 | 1.75520 |
| 9 | 12.892 | 5.00 | 65.8 | 1.46450 |
| 10 | −42.867 | 0.10 | | |
| 11 | 27.354 | 2.00 | 70.0 | 1.51860 |
| 12 | 41.149 | (d$_{12}$) | | |
| 13 | −55.604 | 1.50 | 55.6 | 1.69680 |
| 14 | 16.631 | 2.00 | 25.5 | 1.73038 |
| 15 | 66.434 | (d$_{15}$) | | |
| 16 | 17.545 | 3.00 | 25.5 | 1.73038 |
| 17 | 17.053 | 3.00 | | |
| 18 | −27.216 | 3.00 | 58.5 | 1.65160 |
| 19 | −19.139 | 0.10 | | |
| 20 | 97.697 | 9.00 | 65.4 | 1.60300 |
| 21 | −11.988 | 1.50 | 25.5 | 1.73038 |
| 22 | −33.438 | (Bf) | | |

| | | | |
|---|---|---|---|
| f | 18.399 | 24.000 | 27.300 |
| d7 | 20.808 | 7.653 | 2.694 |
| d12 | 3.914 | 6.449 | 7.934 |
| d15 | 5.867 | 3.333 | 1.847 |
| Bf | 35.003 | 39.227 | 41.703 |

Aspherical Surface (First Surface)

Reference Paraxial Curvature Radius: r = 90.937
Conical Coefficient: k = 1
Aspherical Surface Coefficient
$C_2 = 0.0$, $C_4 = 0.41120E^{-05}$, $C_6 = -0.10463E^{-08}$,
$C_8 = 0.26766E^{-12}$, $C_{10} = 0.94821E^{-15}$ Conditional Formula Corresponding Values $d_{23}/fw = 0.4352$, $|f_1| = 33.000$
$|AS-S|/fw = 0.12817$ ($\phi = 55.75$)
$f_2/fw = 1.9293$, $|f_3|/fw = 2.5000$
$f_4/fw = 1.9567$, $d_{23}/L = 0.2376$
$d_{4p} = 9.0$, $|n_{3n}-n_{3p}| = 0.033578$
$v_{3p}-v_{3n} = -30.1$, $n_{4n}-n_{4p} = 0.12738$
$v_{4p}-v_{4n} = 39.9$

TABLE 5

[Fifth Embodiment]

$f = 18.4 \sim 27.3$, $2\omega = 101.3° \sim 76.4°$, $F_{NO} = 4.6$

| | r | d | ν | n |
|---|---|---|---|---|
| 1 | 48.498 | 1.80 | 39.8 | 1.86994 |
| 2 | 15.829 | 11.00 | | |
| 3 | −48.419 | 1.50 | 43.3 | 1.84042 |
| 4 | 479.543 | 13.69 | | |
| 5 | 42.228 | 4.30 | 27.8 | 1.69911 |
| 6 | −30.868 | 1.30 | 35.7 | 1.90265 |
| 7 | 218.115 | (d$_7$) | | |
| 8 | 44.084 | 1.50 | 33.9 | 1.80384 |
| 9 | 18.238 | 4.00 | 65.7 | 1.46450 |
| 10 | −110.754 | 0.10 | | |
| 11 | 36.956 | 4.00 | 54.6 | 1.51454 |
| 12 | −48.126 | (d$_{12}$) | | |
| 13 | −36.432 | 3.00 | 26.1 | 1.78470 |
| 14 | −16.787 | 1.50 | 52.3 | 1.74810 |
| 15 | 164.469 | (d$_{15}$) | | |

TABLE 5-continued

[Fifth Embodiment]

| | | | | |
|---|---|---|---|---|
| 16 | 21.601 | 2.50 | 60.2 | 1.51835 |
| 17 | 37.689 | 1.00 | | |
| 18 | 23.788 | 2.00 | 25.5 | 1.80458 |
| 19 | 19.149 | 3.70 | | |
| 20 | −285.297 | 4.00 | 54.6 | 1.51454 |
| 21 | −23.565 | 0.20 | | |
| 22 | 115.249 | 7.00 | 82.5 | 1.49782 |
| 23 | −16.557 | 1.50 | 25.5 | 1.80458 |
| 24 | −43.420 | (Bf) | | |

| f | 18.400 | 24.000 | 27.300 |
|---|---|---|---|
| d7 | 9.147 | 2.641 | 0.502 |
| d12 | 6.616 | 10.597 | 12.842 |
| d15 | 8.058 | 4.076 | 1.832 |
| Bf | 50.193 | 57.567 | 61.723 |

Aspherical Surface (First Surface)

Reference Paraxial Curvature Radius: $r = 48.498$
Conical Coefficient: $k = 1$
Aspherical Surface Coefficient
$C_2 = 0.0$, $C_4 = 0.15694E^{-04}$, $C_6 = -0.11607E^{-07}$,
$C_8 = 0.18735E^{-10}$, $C_{10} = 0.28146E^{-13}$ Conditional Formula Corresponding Values $d_{23}/fw = 0.7440$, $|f_1| = 20.000$
$|AS-S|/fw = 0.10283$ ($\phi = 37.59$)
$f_2/fw = 1.9565$, $|f_3|/fw = 2.2581$
$f_4/fw = 2.0841$, $d_{23}/L = 0.40755$
$d_{4p} = 7.0$, $|n_{3n}-n_{3p}| = 0.036603$
$\nu_{3p}-\nu_{3n} = -26.3$, $n_{4n}-n_{4p} = 0.30676$
$\nu_{4p}-\nu_{4n} = 57.0$

TABLE 6

[Sixth Embodiment]

$f = 18.4 \sim 27.3$, $2\omega = 101.4° \sim 76.4°$, $F_{NO} = 4.1$

| | r | d | ν | n |
|---|---|---|---|---|
| 1 | 43.716 | 2.00 | 39.8 | 1.86994 |
| 2 | 18.989 | 14.00 | | |
| 3 | −86.359 | 1.60 | 43.4 | 1.84042 |
| 4 | 75.253 | 18.95 | | |
| 5 | 95.685 | 3.00 | 27.8 | 1.69911 |
| 6 | 735.641 | (d6) | | |
| 7 | 24.693 | 1.50 | 35.7 | 1.90265 |
| 8 | 16.576 | 4.50 | 65.8 | 1.46450 |
| 9 | −68.174 | 0.10 | | |
| 10 | 34.470 | 2.75 | 54.6 | 1.51454 |
| 11 | −139.738 | (d11) | | |
| 12 | −65.912 | 2.20 | 25.5 | 1.73038 |
| 13 | −16.570 | 1.50 | 52.3 | 1.74810 |
| 14 | 36.691 | (d14) | | |
| 15 | 22.288 | 3.00 | 82.5 | 1.49782 |
| 16 | 81.627 | 0.30 | | |
| 17 | 33.611 | 2.00 | 25.5 | 1.80458 |
| 18 | 20.491 | 3.60 | | |
| 19 | −43.822 | 3.50 | 54.6 | 1.51454 |
| 20 | −20.698 | 0.10 | | |
| 21 | 77.825 | 7.00 | 82.5 | 1.49782 |
| 22 | −18.604 | 1.50 | 23.0 | 1.86074 |
| 23 | −38.417 | (Bf) | | |

| f | 18.400 | 24.000 | 27.300 |
|---|---|---|---|
| d6 | 18.461 | 5.351 | 0.300 |
| d11 | 4.326 | 6.557 | 7.846 |
| d14 | 8.551 | 6.816 | 5.813 |
| Bf | 42.382 | 46.845 | 49.423 |

Aspherical Surface (First Surface)

Reference Paraxial Curvature Radius: $r = 43.716$
Conical Coefficient: $k = 1$
Aspherical Surface Coefficient
$C_2 = 0.0$, $C_4 = 0.56396E^{-05}$, $C_6 = 0.31551E^{-08}$,
$C_8 = -0.69514E^{-11}$, $C_{10} = 0.14709E^{-13}$ Conditional Formula Corresponding Values $d_{23}/fw = 1.0299$, $|f_1| = 26.262$
$|AS-S|/fw = 0.11679$ ($\phi = 46.16$)
$f_2/fw = 1.576$, $|f_3|/fw = 1.644$
$f_4/fw = 2.283$, $d_{23}/L = 0.4791$

TABLE 6-continued

[Sixth Embodiment]

$d_{4p} = 7.0$, $|n_{3n}-n_{3p}| = 0.017721$
$\nu_{3p}-\nu_{3n} = -26.8$, $n_{4n}-n_{4p} = 0.36292$
$\nu_{4p}-\nu_{4n} = 59.5$

TABLE 7

[Seventh Embodiment]

$f = 18.4 \sim 27.3$, $2\omega = 101.4° \sim 76.4°$, $F_{NO} = 4.1$

| | r | d | ν | n |
|---|---|---|---|---|
| 1 | 66.171 | 2.50 | 40.9 | 1.79631 |
| 2 | 17.878 | 12.00 | | |
| 3 | −104.815 | 2.00 | 45.4 | 1.79668 |
| 4 | 47.251 | 9.44 | | |
| 5 | 48.413 | 3.00 | 27.8 | 1.69911 |
| 6 | 965.152 | (d6) | | |
| 7 | 32.559 | 1.50 | 35.7 | 1.90265 |
| 8 | 17.903 | 5.00 | 82.6 | 1.49782 |
| 9 | −46.322 | 0.10 | | |
| 10 | 24.920 | 2.00 | 49.0 | 1.53172 |
| 11 | 38.591 | (d11) | | |
| 12 | −45.932 | 2.20 | 25.5 | 1.73038 |
| 13 | −14.583 | 1.50 | 55.6 | 1.69680 |
| 14 | 111.545 | (d14) | | |
| 15 | 21.650 | 3.00 | 54.6 | 1.51454 |
| 16 | 65.101 | 0.30 | | |
| 17 | 27.419 | 2.00 | 25.5 | 1.80458 |
| 18 | 19.163 | 3.00 | | |
| 19 | 300.132 | 3.70 | 54.6 | 1.51454 |
| 20 | −28.447 | 0.10 | | |
| 21 | −472.607 | 7.50 | 67.9 | 1.59319 |
| 22 | −14.540 | 1.50 | 25.5 | 1.80458 |
| 23 | −41.540 | (Bf) | | |

| f | 18.400 | 24.000 | 27.300 |
|---|---|---|---|
| d6 | 17.683 | 7.495 | 3.887 |
| d11 | 4.892 | 8.343 | 10.354 |
| d14 | 9.792 | 6.341 | 4.330 |
| Bf | 44.471 | 50.862 | 54.586 |

Aspherical Surface (First Surface)

Reference Paraxial Curvature Radius: $r = 66.171$
Conical Coefficient: $k = 1$
Aspherical Surface Coefficient
$C_2 = 0.0$, $C_4 = 0.98928E^{-05}$, $C_6 = -0.63815E^{-08}$,
$C_8 = 0.86133E^{-11}$, $C_{10} = 0.98912E^{-16}$ Conditional Formula Corresponding Values $d_{23}/fw = 0.5132$, $|f_1| = 26.262$
$|AS-S|/fw = 0.12124$ ($\phi = 44.79$)
$f_2/fw = 2.2826$, $|f_3|/fw = 2.7174$
$f_4/fw = 2.1091$, $d_{23}/L = 0.32626$
$d_{4p} = 7.5$, $|n_{3n}-n_{3p}| = 0.03357$
$\nu_{3p}-\nu_{3n} = -30.1$, $n_{4n}-n_{4p} = 0.211392$
$\nu_{4p}-\nu_{4n} = 42.4$ As described above, the zoom lens in each embodiment discussed earlier is, as can be understood from the values of items in each embodiment, constructed of the respective lens groups each composed compactly of as small number of lens elements as possible. Nevertheless, the superwidening of the view angle in excess of 100 degrees at the wide angle end is attained. Particularly in the first embodiment, a super wide angle as large as 110 or greater degrees is actualized.

Next, the internal focusing systems shown in FIGS. 8A through 8C and 14A through 14C will be described in detail in accordance with the embodiments of the present invention.

The eighth to fourteenth embodiments shown in FIGS. 8A to 8C each provide the super wide angle zoom lens based on the principle construction of the first lens group G1 already explained with reference to FIGS. 15A, 15B, 16A and 16B and further adopting the internal focusing system (inner focus system or rear focus system). Obtained is, as in the first to seventh embodiments, a view angle exceeding 100° at the wide angle end in the respective embodiments.

Figures 8A, 8B, 8C:
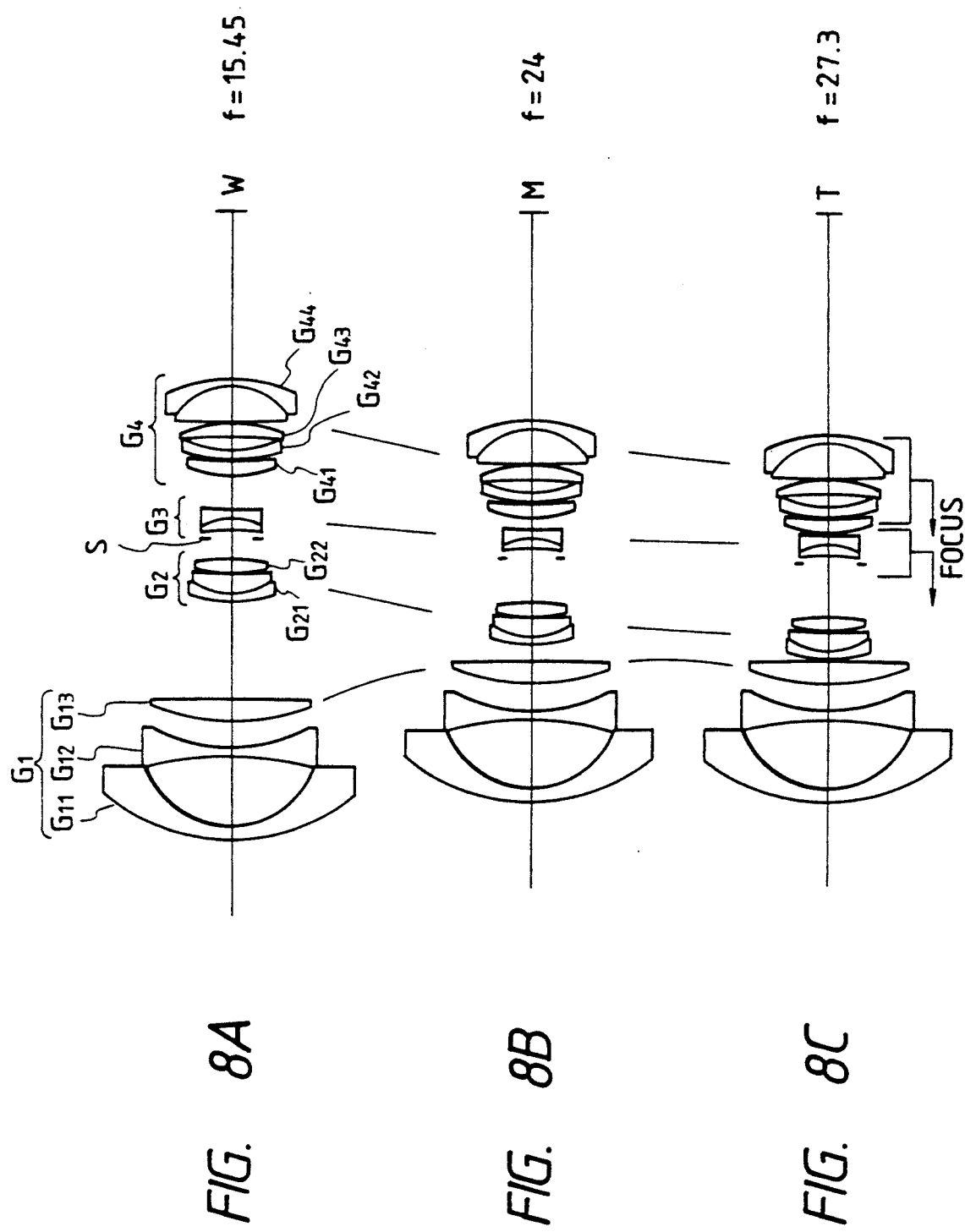
FIGS. 8A-8C are diagrams of lens constructions, each showing a lens placement at the wide angle end (shortest focal distance state), a displacement state of each lens group in the intermediate focal distance state and at the telephoto end (longest focal distance state) and also a lens group for focusing in an eighth embodiment of the present invention.
Figures 9A, 9B, 9C:
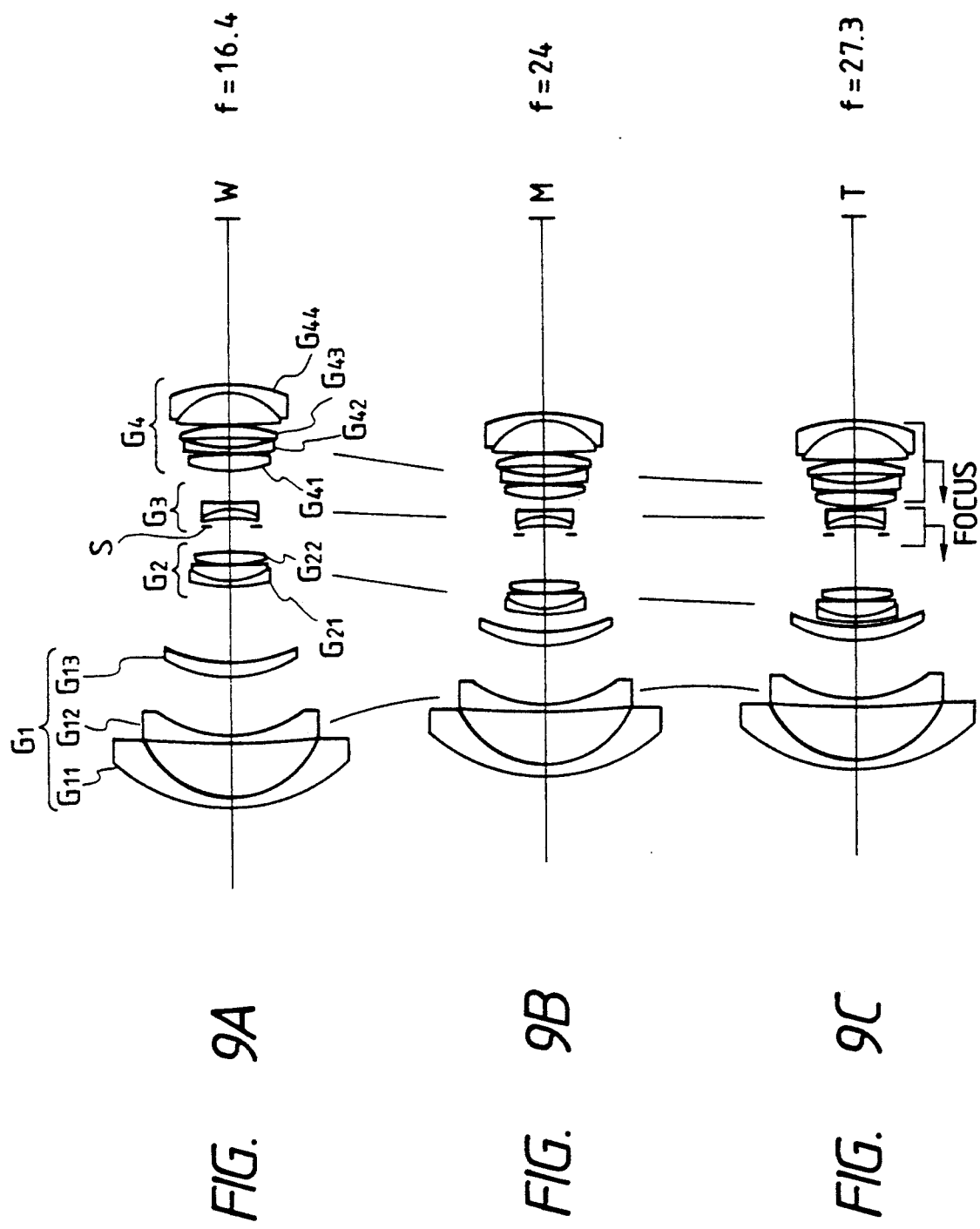
FIGS. 9A-9C are diagrams of lens constructions, each showing a lens placement at the wide angle end (shortest focal distance state), a displacement state of each lens group in the intermediate focal distance state and at the telephoto end (longest focal distance state) and also a lens group for focusing in a ninth embodiment of the present invention.

In each embodiment, as illustrated in FIGS. 8A-8C, the super wide angle zoom lens fundamentally, as in the same way with the first embodiment, consists of, sequentially from the object, a front group of a first lens group G1 exhibiting a negative refracting power and a rear group including a second lens group G2 exhibiting a positive refracting power, a third lens group G3 having the negative refracting power and a fourth lens group G4 exhibiting the positive refracting power. On the occasion of variable power from the wide angle end to a telephoto end, the first lens group G1 moves curvilinearly (non-linearly) to an image, while the second lens group G2, the third lens group G3 and the fourth lens group G4 respectively move almost straight (linearly) to the object with different moving quantities. An aerial spacing between the first lens group G1 and the second lens group G2 is reduced with the movements of the respective lens groups in association with the above-mentioned variable power from the wide angle end to the telephoto end. An aerial spacing between the second lens group G2 and the third lens group G3 increases, whereas an aerial spacing between the third lens group G3 and the fourth lens group is reduced.

On the occasion of focusing from an infinity object point to a short distance object point, in the eighth, ninth, tenth, eleventh, twelfth and fourteenth embodiments, the third and fourth lens groups G3, G4 independently move to the object. Whereas in the thirteenth embodiment, only the third lens group G3 moves to the image.

Note that in each embodiment, an aspherical surface is formed on a surface closest to the object in a negative meniscus lens (first lens element) G11 having a convex surface direction the object which is provided closest to the object in the first lens group G1. An aperture stop S is disposed closer to the object in the third lens group G3.

Given as follows are elucidations of two reasons why the above-described internal focusing system is adopted according to the present invention.

Firstly, in the conventional system for extending the first lens group G1 when effecting the focus, the first lens group G1 moves largely. Hence, the height of entering oblique ray incident on the first lens group G1 remarkably changes. As a result, the astigmatism and the field curvature awfully fluctuate. The chromatic aberration fluctuates correspondingly. Especially in the super wide angle zoom lens having a view angle in excess of 100°, the fluctuations in the astigmatism and the out-of-axis aberrations such as the field curvature and the chromatic aberration becomes conspicuous.

Secondly, in the system for extending the first lens group G1, in addition to the problem relative to the fluctuations in the out-of-axis aberrations, particularly the principal ray incident on the lens system passes through a position apart from the optical axis, so that a diameter of the front lens becomes larger in the short-distance object point focusing state than in the infinity object point focusing state. Concomitantly with this, increases both in the lens diameter of the first lens group G1 and in the thickness thereof are brought about. This conduces to a scale-up of the lens system as a whole. In consequence of this, if the lens system is restricted down to a size suitable for utilization, a lack of the marginal light quantity is unfavorably produced.

From the reasons elucidated above, the system for extending the first lens group G1 is hard to adopt as a focusing system in the super wide angle zoom lens of this invention in terms of the aberration compensation and the lens construction as well. Hence, it is desirable that the second positive lens group G2 or the lens group closer to the image than the second lens group be used as a focusing group.

In the case of the super wide angle zoom lens having the view angle of 100° or larger, however, the negative refracting power of the first lens group G1 is intensive, and hence a luminous flux exiting the first lens group G1 is largely diverged. For this reason, when performing the focus with the second lens group G2 serving as a focusing group, the second lens group G2 is moved along the optical axis. Then, the field curvature goes bad. Concomitantly with this, the spherical aberration and the axial chromatic aberration in addition to the chromatic aberration are deteriorated.

Therefore, in the internal focusing system of the present invention, on the occasion of focusing, the third lens group G3, or the third lens group G3 and the lens group disposed closer to the image than the third lens group is or are moved. The lens system of the super wide angle zoom lens are therefore formed in a compact shape, thereby making it possible to restrain the fluctuations in the aberrations during focusing down to a small level.

Especially, the aperture stop is positioned in the third lens group G3 or in the vicinity of the third lens group G3. Where the third lens group G3 serves as the focusing group, a degree of convergence of the axial luminous flux (coming from the infinity axial object point) incident on the third lens group G3 is smaller than in other lens groups; and a state approximate to afocal (parallel) state is developed. For this reason, during focusing, the fluctuations in the axial aberrations, especially in the spherical aberration can be restrained very small. Concurrently with this, the third lens group G3 provided in the proximity to the aperture stop or provided to include the aperture stop is moved during focusing. It is therefore feasible to minimize the fluctuations especially in the field curvature among the out-of-axis aberrations during focusing.

However, if a moving quantity of the third lens group G3 during focusing is large depending on an image forming magnification of the third lens group G3, or when increasing a degree of freedom of compensating the aberrations of the entire system during focusing, the other lens group closer to the image than the third lens group G3 is utilized for focusing together with the third lens group. It is desirable that these lens groups be independently moved during the focusing process. The fluctuations in the field curvature due to focusing are compensated by utilizing the effect obtained depending on a moving mode of floating or the like of each lens group during such a focusing operation. A much nicer short distance performance can be thereby drawn out.

For drawing the effects based on the internal focusing system of this invention at the maximum, it is desirable that the following condition (13) be satisfied:

$$\beta_w \leq -1.1, \text{or } \beta_w \leq -0.9 \tag{13}$$

where $\beta_w$ : the image forming magnification at the wide angle end.

As discussed above, desirably in the present invention, the third lens group G3, or the lens group closer to the image than the third lens group G3 is moved in the optical-axis direction with this group serving as a focusing group during focusing. At this time, as prescribed in the condition (13), more desirably focusing is effected at the optimum image forming magnification in the focusing group.

The condition (13) prescribes the optimum synthetic image forming magnification at the wide angle end of the lens group incorporating a focusing function. In other words, this implies that it is not preferable for the synthetic image forming magnification of all the lens groups employed for focusing at the wide angle end to fall within a range of values more than $-1.1$ but less than $-0.9$. It is because the moving quantity of the focusing group during the focusing process increases so much at the intra-range image forming magnification of the focusing group, and unfavorably the fluctuations in the aberrations especially in the field curvature also augment. With the increased moving quantity of the focusing group, it is necessary to secure a large aerial spacing for focusing. This leads to a scale-up of the whole lens system. Besides, undesirably an enough back focal distance can not be secured. Note that in the embodiments of the present invention, the third lens group G3, or the third lens group G3 and the lens group (e.g., the fourth lens group G4) closer to the image than the third lens group G3 serve(s) as the focusing group(s). However, the third lens group G3 is divided into subgroups during focusing. These divided subgroups may be independently moved.

Next, the explanations will be given according to the respective embodiments.

The super wide angle zoom lens in the eighth embodiment according to the present invention has a focal distance $f=15.5$ to 27.3, a view angle $2\omega=111.2°$ to 76.4°, and an F-number of 4.1. The following is a concrete lens configuration of the eighth embodiment. As obvious from FIG. 8, the first negative lens group G1 is, though basically similar to that of the first embodiment, composed of a negative meniscus lens (first lens element) G11 having its convex surface directed to the object, a double-concave negative lens (second lens element) G12 and a positive lens (third lens element) G13 having its surface exhibiting a higher curvature and directed to the object. The second positive lens group G2 comprises: a joint positive lens (fourth lens element) G21 formed of a negative meniscus lens having its convex surface directed to the object and a positive lens joined thereto and having its surface exhibiting a high curvature and directed to the object; and a double-convex positive lens (fifth lens element) G22. The third negative lens group G3 is constructed of a joint negative lens (sixth lens element) consisting of a positive meniscus lens having its convex surface directed to the image and a negative lens joined thereto and having its surface exhibiting a higher curvature and directed to the image. The fourth positive lens group G4 is composed of: a positive meniscus lens (seventh lens element) G41 having its convex surface directed to the object; a negative meniscus lens (eighth lens element) G42 having its convex surface directed to the object; a positive meniscus lens (ninth lens element) G43 having its convex surface directed to the image; and a joint positive lens (tenth lens element) G45 consisting of a positive lens having a surface exhibiting a higher curvature and directed to the image and a negative meniscus lens joined thereto and having its convex surface directed to the image.

In the case of focusing from the infinity to the short distance, the third lens group G3 and the fourth lens group G4 respectively move toward the object.

Next, the super wide angle zoom lens in the ninth embodiment of the present invention has a focal distance $f=16.4$ to 27.3, a view angle $2\omega=108.2°$ to 76.4°, and an F-number of 4.1. The concrete lens configuration in the ninth embodiment is basically, as illustrated in FIG. 2, the same with the second embodiment. The first and fourth lens groups have constructions different from those in the eighth embodiment. In the first lens group G1, however, the second negative lens element G12 is composed of a negative meniscus lens having its convex surface directed to the object. The third positive lens element G13 consists of a positive meniscus lens the convex surface of which is directed to the object. In the fourth positive lens group G4 also, the positive lens (seventh lens element) G41 closest to the object is composed of a double-convex positive lens.

Note that in the case of focusing from the infinity to the short distance, the third lens group G3 and the fourth lens group G4 respectively move toward the object.

Figures 10A, 10B, 10C:
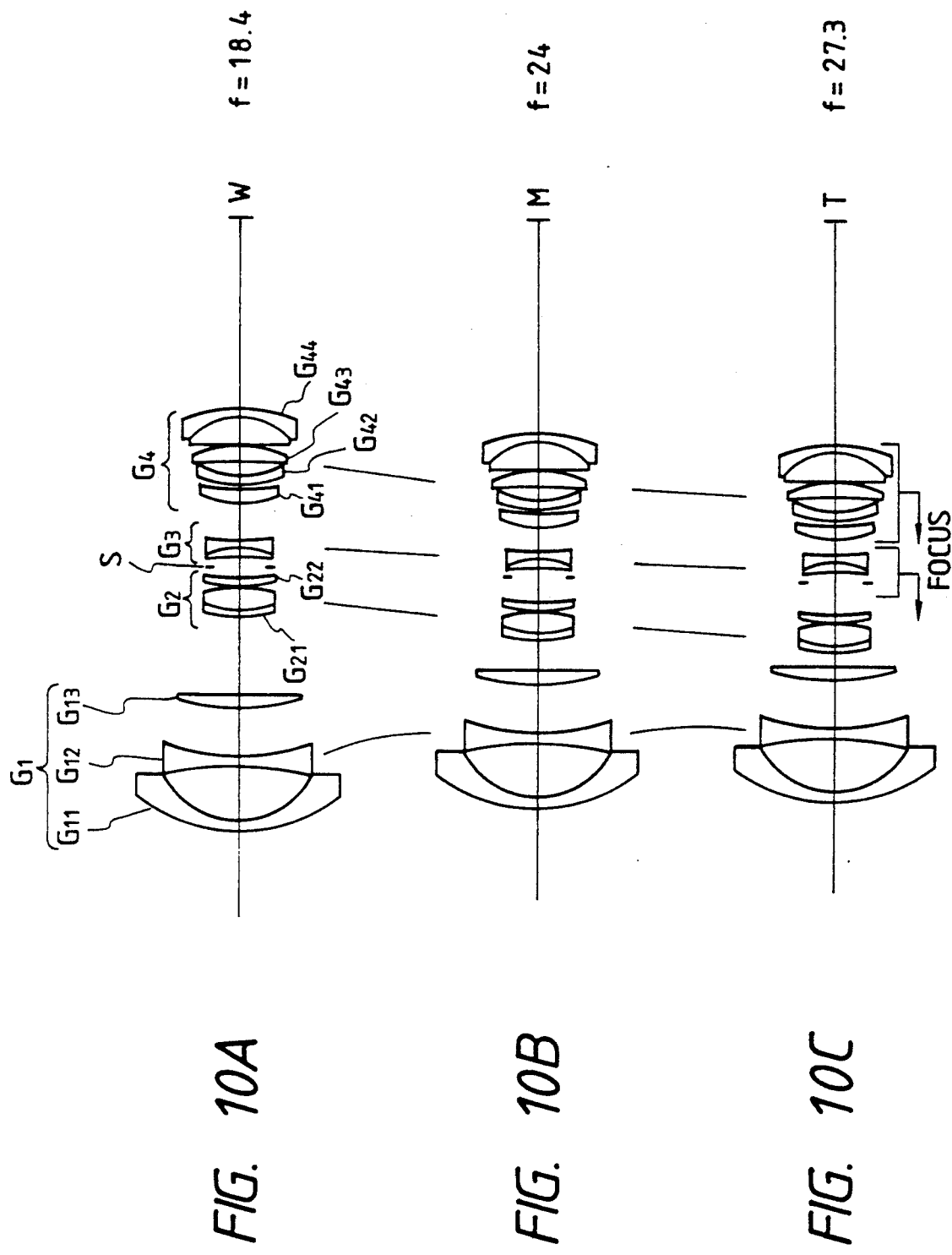
FIGS. 10A-10C are diagrams of lens constructions, each showing a lens placement at the wide angle end (shortest focal distance state), a displacement state of each lens group in the intermediate focal distance state and at the telephoto end (longest focal distance state) and also a lens group for focusing in a tenth embodiment of the present invention.
Figures 11A, 11B, 11C:
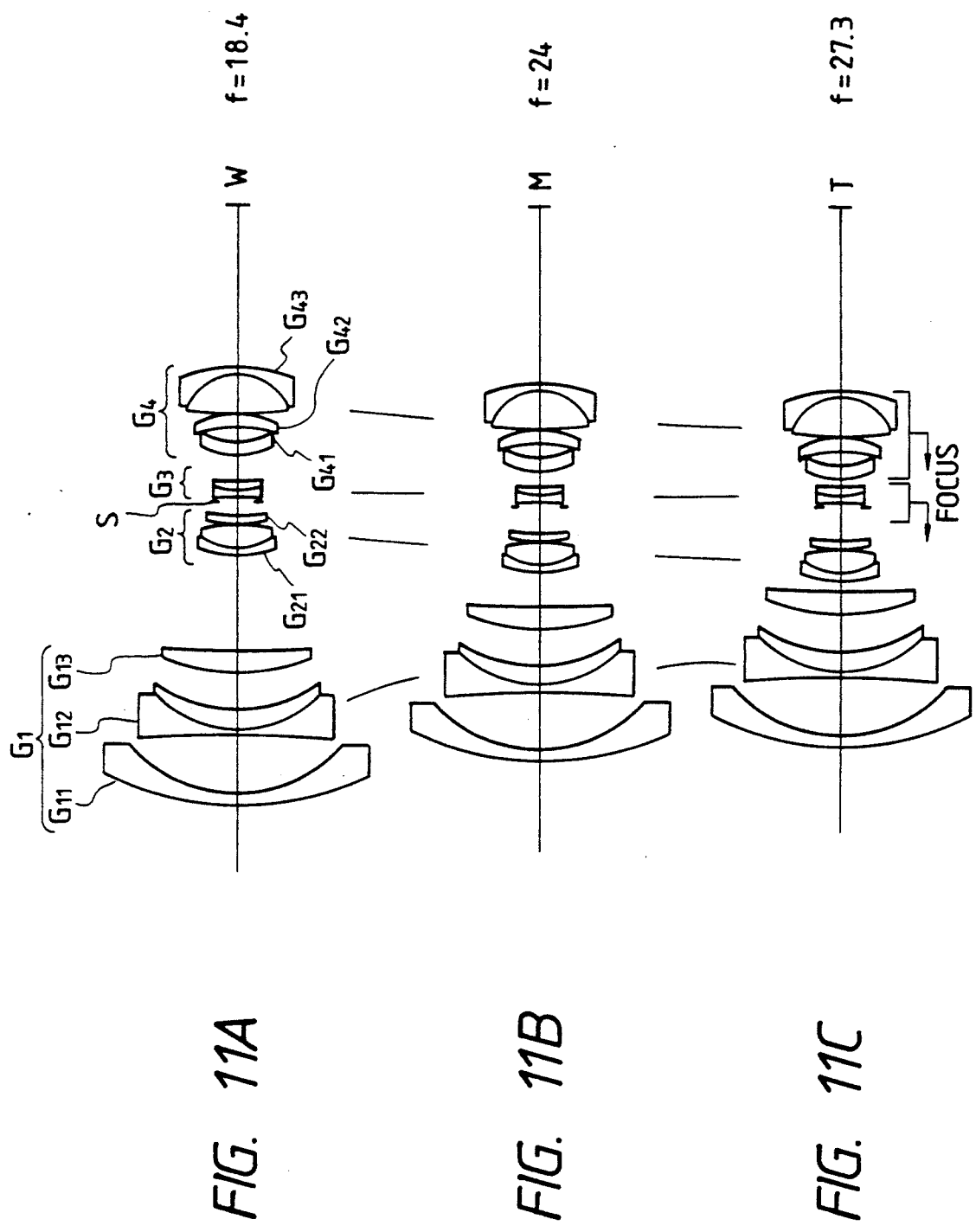
FIGS. 11A-11C are diagrams of lens constructions, each showing a lens placement at the wide angle end (shortest focal distance state), a displacement state of each lens group in the intermediate focal distance state and at the telephoto end (longest focal distance state) and also a lens group for focusing in an eleventh embodiment of the present invention.

The super wide angle zoom lens in the tenth embodiment of the present invention has a focal distance $f=18.4$ to 27.3, a view angle $2\omega=101.2°$ to 76.4°, and an F-number of 4.1. The concrete lens configuration in the tenth embodiment is basically, as illustrated in FIG. 10, the same with the third embodiment. The first and second lens groups have constructions different from those in the eighth embodiment. The third positive lens element G13 in the first lens group G1 consists of a positive meniscus lens having its convex surface directed to the object. In the second lens group G2, the positive lens of the joint positive lens (fourth lens element) G21 is composed of a double-convex lens. The positive lens closer to the image than this joint positive lens (fourth lens element) G21 is constructed of a meniscus lens.

Note that in the case of focusing from the infinity to the short distance, the third lens group G3 and the fourth lens group G4 respectively move toward the object.

Next, the super wide angle zoom lens in the eleventh embodiment of this invention has a focal distance $f=18.4$ to 27.3, a view angle $2\omega=101.5°$ to 76.4°, and an F-number of 4.1 to 4.6. The concrete lens configuration in the eleventh embodiment is basically, as illustrated in FIG. 22, the same with the zoom lens in the fourth embodiment. The first lens group G1, the third lens group G3 and the fourth lens group G4 have constructions different from those in the tenth embodiment. The second negative lens element G12 in the first lens group G1 consists of a double-concave negative lens and a positive meniscus lens joined thereto and having its convex surface directed to the object. The third lens group G3 is composed of a joint negative lens in which the negative and positive lenses are joined in this sequence. The fourth lens group G4 is constructed of totally four lenses, i.e., a meniscus lens (seventh lens element) G41 having its convex surface directed to the object and exhibiting an extremely small negative refracting power, a positive meniscus lens (eighth lens element) G42 having its convex surface directed to the image, and a joint positive lens (ninth lens element) G43 including a positive lens having a higher curvature surface directed to the image and a negative meniscus lens joined thereto and having its convex surface directed to the image.

Note that in the case of focusing from the infinity to the short distance, the third lens group G3 and the fourth lens group G4 respectively move toward the object.

Figures 12A, 12B, 12C:
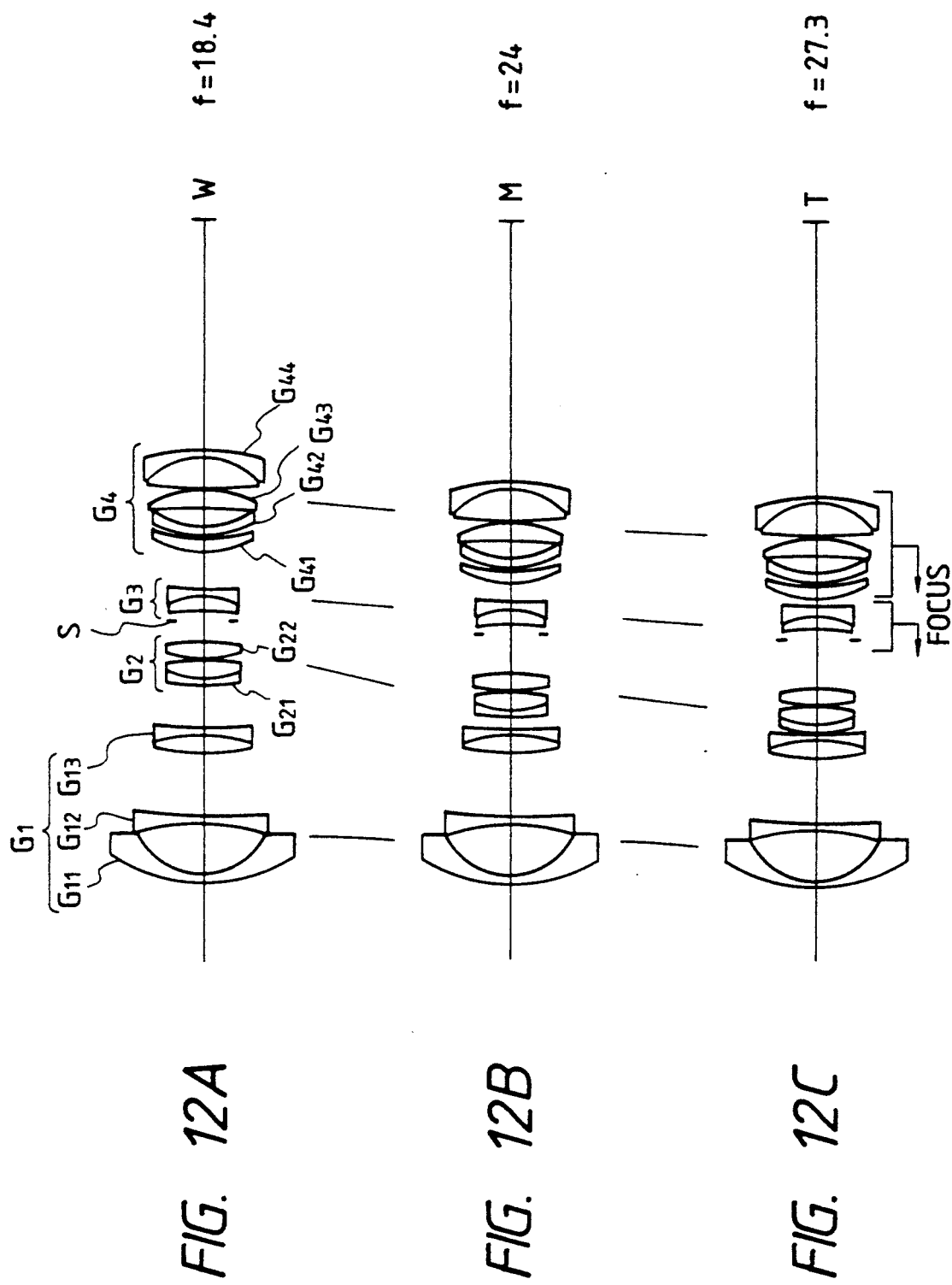
FIGS. 12A-12C are diagrams of lens constructions, each showing a lens placement at the wide angle end (shortest focal distance state), a displacement state of each lens group in the intermediate focal distance state and at the telephoto end (longest focal distance state) and also a lens group for focusing in a twelfth embodiment of the present invention.
Figure 14A:
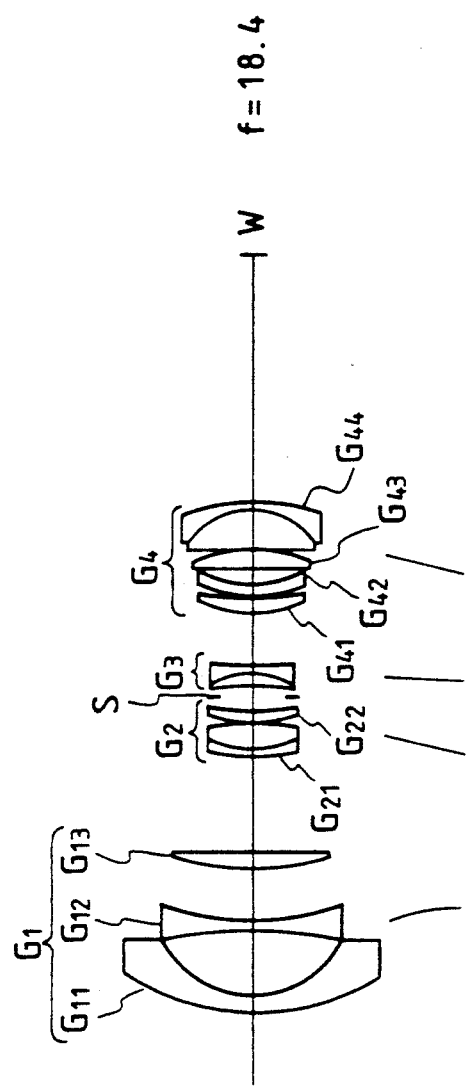
FIGS. 14A-14C are diagrams of lens constructions, each showing a lens placement at the wide angle end (shortest focal distance state), a displacement state of each lens group in the intermediate focal distance state and at the telephoto end (longest focal distance state) and also a lens group for focusing in a fourteenth embodiment of the present invention.
Figure 14B:
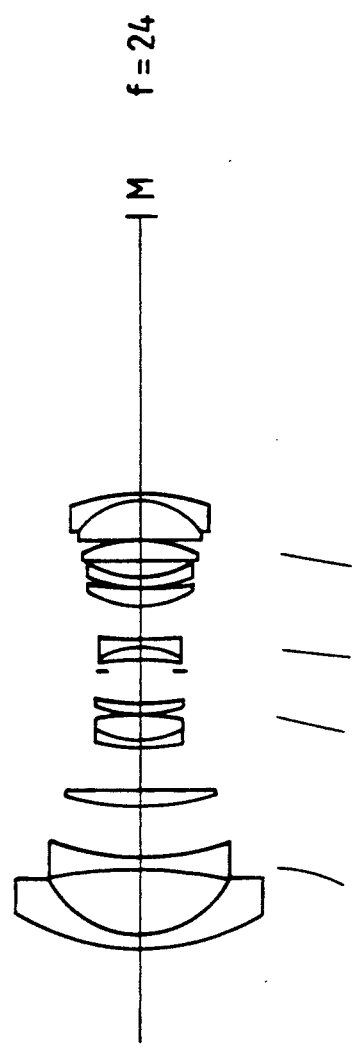
Figure 14C:
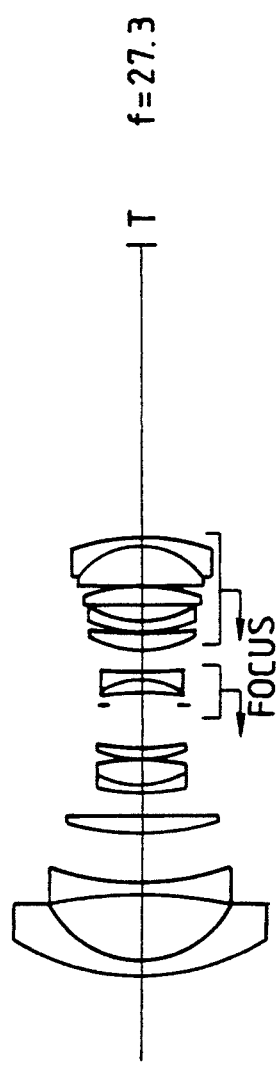

The super wide angle zoom lens in the twelfth embodiment of this invention has a focal distance f=18.4 to 27.3, a view angle 2ω=101.3° to 76.4°, and an F-number of 4.6. The concrete lens configuration in the twelfth embodiment is, as depicted in FIG. 12, the same with the fifth embodiment. Further, the lens construction is basically is the same with the zoom lens in the eighth embodiment with respect to the third and fourth lens groups G3, G4. However, the first and second lens groups G1, G2 are different in their configurations. To be specific, in the first lens group G1, the second negative lens element G12 is composed of a negative lens having a higher curvature surface directed to the object. The third lens element G13 consists of a joint lens including a double-convex positive lens and a negative lens joined thereto and having a higher curvature surface directed to the object. The positive lens of the joint positive lens element G21 in the second lens group G2 assumes a double-convex shape.

Note that in the case of focusing from the infinity to the short distance, the third lens group G3 and the fourth lens group G4 respectively move toward the object.

The super wide angle zoom lens in the thirteenth embodiment of the present invention has a focal distance f=18.4 to 27.3, a view angle 2ω=101.4° to 76.4°, and an F-number of 4.1. The concrete lens configuration in the thirteenth embodiment is basically, as depicted in FIG. 13, the same with the zoom lens in the sixth embodiment. A different point from the eighth embodiment is, however, such an arrangement that in the second lens group G2, the positive lens of the joint lens element (fourth lens element) G21 in the second lens group G2 is constructed of a double-convex positive lens.

Note that in the case of focusing from the infinity to the short distance, the third lens group G3 and the fourth lens group G4 respectively move toward the object.

The super wide angle lens in the fourteenth embodiment of this invention has a focal distance f=18.4 to 27.3, a view angle 2ω=101.4° to 76.4°, and an F-number of 4.1. The concrete lens configuration in the fourteenth embodiment is basically, as illustrated in FIG. 14, the same with the zoom lens in the seventh embodiment. A different point from the eighth embodiment is, however, such an arrangement that in the second lens group G2, however, the positive lens of the joint positive lens (fourth lens element) G21 consists of a double-convex lens. A positive lens G22 closer to the image than this joint positive lens G21 is composed of a meniscus lens.

Note that in the case of focusing from the infinity to the short distance, the third lens group G3 and the fourth lens group G4 respectively move toward the object. The following is a description of values of items in the eighth through fourteenth embodiments of the present invention and condition corresponding numerical values which are given in sequence.

However, the leftmost numeral indicates the order from the object, r is the radius of curvature of the lens surface, d is the lens surface spacing, ν is the Abbe number, n is the refractive index in the d-line (λ=587.6 nm), f is the focal distance of the whole system, $F_{NO}$ is the F-number, $\phi$ is the effective diameter of the aspherical surface lens, DO is the distance from the object to be photographed to the first surface of the lens, and β is the short distance photographing magnification. The aspherical surface indicated by the values of items is expressed such as:

$$X(h) = (h^2/r)/[1+(1-Kh^2/r^2)^{\frac{1}{2}}] + C_2 h^2 + C_4 h^4 + C_6 h^6 + C_8 h^8 + C_{10} h^{10}$$

where X(h) is the distance along the optical-axis direction from the nodal plane of the vertex of each aspherical surface at the height y in the vertical direction from the optical axis, r is the reference paraxial curvature radius, k is the conical coefficient, Cn is the n-order aspherical surface coefficient, and $E^{-n}$ at the left end in the n-order aspherical surface coefficient Cn indicates $10^{-n}$.

TABLE 8

[Eighth Embodiment]

f = 15.5~27.3, 2ω = 111.2°~76.4°, $F_{NO}$ = 4.1

| | r | d | ν | n |
|---|---|---|---|---|
| 1 | 69.600 | 2.50 | 45.4 | 1.79668 |
| 2 | 20.275 | 15.50 | | |
| 3 | −80.398 | 2.00 | 45.4 | 1.79668 |
| 4 | 37.112 | 6.00 | | |
| 5 | 46.526 | 5.30 | 35.2 | 1.74950 |
| 6 | −815.420 | (d₆) | | |
| 7 | 26.848 | 1.60 | 33.9 | 1.80384 |
| 8 | 14.972 | 4.50 | 65.8 | 1.46450 |
| 9 | 97.280 | 0.20 | | |
| 10 | 38.990 | 3.00 | 41.4 | 1.57501 |
| 11 | −50.400 | (d₁₁) | | |
| 12 | −36.378 | 2.30 | 28.3 | 1.72825 |
| 13 | −13.883 | 1.50 | 55.6 | 1.69680 |
| 14 | 128.521 | (d₁₄) | | |
| 15 | 24.647 | 3.00 | 54.6 | 1.51454 |
| 16 | 73.993 | 0.50 | | |
| 17 | 41.947 | 2.00 | 26.1 | 1.78470 |
| 18 | 24.197 | 3.20 | | |
| 19 | −103.008 | 3.00 | 67.9 | 1.59319 |
| 20 | −28.765 | 0.10 | | |
| 21 | 217.566 | 8.00 | 65.4 | 1.60300 |
| 22 | −15.505 | 2.00 | 23.0 | 1.86074 |
| 23 | −30.196 | (Bf) | | |

| f | 15.450 | 24.000 | 27.300 |
|---|---|---|---|
| DO | ∞ | ∞ | ∞ |
| d6 | 21.412 | 3.704 | 0.398 |
| d11 | 6.575 | 11.685 | 13.610 |
| d14 | 7.671 | 2.561 | 0.636 |
| Bf | 38.211 | 47.501 | 51.002 |
| β | −0.033 | −0.033 | −0.033 |
| DO | 446.493 | 701.446 | 792.896 |
| d6 | 21.412 | 3.704 | 0.398 |
| d11 | 6.575 | 10.640 | 12.031 |
| d14 | 7.117 | 2.445 | 1.000 |
| Bf | 38.765 | 48.662 | 52.217 |

Aspherical Surface (First Surface)

Reference Paraxial Curvature Radius: r = 69.600
Conical Coefficient: k = 1
Aspherical Surface Coefficient
$C_2 = 0.0$, $C_4 = 0.79789E^{-05}$, $C_6 = -0.39445E^{-08}$,
$C_8 = 0.24046E^{-11}$, $C_{10} = 0.31560E^{-14}$ Conditional Formula Corresponding Values $d_{23}/f_w = 0.388$, $|f_1| = 24.942$
$|AS-S|/f_w = 0.25367$ ($\phi = 55.66$)
$\beta_w = -0.6702$, $f_2/f_w = 2.330$
$|f_3|/f_w = 2.773$, $f_4/f_w = 2.307$
$d_{23}/L = 0.192$, $d_{4p} = 8.0$
$|n_{3n}-n_{3p}| = 0.03145$, $\nu_{3p}-\nu_{3n} = -27.3$
$n_{4n}-n_{4p} = 0.2577$, $\nu_{4p}-\nu_{4n} = 42.4$

TABLE 9

[Ninth Embodiment]

$f = 16.4 \sim 27.3$, $2\omega = 108.2° \sim 76.4°$, $F_{NO} = 4.1$

| | r | d | ν | n |
|---|---|---|---|---|
| 1 | 56.830 | 2.50 | 45.4 | 1.79668 |
| 2 | 22.588 | 13.00 | | |
| 3 | 203.239 | 2.00 | 43.4 | 1.84042 |
| 4 | 29.159 | 14.20 | | |
| 5 | 29.712 | 3.50 | 25.5 | 1.80458 |
| 6 | 37.859 | (d$_6$) | | |
| 7 | 35.294 | 1.30 | 33.9 | 1.80384 |
| 8 | 16.316 | 4.00 | 70.4 | 1.48749 |
| 9 | 160.741 | 0.20 | | |
| 10 | 35.749 | 3.00 | 38.0 | 1.60342 |
| 11 | −53.604 | (d$_{11}$) | | |
| 12 | −30.014 | 2.50 | 27.8 | 1.69911 |
| 13 | −12.979 | 1.50 | 60.0 | 1.64000 |
| 14 | 141.313 | (d$_{14}$) | | |
| 15 | 29.674 | 3.50 | 58.9 | 1.51823 |
| 16 | −229.981 | 0.10 | | |
| 17 | 92.266 | 2.00 | 28.6 | 1.79504 |
| 18 | 28.825 | 2.50 | | |
| 19 | −150.071 | 3.00 | 65.4 | 1.60300 |
| 20 | −34.756 | 0.10 | | |
| 21 | 205.091 | 8.00 | 57.5 | 1.67025 |
| 22 | −15.837 | 1.80 | 23.0 | 1.86074 |
| 23 | −34.904 | (Bf) | | |

| f | 16.400 | 24.000 | 27.300 |
|---|---|---|---|
| D0 | ∞ | ∞ | ∞ |
| d6 | 18.553 | 4.145 | 0.916 |
| d11 | 8.282 | 13.087 | 15.115 |
| d14 | 7.722 | 2.917 | 0.888 |
| Bf | 39.789 | 47.798 | 51.178 |
| β | −0.033 | −0.033 | −0.033 |
| D0 | 474.300 | 695.693 | 786.445 |
| d6 | 18.553 | 4.145 | 0.916 |
| d11 | 8.276 | 11.785 | 13.299 |
| d14 | 7.127 | 3.035 | 1.493 |
| Bf | 40.389 | 48.979 | 52.388 |

Aspherical Surface (First Surface)

Reference Paraxial Curvature Radius: r = 56.830
Conical Coefficient: k = 1
Aspherical Surface Coefficient
$C_2 = 0.0$, $C_4 = 0.41777E^{-05}$, $C_6 = 0.36563E^{-09}$,
$C_8 = -0.98160E^{-12}$, $C_{10} = 0.21972E^{-14}$ Conditional Formula Corresponding Values $d_{23}/f_w = 0.8659$, $|f_1| = 24.941$
$|AS-S|/f_w = 0.1800$ ($\phi = 55.73$)
$\beta_w = -0.6557$, $f_2/f_w = 2.195$
$|f_3|/f_w = 2.612$, $f_4/f_w = 2.174$
$d_{23}/L = 0.4034$, $d_{4p} = 8.0$
$|n_{3n}-n_{3p}| = 0.05911$, $\nu_{3p}-\nu_{3n} = -32.2$
$n_{4n}-n_{4p} = 0.19049$, $\nu_{4p}-\nu_{4n} = 34.5$

TABLE 10

[Tenth Embodiment]

$f = 18.4 \sim 27.3$, $2\omega = 101.2° \sim 76.4°$, $F_{NO} = 4.1$

| | r | d | ν | n |
|---|---|---|---|---|
| 1 | 49.794 | 2.50 | 40.9 | 1.79631 |
| 2 | 17.702 | 12.00 | | |
| 3 | −83.638 | 2.00 | 45.4 | 1.79668 |
| 4 | 47.407 | 10.70 | | |
| 5 | 50.613 | 3.00 | 27.8 | 1.69911 |
| 6 | 511.053 | (d$_6$) | | |
| 7 | 28.622 | 1.50 | 35.7 | 1.90265 |
| 8 | 17.512 | 5.00 | 65.8 | 1.46450 |
| 9 | −37.213 | 0.10 | | |
| 10 | 28.185 | 2.00 | 54.6 | 1.51454 |
| 11 | 54.221 | (d$_{11}$) | | |
| 12 | −50.475 | 2.00 | 25.5 | 1.73038 |
| 13 | −17.366 | 1.50 | 52.3 | 1.74810 |
| 14 | 90.015 | (d$_{14}$) | | |
| 15 | 21.344 | 3.00 | 60.3 | 1.51835 |
| 16 | 47.510 | 1.00 | | |
| 17 | 25.698 | 2.00 | 25.5 | 1.80458 |
| 18 | 19.106 | 3.20 | | |
| 19 | −108.848 | 3.50 | 54.6 | 1.51454 |
| 20 | −24.560 | 0.10 | | |
| 21 | −1489.718 | 6.50 | 60.6 | 1.60311 |
| 22 | −13.865 | 1.50 | 25.5 | 1.80458 |
| 23 | −34.842 | (Bf) | | |

| f | 18.400 | 24.000 | 27.300 |
|---|---|---|---|
| D0 | ∞ | ∞ | ∞ |
| d6 | 17.323 | 6.811 | 2.987 |
| d11 | 4.870 | 7.898 | 9.649 |
| d14 | 8.112 | 5.084 | 3.333 |
| Bf | 42.968 | 48.575 | 51.818 |
| β | −0.033 | −0.033 | −0.033 |
| D0 | 538.530 | 700.241 | 786.818 |
| d6 | 17.323 | 6.811 | 2.987 |
| d11 | 4.869 | 6.528 | 7.240 |
| d14 | 7.414 | 4.932 | 3.889 |
| Bf | 43.668 | 50.098 | 53.671 |

Aspherical Surface (First Surface)

Reference Paraxial Curvature Radius: r = 49.794
Conical Coefficient: k = 1
Aspherical Surface Coefficient
$C_2 = 0.0$, $C_4 = 0.89224E^{-05}$, $C_6 = -0.47558E^{-08}$,
$C_8 = 0.82136E^{-11}$, $C_{10} = 0.33662E^{-14}$ Conditional Formula Corresponding Values $d_{23}/f_w = 0.5816$, $|f_1| = 26.262$
$|AS-S|/f_w = 0.10589$ ($\phi = 43.33$)
$\beta_w = -0.7518$, $f_2/f_w = 1.9565$
$|f_3|/f_w = 2.2581$, $f_4/f_w = 2.0842$
$d_{23}/L = 0.3543$, $d_{4p} = 6.5$
$|n_{3n}-n_{3p}| = 0.017721$, $\nu_{3p}-\nu_{3n} = -26.8$
$n_{4n}-n_{4p} = 0.20147$, $\nu_{4p}-\nu_{4n} = 35.1$

TABLE 11

[Eleventh Embodiment]

$f = 18.4 \sim 27.3$, $2\omega = 101.5° \sim 76.4°$, $F_{NO} = 4.07 \sim 4.60$

| | r | d | ν | n |
|---|---|---|---|---|
| 1 | 90.937 | 2.50 | 45.4 | 1.79668 |
| 2 | 31.382 | 13.00 | | |
| 3 | −278.297 | 1.50 | 43.4 | 1.84042 |
| 4 | 27.974 | 4.00 | 49.5 | 1.77279 |
| 5 | 30.032 | 8.01 | | |
| 6 | 43.281 | 4.70 | 25.5 | 1.80458 |
| 7 | 215.269 | (d$_7$) | | |
| 8 | 22.602 | 1.50 | 27.6 | 1.75520 |
| 9 | 12.892 | 5.00 | 65.8 | 1.46450 |
| 10 | −42.867 | 0.10 | | |
| 11 | 27.354 | 2.00 | 70.0 | 1.51860 |
| 12 | 41.149 | (d$_{12}$) | | |
| 13 | −55.604 | 1.50 | 55.6 | 1.69680 |
| 14 | 16.631 | 2.00 | 25.5 | 1.73038 |
| 15 | 66.434 | (d$_{15}$) | | |
| 16 | 17.545 | 3.00 | 25.5 | 1.73038 |
| 17 | 17.053 | 3.00 | | |
| 18 | −27.216 | 3.00 | 58.5 | 1.65160 |
| 19 | −19.139 | 0.10 | | |
| 20 | 97.697 | 9.00 | 65.4 | 1.60300 |
| 21 | −11.988 | 1.50 | 25.5 | 1.73038 |
| 22 | −33.438 | (Bf) | | |

| f | 18.399 | 24.000 | 27.300 |
|---|---|---|---|
| D0 | ∞ | ∞ | ∞ |
| d7 | 20.808 | 7.653 | 2.694 |
| d12 | 3.914 | 6.449 | 7.934 |
| d15 | 5.867 | 3.333 | 1.847 |
| Bf | 35.003 | 39.227 | 41.703 |
| β | −0.033 | −0.033 | −0.033 |
| D0 | 533.258 | 693.544 | 780.668 |
| d7 | 20.808 | 7.653 | 2.694 |
| d12 | 3.908 | 4.835 | 5.121 |
| d15 | 5.246 | 3.479 | 2.785 |
| Bf | 35.630 | 40.693 | 43.578 |

Aspherical Surface (First Surface)

Reference Paraxial Curvature Radius: r = 90.937
Conical Coefficient: k = 1

TABLE 11-continued

[Eleventh Embodiment]

Aspherical Surface Coefficient
$C_2 = 0.0$, $C_4 = 0.41120E^{-05}$, $C_6 = -0.10463E^{-08}$,
$C_8 = 0.26766E^{-12}$, $C_{10} = 0.94821E^{-15}$ Conditional Formula Corresponding Values $d_{23}/f_w = 0.4352$, $|f_1| = 33.000$
$|AS-S|/f_w = 0.12817$ ($\phi = 55.75$)
$\beta_w = -0.7116$, $f_2/f_w = 1.9293$
$|f_3|/f_w = 2.5000$, $f_4/f_w = 1.9567$
$d_{23}/L = 0.2376$, $d_{4p} = 9.0$
$|n_{3n}-n_{3p}| = 0.033578$, $\nu_{3p}-\nu_{3n} = -30.1$
$n_{4n}-n_{4p} = 0.12738$, $\nu_{4p}-\nu_{4n} = 39.9$

TABLE 12

[Twelfth Embodiment]

$f = 18.4 \sim 27.3$, $2\omega = 101.3° \sim 76.4°$, $F_{NO} = 4.6$

| | r | d | ν | n |
|---|---|---|---|---|
| 1 | 48.498 | 1.80 | 39.8 | 1.86994 |
| 2 | 15.829 | 11.00 | | |
| 3 | −48.419 | 1.50 | 43.3 | 1.84042 |
| 4 | 479.543 | 13.69 | | |
| 5 | 42.228 | 4.30 | 27.8 | 1.69911 |
| 6 | −30.868 | 1.30 | 35.7 | 1.90265 |
| 7 | 218.115 | (d₇) | | |
| 8 | 44.084 | 1.50 | 33.9 | 1.80384 |
| 9 | 18.238 | 4.00 | 65.7 | 1.46450 |
| 10 | −110.754 | 0.10 | | |
| 11 | 36.956 | 4.00 | 54.6 | 1.51454 |
| 12 | −48.126 | (d₁₂) | | |
| 13 | −36.432 | 3.00 | 26.1 | 1.78470 |
| 14 | −16.787 | 1.50 | 52.3 | 1.74810 |
| 15 | 164.469 | (d₁₅) | | |
| 16 | 21.601 | 2.50 | 60.2 | 1.51835 |
| 17 | 37.689 | 1.00 | | |
| 18 | 23.788 | 2.00 | 25.5 | 1.80458 |
| 19 | 19.149 | 3.70 | | |
| 20 | −285.297 | 4.00 | 54.6 | 1.51454 |
| 21 | −23.565 | 0.20 | | |
| 22 | 115.249 | 7.00 | 82.5 | 1.49782 |
| 23 | −16.557 | 1.50 | 25.5 | 1.80458 |
| 24 | −43.420 | (Bf) | | |

| f | 18.400 | 24.000 | 27.300 |
|---|---|---|---|
| D0 | ∞ | ∞ | ∞ |
| d7 | 9.147 | 2.641 | 0.502 |
| d12 | 6.616 | 10.597 | 12.842 |
| d15 | 8.058 | 4.076 | 1.832 |
| Bf | 50.193 | 57.567 | 61.723 |
| β | −0.033 | −0.033 | −0.033 |
| D0 | 546.246 | 705.614 | 792.210 |
| d7 | 9.147 | 2.641 | 0.502 |
| d12 | 6.607 | 9.414 | 11.227 |
| d15 | 7.135 | 3.944 | 2.370 |
| Bf | 51.125 | 58.882 | 62.799 |

Aspherical Surface (First Surface)

Reference Paraxial Curvature Radius: $r = 48.498$
Conical Coefficient: $k = 1$
Aspherical Surface Coefficient
$C_2 = 0.0$, $C_4 = 0.15694E^{-04}$, $C_6 = -0.11607E^{-07}$,
$C_8 = 0.18735E^{-10}$, $C_{10} = 0.28146E^{-13}$

TABLE 13

[Thirteenth Embodiment]

$f = 18.4 \sim 27.3$, $2\omega = 101.4° \sim 76.4°$, $F_{NO} = 4.1$

| | r | d | ν | n |
|---|---|---|---|---|
| 1 | 43.716 | 2.00 | 39.8 | 1.86994 |
| 2 | 18.989 | 14.00 | | |
| 3 | −86.359 | 1.60 | 43.4 | 1.84042 |
| 4 | 75.253 | 18.95 | | |
| 5 | 95.685 | 3.00 | 27.8 | 1.69911 |
| 6 | 735.641 | (d₆) | | |
| 7 | 24.693 | 1.50 | 35.7 | 1.90265 |
| 8 | 16.576 | 4.50 | 65.8 | 1.46450 |
| 9 | −68.174 | 0.10 | | |

TABLE 13-continued

[Thirteenth Embodiment]

| | | | | |
|---|---|---|---|---|
| 10 | 34.470 | 2.75 | 54.6 | 1.51454 |
| 11 | −139.738 | (d₁₁) | | |
| 12 | −65.912 | 2.20 | 25.5 | 1.73038 |
| 13 | −16.570 | 1.50 | 52.3 | 1.74810 |
| 14 | 36.691 | (d₁₄) | | |
| 15 | 22.288 | 3.00 | 82.5 | 1.49782 |
| 16 | 81.627 | 0.30 | | |
| 17 | 33.611 | 2.00 | 25.5 | 1.80458 |
| 18 | 20.491 | 3.60 | | |

Conditional Formula Corresponding Values $d_{23}/f_w = 0.7440$, $|f_1| = 20.000$
$|AS-S|/f_w = 0.10283$ ($\phi = 37.59$)
$\beta_w = -0.6355$, $f_2/f_w = 1.9565$
$|f_3|/f_w = 2.2581$, $f_4/f_w = 2.0841$
$d_{23}/L = 0.40755$, $d_{4p} = 7.0$
$|n_{3n}-n_{3p}| = 0.036603$, $\nu_{3p}-\nu_{3n} = -26.3$
$n_{4n}-n_{4p} = 0.30676$, $\nu_{4p}-\nu_{4n} = 57.0$

| | | | | |
|---|---|---|---|---|
| 19 | −43.822 | 3.50 | 54.6 | 1.51454 |
| 20 | −20.698 | 0.10 | | |
| 21 | 77.825 | 7.00 | 82.5 | 1.49782 |
| 22 | −18.604 | 1.50 | 23.0 | 1.86074 |
| 23 | −38.417 | (Bf) | | |

| f | 18.400 | 24.000 | 27.300 |
|---|---|---|---|
| D0 | ∞ | ∞ | ∞ |
| d6 | 18.461 | 5.351 | 0.300 |
| d11 | 4.326 | 6.557 | 7.846 |
| d14 | 8.551 | 6.816 | 5.813 |
| Bf | 42.382 | 46.845 | 49.423 |
| β | −0.033 | −0.033 | −0.033 |
| D0 | 535.971 | 709.394 | 812.035 |
| d6 | 18.461 | 5.351 | 0.300 |
| d11 | 4.671 | 7.023 | 8.385 |
| d14 | 8.206 | 6.350 | 5.274 |
| Bf | 42.382 | 46.845 | 49.423 |

Aspherical Surface (First Surface)

Reference Paraxial Curvature Radius: $r = 43.716$
Conical Coefficient: $k = 1$
Aspherical Surface Coefficient
$C_2 = 0.0$, $C_4 = 0.56396E^{-05}$, $C_6 = 0.31551E^{-08}$,
$C_8 = -0.69514E^{-11}$, $C_{10} = 0.14709E^{-13}$ Conditional Formula Corresponding Values $d_{23}/f_w = 1.0299$, $|f_1| = 26.262$
$|AS-S|/f_w = 0.11679$ ($\phi = 46.16$)
$\beta_w = -6.5185$, $f_2/f_w = 1.576$
$|f_3|/f_w = 1.644$, $f_4/f_w = 2.283$
$d_{23}/L = 0.4791$, $d_{4p} = 7.0$
$|n_{3n}-n_{3p}| = 0.017721$, $\nu_{3p}-\nu_{3n} = -26.8$
$n_{4n}-n_{4p} = 0.36292$, $\nu_{4p}-\nu_{4n} = 59.5$

TABLE 14

[Fourteenth Embodiment]

$f = 18.4 \sim 27.3$, $2\omega = 101.4° \sim 76.4°$, $F_{NO} = 4.1$

| | r | d | ν | n |
|---|---|---|---|---|
| 1 | 66.171 | 2.50 | 40.9 | 1.79631 |
| 2 | 17.878 | 12.00 | | |
| 3 | −104.815 | 2.00 | 45.4 | 1.79668 |
| 4 | 47.251 | 9.44 | | |
| 5 | 48.413 | 3.00 | 27.8 | 1.69911 |
| 6 | 965.152 | (d₆) | | |
| 7 | 32.559 | 1.50 | 35.7 | 1.90265 |
| 8 | 17.903 | 5.00 | 82.6 | 1.49782 |
| 9 | −46.322 | 0.10 | | |
| 10 | 24.920 | 2.00 | 49.0 | 1.53172 |
| 11 | 38.591 | (d₁₁) | | |
| 12 | −45.932 | 2.20 | 25.5 | 1.73038 |
| 13 | −14.583 | 1.50 | 55.6 | 1.69680 |
| 14 | 111.545 | (d₁₄) | | |
| 15 | 21.650 | 3.00 | 54.6 | 1.51454 |
| 16 | 65.101 | 0.30 | | |
| 17 | 27.419 | 2.00 | 25.5 | 1.80458 |
| 18 | 19.163 | 3.00 | | |
| 19 | 300.132 | 3.70 | 54.6 | 1.51454 |
| 20 | −28.447 | 0.10 | | |

TABLE 14-continued

[Fourteenth Embodiment]

| | | | | |
|---|---|---|---|---|
| 21 | −472.607 | 7.50 | 67.9 | 1.59319 |
| 22 | −14.540 | 1.50 | 25.5 | 1.80458 |
| 23 | −41.540 | (Bf) | | |

| f | 18.400 | 24.000 | 27.300 |
|---|---|---|---|
| D0 | ∞ | ∞ | ∞ |
| d6 | 17.683 | 7.495 | 3.887 |
| d11 | 4.892 | 8.343 | 10.354 |
| d14 | 9.792 | 6.341 | 4.330 |
| Bf | 44.471 | 50.862 | 54.586 |
| β | −0.033 | −0.033 | −0.033 |
| D0 | 541.063 | 699.052 | 793.913 |
| d6 | 17.683 | 7.495 | 3.887 |
| d11 | 4.885 | 7.045 | 8.805 |
| d14 | 9.060 | 6.640 | 4.911 |
| Bf | 45.210 | 51.861 | 55.554 |

Aspherical Surface (First Surface)

Reference Paraxial Curvature Radius: $r = 66.171$
Conical Coefficient: $k = 1$
Aspherical Surface Coefficient
$C_2 = 0.0$, $C_4 = 0.09028E^{-05}$, $C_6 = 0.63815E^{-08}$,
$C_8 = 0.86133E^{-11}$, $C_{10} = 0.98912E^{-16}$

Conditional Formula Corresponding Values $d_{23}/fw = 0.5132$, $|f_1| = 26.262$
$|AS-S|/fw = 0.12124$ ($\phi = 44.79$)
$\beta w = -0.5443$, $f_2/fw = 2.2826$
$|f_3|/fw = 2.7174$, $f_4/fw = 2.1091$
$d_{23}/L = 0.32626$, $d_{4p} = 7.5$
$|n_{3n}-n_{3p}| = 0.03357$, $\nu_{3p}-\nu_{3n} = -30.1$
$n_{4n}-n_{4p} = 0.211392$, $\nu_{4p}-\nu_{4n} = 42.4$ As described above, the zoom lens in each embodiment discussed earlier is, as can be understood from the values of items in the eighth to fourteenth embodiment, constructed of the respective lens groups each composed compactly of an as small number of lens elements as possible. Nevertheless, the super-widening of the view angle in excess of 100 degrees at the wide angle end is attained. Particularly in the eighth embodiment, a super wide angle as large as 110 degrees or greater is actualized.

Note that in each of the first through fourteen embodiments, on the occasion of the variable power, the third lens group G3 serving as a moving group is moved to make a contribution to the variable power. However, the third lens group G3 serving as a fixed group may be fixed during the variable power operation, while other lens groups may be configured to change their moving quantities. Besides, if an aspherical surface is introduced in any one or a plurality of lens groups among the second, third and fourth lens groups, G2, G3, G4, it is possible to further increase the aperture and the performance as well.

Additionally, the first negative lens element G11, the second negative lens element G12 and the third positive lens element G13 in the first lens group G1 can be all constructed of single lenses or joint lenses. At this time, however, as a matter of course, the joint lens may be composed of a separate type compound lens elements in which the positive and negative lenses are separated from each other.

In accordance with the present invention, the first lens group G1 can be constructed in principle of three pieces of negative/negative/positive lens elements. Based on this construction, even when adding other lenses to the respective lens element, this does not depart from the essence of the present invention. The super wide angle zoom lens according to the present invention basically has the four-group construction. Based on this construction of the present invention, even when dividing the respective lens groups or adding other lens groups thereto, this does not depart from the essence of the present invention.

As discussed above, the present invention, though each lens group is composed compactly of an as small number of lens elements as possible, attains the super-widening of the view angle exceeding 100 degrees at the wide angle end. Nevertheless, the highly well-balanced compensations of various aberrations are accomplished during focusing from the infinity object point to the short distance object point in all the variable power areas from the wide angle end to the telephoto end. It is feasible to achieve the super wide angle zoom lens exhibiting a superlative image forming performance.

Although the illustrative embodiments of the present invention have been described in detail with reference to the accompanying drawings, it is to be understood that the present invention is not limited to those embodiment. Various changes or modifications may be effected therein by one skilled in the art without departing from the scope or spirit of the invention.

What is claimed is:

1. A super wide angle zoom lens comprising:
   a front group exhibiting a negative refracting power and including, sequentially from an object, a first lens element having a negative refracting power, a second lens element having a negative refracting power and a third lens element having a positive refracting power, at least one surface of the lens element of said front group being aspherical; and
   a rear group having a positive refracting power, disposed closer to the image side than said front group, the rear group including a lens group disposed closest to said front group side;
   wherein when variable power operation is performed from the wide angle end side to the telephoto end side, at least one of said front group and said lens group disposed closest to said front group side in said rear group moves to reduce air space on the optical axis between said front group and said rear group, and wherein said front group is constructed to satisfy the following condition:

$$(300/fw) \leq |f_1| \leq (680/fw)$$

where $f_1$ is the focal distance of said front group, and fw is the focal distance of the whole system at the wide angle end.

2. The super wide angle zoom lens as set forth in claim 1, wherein said front group is constructed to satisfy the following condition:

$$0.12 \leq d_{23}/fw \leq 2.0$$

where $d_{23}$ is the axial air space between a surface, closest to the image, of said second lens element and a surface, closest to the object, of said third lens element, and fw is the focal distance of the entire system at the wide angle end.

3. The super wide angle zoom lens as set forth in claim 1, wherein said front group has a first lens group including said first, second, and third lens elements, said rear group has said lens group disposed closest to said front group side as a second lens group having a positive refracting power and has a third lens group having a negative refracting power and a fourth lens group having a positive refracting power in the order from the object side, said third lens group having the negative refracting power includes a joint negative lens element consisting of positive and negative lenses joined to each other, and said fourth lens group having the positive refracting power includes a joint positive lens element consisting of positive and negative lenses joined to each other on the closest-to-image-side.

4. The super wide angle zoom lens as set forth in claim 3, wherein said zoom lens is constructed based on the data of the following table:

| f = 15.5~27.3, 2ω = 111.2°~76.4°, $F_{NO}$ = 4.1 | | | |
|---|---|---|---|
| r | d | ν | n |
| 1  | 69.600   | 2.50    | 45.4 | 1.79668 |
| 2  | 20.275   | 15.50   |      |         |
| 3  | −80.398  | 2.00    | 45.4 | 1.79668 |
| 4  | 37.112   | 6.00    |      |         |
| 5  | 46.526   | 5.30    | 35.2 | 1.74950 |
| 6  | −815.420 | ($d_6$) |      |         |
| 7  | 26.848   | 1.60    | 33.9 | 1.80384 |
| 8  | 14.972   | 4.50    | 65.8 | 1.46450 |
| 9  | 97.280   | 0.20    |      |         |
| 10 | 38.990   | 3.00    | 41.4 | 1.57501 |
| 11 | −50.400  | ($d_{11}$) | | |
| 12 | −36.378  | 2.30    | 28.3 | 1.72825 |
| 13 | −13.883  | 1.50    | 55.6 | 1.69680 |
| 14 | 128.521  | ($d_{14}$) | | |
| 15 | 24.647   | 3.00    | 54.6 | 1.51454 |
| 16 | 73.993   | 0.50    |      |         |
| 17 | 41.947   | 2.00    | 26.1 | 1.78470 |
| 18 | 24.197   | 3.20    |      |         |
| 19 | −103.008 | 3.00    | 67.9 | 1.59319 |
| 20 | −28.765  | 0.10    |      |         |
| 21 | 217.566  | 8.00    | 65.4 | 1.60300 |
| 22 | −15.505  | 2.00    | 23.0 | 1.86074 |
| 23 | −30.196  | (Bf)    |      |         |
| f   | 15.450 | 24.000 | 27.300 |
| d6  | 21.412 | 3.704  | 0.398  |
| d11 | 6.575  | 11.685 | 13.610 |
| d14 | 7.671  | 2.561  | 0.636  |
| Bf  | 38.211 | 47.501 | 51.002 |

Aspherical Surface (First Surface)

Reference Paraxial Curvature Radius: r = 69.600
Conical Coefficient: k = 1
Aspherical Surface Coefficient
$C_2 = 0.0$, $C_4 = 0.79789E^{-05}$, $C_6 = 0.39445E^{-08}$,
$C_8 = 0.24046E^{-11}$, $C_{10} = 0.31560E^{-14}$ Conditional Formula Corresponding Values $d_{23}/fw = 0.388$, $|f_1| = 24.942$
$|AS-S|/fw = 0.25367$ ($\phi = 55.66$)
$f_2/fw = 2.330$, $|f_3|/fw = 2.773$
$f_4/fw = 2.307$, $d_{23}/L = 0.192$
$d_{4p} = 8.0$, $|n_{3n}-n_{3p}| = 0.03145$
$\nu_{3p}-\nu_{3n} = 27.3$, $n_{4n}-n_{4p} = 0.2577$
$\nu_{4p}-\nu_{4n} = 42.4$ where the leftmost numeral in the Table indicates the order from the object, r is the curvature radius of the lens surface, d is the lens surface spacing, ν is the Abbe number, n is the refractive index in the d-line (λ=587.6 nm), f is the focal distance of the whole system, $F_{NO}$ is the F-number, 2ω is the view angle, and φ is the effective diameter of the aspherical surface lens;

AS-S: the difference in the optical-axis direction between said aspherical surface in an effective diameter outermost periphery and a reference spherical surface having a predetermined vertex curvature radius;

fw: the focal distance of the entire system at the wide angle end;

$d_{23}$: the axial air space between the closest-to-image surface of said second lens element in said first lens group and the closest-to-object surface of said third lens element; and L: the axial thickness (distance between a lens vertex of the close-to-object surface of the closest-to-object lens in said first lens group and a lens vertex of the close-to-image surface of the closest-to-image lens in said first lens group) of said first lens group;

$f_1$: the focal distance of said first lens group;
$f_2$: the focal distance of said second lens group;
$f_3$: the focal distance of said third lens group;
$f_4$: the focal distance of said fourth lens group;
$d_{4p}$: the axial thickness of the positive lens in the joint positive lens element positioned closest to the image in said fourth lens group;
$n_{3n}$: the refractive index to a d-line (587.6 nm) of the negative lens of the joint negative lens element in said third lens group;
$n_{3p}$: the refractive index to the d-line (587.6 nm) of the positive lens of the joint negative lens element in said third lens group;
$\nu_{3p}$: the Abbe number of the positive lens of the joint negative lens element in said third lens group;
$\nu_{3n}$: the Abbe number of the negative lens of the joint negative lens element in said third lens group;
$n_{4n}$: the refractive index to the d-line (587.6 nm) of the negative lens of the joint positive lens element positioned closest to the image in said fourth lens group;
$n_{4p}$: the refractive index to the d-line (587.6 nm) of the positive lens of the joint positive lens element positioned closest to the image in said fourth lens group;
$\nu_{4p}$: the Abbe number of the positive lens of the joint positive lens element positioned closest to the image in said fourth lens group;
$\nu_{4n}$: the Abbe number of the negative lens of the joint positive lens element positioned closest to the image in said fourth lens group, and further, the aspherical surface shown by values of the items is expressed such as:

$$X(h) = (h^2/r)/[1+(1-Kh^2/r^2)^{\frac{1}{2}}] + C_2 h^2 + C_4 h^4 + C_6 h^6 + C_8 h^8 + C_{10} h^{10}$$

where X(h) is the distance along the optical-axis direction from the nodal plane of the vertex of each aspherical surface at a height y in the vertical direction from the optical axis, r is the reference paraxial curvature radius, k is the conical coefficient, Cn is the n-order aspherical surface coefficient, and $E^{-n}$ at the left end in the n-order aspherical surface coefficient Cn indicates $10^{-n}$.

5. The super wide angle zoom lens as set forth in claim 3, wherein said zoom lens is constructed based on the data of the following table:

| f = 16.4~27.3, 2ω = 108.2°~76.4°, $F_{NO}$ = 4.1 | | | |
|---|---|---|---|
| r | d | ν | n |
| 1  | 56.830  | 2.50    | 45.4 | 1.79668 |
| 2  | 22.588  | 13.00   |      |         |
| 3  | 203.239 | 2.00    | 43.4 | 1.84042 |
| 4  | 29.159  | 14.20   |      |         |
| 5  | 29.712  | 3.50    | 25.5 | 1.80458 |
| 6  | 37.859  | ($d_6$) |      |         |
| 7  | 35.294  | 1.30    | 33.9 | 1.80384 |
| 8  | 16.316  | 4.00    | 70.4 | 1.48749 |
| 9  | 160.741 | 0.20    |      |         |
| 10 | 35.749  | 3.00    | 38.0 | 1.60342 |

-continued

| | | | | |
|---|---|---|---|---|
| 11 | −53.604 | (d₁₁) | | |
| 12 | −30.014 | 2.50 | 27.8 | 1.69911 |
| 13 | −12.979 | 1.50 | 60.0 | 1.64000 |
| 14 | 141.313 | (d₁₄) | | |
| 15 | 29.674 | 3.50 | 58.9 | 1.51823 |
| 16 | −229.981 | 0.10 | | |
| 17 | 92.266 | 2.00 | 28.6 | 1.79504 |
| 18 | 28.825 | 2.50 | | |
| 19 | −150.071 | 3.00 | 65.4 | 1.60300 |
| 20 | −34.756 | 0.10 | | |
| 21 | 205.091 | 8.00 | 57.5 | 1.67025 |
| 22 | −15.837 | 1.80 | 23.0 | 1.86074 |
| 23 | −34.904 | (Bf) | | |

| | | | |
|---|---|---|---|
| f | 16.400 | 24.000 | 27.300 |
| d6 | 18.553 | 4.145 | 0.916 |
| d11 | 8.282 | 13.087 | 15.115 |
| d14 | 7.722 | 2.917 | 0.888 |
| Bf | 39.789 | 47.798 | 51.178 |

Aspherical Surface (First Surface)

Reference Paraxial Curvature Radius: r = 56.830
Conical Coefficient: k = 1
Aspherical Surface Coefficient
$C_2 = 0.0$, $C_4 = 0.41777E^{-05}$, $C_6 = 0.36563E^{-09}$,
$C_8 = -0.98160E^{-12}$, $C_{10} = 0.21972E^{-14}$ Conditional Formula Corresponding Values $d_{23}/fw = 0.8659$, $|f_1| = 24.941$
$|AS-S|/fw = 0.1800$ ($\phi = 55.73$)
$f_2/fw = 2.195$, $|f_3|/fw = 2.612$
$f_4/fw = 2.174$, $d_{23}/L = 0.4034$
$d_{4p} = 8.0$, $|n_{3n}-n_{3p}| = 0.05911$
$\nu_{3p}-\nu_{3n} = -32.2$, $n_{4n}-n_{4p} = 0.19049$
$\nu_{4p}-\nu_{4n} = 34.5$ where the leftmost numeral in the Table indicates the order from the object, r is the curvature radius of the lens surface, d is the lens surface spacing, $\nu$ is the Abbe number, n is the refractive index in the d-line ($\lambda=587.6$ nm), f is the focal distance of the whole system, $F_{NO}$ is the F-number, $2\omega$ is the view angle, and $\phi$ is the effective diameter of the aspherical surface lens;

AS-S: the difference in the optical-axis direction between said aspherical surface in an effective diameter outermost periphery and a reference spherical surface having a predetermined vertex curvature radius;

fw: the focal distance of the entire system at the wide angle end;

$d_{23}$: the axial air space between the closest-to-image surface of said second lens element in said first lens group and the closest-to-object surface of said third lens element; and L: the axial thickness (distance between a lens vertex of the close-to-object surface of the closest-to-object lens in said first lens group and a lens vertex of the close-to-image surface of the closest-to-image lens in said first lens group) of said first lens group;

$f_1$: the focal distance of said first lens group;

$f_2$: the focal distance of said second lens group;

$f_3$: the focal distance of said third lens group;

$f_4$: the focal distance of said fourth lens group;

$d_{4p}$: the axial thickness of the positive lens in the joint positive lens element positioned closest to the image in said fourth lens group;

$n_{3n}$: the refractive index to a d-line (587.6 nm) of the negative lens of the joint negative lens element in said third lens group;

$n_{3p}$: the refractive index to the d-line (587.6 nm) of the positive lens of the joint negative lens element in said third lens group;

$\nu_{3p}$: the Abbe number of the positive lens of the joint negative lens element in said third lens group;

$\nu_{3n}$: the Abbe number of the negative lens of the joint negative lens element in said third lens group;

$n_{4n}$: the refractive index to the d-line (587.6 nm) of the negative lens of the joint positive lens element positioned closest to the image in said fourth lens group;

$n_{4p}$: the refractive index to the d-line (587.6 nm) of the positive lens of the joint positive lens element positioned closest to the image in said fourth lens group;

$\nu_{4p}$: the Abbe number of the positive lens of the joint positive lens element positioned closest to the image in said fourth lens group;

$\nu_{4n}$: the Abbe number of the negative lens of the joint positive lens element positioned closest to the image in said fourth lens group, and further, the aspherical surface shown by values of the items is expressed such as:

$$X(h) = (h^2/r)/[1+(1-Kh^2/r^2)^{\frac{1}{2}}] + C2\ h^2 + C4\ h^4 + C6\ h^6 + C8\ h^8 + C10\ h^{10}$$

where X(h) is the distance along the optical-axis direction from the nodal plane of the vertex of each aspherical surface at a height y in the vertical direction from the optical axis, r is the reference paraxial curvature radius, k is the conical coefficient, Cn is the n-order aspherical surface coefficient, and $E^{-n}$ at the left end in the n-order aspherical surface coefficient Cn indicates $10^{-n}$.

6. The super wide angle zoom lens as set forth in claim 3, wherein said zoom lens is constructed based on the data of the following table:

| f = 18.4~27.3, 2ω = 101.2°~76.4°, $F_{NO}$ = 4.1 | | | |
|---|---|---|---|
| | r | d | ν | n |
| 1 | 49.794 | 2.50 | 40.9 | 1.79631 |
| 2 | 17.702 | 12.00 | | |
| 3 | −83.638 | 2.00 | 45.4 | 1.79668 |
| 4 | 47.407 | 10.70 | | |
| 5 | 50.613 | 3.00 | 27.8 | 1.69911 |
| 6 | 511.053 | (d₆) | | |
| 7 | 28.622 | 1.50 | 35.7 | 1.90265 |
| 8 | 17.512 | 5.00 | 65.8 | 1.46450 |
| 9 | −37.213 | 0.10 | | |
| 10 | 28.185 | 2.00 | 54.6 | 1.51454 |
| 11 | 54.221 | (d₁₁) | | |
| 12 | −50.475 | 2.00 | 25.5 | 1.73038 |
| 13 | −17.366 | 1.50 | 52.3 | 1.74810 |
| 14 | 90.015 | (d₁₄) | | |
| 15 | 21.344 | 3.00 | 60.3 | 1.51835 |
| 16 | 47.510 | 1.00 | | |
| 17 | 25.698 | 2.00 | 25.5 | 1.80458 |
| 18 | 19.106 | 3.20 | | |
| 19 | −108.848 | 3.50 | 54.6 | 1.51454 |
| 20 | −24.560 | 0.10 | | |
| 21 | −1489.718 | 6.50 | 60.6 | 1.60311 |
| 22 | −13.865 | 1.50 | 25.5 | 1.80458 |
| 23 | −34.842 | (Bf) | | |

| | | | |
|---|---|---|---|
| f | 18.400 | 24.000 | 27.300 |
| d6 | 17.323 | 6.811 | 2.987 |
| d11 | 4.870 | 7.898 | 9.649 |
| d14 | 8.112 | 5.084 | 3.333 |
| Bf | 42.968 | 48.575 | 51.818 |

Aspherical Surface (First Surface)

Reference Paraxial Curvature Radius: r = 49.794
Conical Coefficient: k = 1
Aspherical Surface Coefficient
$C_2 = 0.0$, $C_4 = 0.89224E^{-05}$, $C_6 = 0.47558E^{-08}$,
$C_8 = 0.82136E^{-11}$, $C_{10} = 0.33662E^{-14}$ -continued Conditional Formula Corresponding Values $d_{23}/fw = 0.5816$, $|f_1| = 26.262$
$|AS-S|/fw = 0.10589$ ($\phi = 43.33$)
$f_2/fw = 1.9565$, $|f_3|/fw = 2.2581$
$f_4/fw = 2.0842$, $d_{23}/L = 0.3543$
$d_{4p} = 6.5$, $|n_{3n}-n_{3p}| = 0.017721$
$\nu_{3p}-\nu_{3n} = -26.8$, $n_{4n}-n_{4p} = 0.20147$
$\nu_{4p}-\nu_{4n} = 35.1$ where the leftmost numeral in the Table indicates the order from the object, r is the curvature radius of the lens surface, d is the lens surface spacing, $\nu$ is the Abbe number, n is the refractive index in the d-line ($\lambda = 587.6$ nm), f is the focal distance of the whole system, $F_{NO}$ is the F-number, $2\omega$ is the view angle, and $\phi$ is the effective diameter of the aspherical surface lens;

- AS-S: the difference in the optical-axis direction between said aspherical surface in an effective diameter outermost periphery and a reference spherical surface having a predetermined vertex curvature radius;
- fw: the focal distance of the entire system at the wide angle end;
- $d_{23}$: the axial air space between the closest-to-image surface of said second lens element in said first lens group and the closest-to-object surface of said third lens element; and
- L: the axial thickness (distance between a lens vertex of the close-to-object surface of the closest-to-object lens in said first lens group and a lens vertex of the close-to-image surface of the closest-to-image lens in said first lens group) of said first lens group;
- $f_1$: the focal distance of said first lens group;
- $f_2$: the focal distance of said second lens group;
- $f_3$: the focal distance of said third lens group;
- $f_4$: the focal distance of said fourth lens group;
- $d_{4p}$: the axial thickness of the positive lens in the joint positive lens element positioned closest to the image in said fourth lens group;
- $n_{3n}$: the refractive index to a d-line (587.6 nm) of the negative lens of the joint negative lens element in said third lens group;
- $n_{3p}$: the refractive index to the d-line (587.6 nm) of the positive lens of the joint negative lens element in said third lens group;
- $\nu_{3p}$: the Abbe number of the positive lens of the joint negative lens element in said third lens group;
- $\nu_{3n}$: the Abbe number of the negative lens of the joint negative lens element in said third lens group;
- $n_{4n}$: the refractive index to the d-line (587.6 nm) of the negative lens of the joint positive lens element positioned closest to the image in said fourth lens group;
- $n_{4p}$: the refractive index to the d-line (587.6 nm) of the positive lens of the joint positive lens element positioned closest to the image in said fourth lens group;
- $\nu_{4p}$: the Abbe number of the positive lens of the joint positive lens element positioned closest to the image in said fourth lens group;
- $\nu_{4n}$: the Abbe number of the negative lens of the joint positive lens element positioned closest to the image in said fourth lens group, and further, the aspherical surface shown by values of the items is expressed such as:

$$X(h) = (h^2/r)/[1+(1-Kh^2/r^2)^{\frac{1}{2}}] + C_2 h^2 + C_4 h^4 + C_6 h^6 + C_8 h^8 + C_{10} h^{10}$$

where X(h) is the distance along the optical-axis direction from the nodal plane of the vertex of each aspherical surface at a height y in the vertical direction from the optical axis, r is the reference paraxial curvature radius, k is the conical coefficient, Cn is the n-order aspherical surface coefficient, and $E^{-n}$ at the left end in the n-order aspherical surface coefficient Cn indicates $10^{-n}$.

7. The super wide angle zoom lens as set forth in claim 3, wherein said zoom lens is constructed based on the data of the following table:

| f = 18.4~27.3, 2ω = 101.5°~76.4°, $F_{NO}$ = 4.07~4.60 | | | |
|---|---|---|---|
| r | d | ν | n |
| 1  90.937 | 2.50 | 45.4 | 1.79668 |
| 2  31.382 | 13.00 | | |
| 3  −278.297 | 1.50 | 43.4 | 1.84042 |
| 4  27.974 | 4.00 | 49.5 | 1.77279 |
| 5  30.032 | 8.01 | | |
| 6  43.281 | 4.70 | 25.5 | 1.80458 |
| 7  215.269 | (d$_7$) | | |
| 8  22.602 | 1.50 | 27.6 | 1.75520 |
| 9  12.892 | 5.00 | 65.8 | 1.46450 |
| 10  −42.867 | 0.10 | | |
| 11  27.354 | 2.00 | 70.0 | 1.51860 |
| 12  41.149 | (d$_{12}$) | | |
| 13  −55.604 | 1.50 | 55.6 | 1.69680 |
| 14  16.631 | 2.00 | 25.5 | 1.73038 |
| 15  66.434 | (d$_{15}$) | | |
| 16  17.545 | 3.00 | 25.5 | 1.73038 |
| 17  17.053 | 3.00 | | |
| 18  −27.216 | 3.00 | 58.5 | 1.65160 |
| 19  −19.139 | 0.10 | | |
| 20  97.697 | 9.00 | 65.4 | 1.60300 |
| 21  −11.988 | 1.50 | 25.5 | 1.73038 |
| 22  −33.438 | (Bf) | | |
| f | 18.399 | 24.000 | 27.300 |
| d7 | 20.808 | 7.653 | 2.694 |
| d12 | 3.914 | 6.449 | 7.934 |
| d15 | 5.867 | 3.333 | 1.847 |
| Bf | 35.003 | 39.227 | 41.703 |
| Aspherical Surface (First Surface) | | | |
| Reference Paraxial Curvature Radius: r = 90.937 Conical Coefficient: k = 1 Aspherical Surface Coefficient $C_2 = 0.0$, $C_4 = 0.41120E^{-05}$, $C_6 = -0.10463E^{08}$, $C_8 = 0.26766E^{-12}$, $C_{10} = 0.94821E^{-15}$ | | | |
| Conditional Formula Corresponding Values | | | |
| $d_{23}/fw = 0.4352$, $|f_1| = 33.000$ $|AS-S|/fw = 0.12817$ ($\phi = 55.75$) $f_2/fw = 1.9293$, $|f_3|/fw = 2.5000$ $f_4/fw = 1.9567$ $d_{23}/L = 0.2376$ $d_{4p} = 9.0$, $|n_{3n}-n_{3p}| = 0.033578$ $\nu_{3p}-\nu_{3n} = -30.1$, $n_{4n}-n_{4p} = 0.12738$ $\nu_{4p}-\nu_{4n} = 39.9$ | | | | where the leftmost numeral in the Table indicates the order from the object, r is the curvature radius of the lens surface, d is the lens surface spacing, $\nu$ is the Abbe number, n is the refractive index in the d-line ($\lambda = 587.6$ nm), f is the focal distance of the whole system, $F_{NO}$ is the F-number, $2\omega$ is the view angle, and $\phi$ is the effective diameter of the aspherical surface lens;

- AS-S: the difference in the optical-axis direction between said aspherical surface in an effective diameter outermost periphery and a reference spherical surface having a predetermined vertex curvature radius;
- fw: the focal distance of the entire system at the wide angle end;

$d_{23}$: the axial air space between the closest-to-image surface of said second lens element in said first lens group and the closest-to-object surface of said third lens element; and L: the axial thickness (distance between a lens vertex of the close-to-object surface of the closest-to-object lens in said first lens group and a lens vertex of the close-to-image surface of the closest-to-image lens in said first lens group) of said first lens group;

$f_1$: the focal distance of said first lens group;
$f_2$: the focal distance of said second lens group;
$f_3$: the focal distance of said third lens group;
$f_4$: the focal distance of said fourth lens group;
$d_{4p}$: the axial thickness of the positive lens in the joint positive lens element positioned closest to the image in said fourth lens group;
$n_{3n}$: the refractive index to a d-line (587.6 nm) of the negative lens of the joint negative lens element in said third lens group;
$n_{3p}$: the refractive index to the d-line (587.6 nm) of the positive lens of the joint negative lens element in said third lens group;
$\nu_{3p}$: the Abbe number of the positive lens of the joint negative lens element in said third lens group;
$\nu_{3n}$: the Abbe number of the negative lens of the joint negative lens element in said third lens group;
$n_{4n}$: the refractive index to the d-line (587.6 nm) of the negative lens of the joint positive lens element positioned closest to the image in said fourth lens group;
$n_{4p}$: the refractive index to the d-line (587.6 nm) of the positive lens of the joint positive lens element positioned closest to the image in said fourth lens group;
84 $\nu_{4p}$: the Abbe number of the positive lens of the joint positive lens element positioned closest to the image in said fourth lens group;
$\nu_{4n}$: the Abbe number of the negative lens of the joint positive lens element positioned closest to the image in said fourth lens group, and further, the aspherical surface shown by values of the items is expressed such as:

$$X(h) = (h^2/r)/[1+(1-Kh^2/r^2)^{\frac{1}{2}}] + C_2 h^2 + C_4 h^4 + C_6 h^6 + C_8 h^8 + C_{10} h^{10}$$

where X(h) is the distance along the optical-axis direction from the nodal plane of the vertex of each aspherical surface at a height y in the vertical direction from the optical axis, r is the reference paraxial curvature radius, k is the conical coefficient, $C_n$ is the n-order aspherical surface coefficient, and $E^{-n}$ at the left end in the n-order aspherical surface coefficient $C_n$ indicates $10^{-n}$.

8. The super wide angle zoom lens as set forth in claim 3, wherein said zoom lens is constructed based on the data of the following table:

| f = 18.4~27.3, 2ω = 101.3°~76.4°, $F_{NO}$ = 4.6 | | | | |
|---|---|---|---|---|
| | r | d | ν | n |
| 1 | 48.498 | 1.80 | 39.8 | 1.86994 |
| 2 | 15.829 | 11.00 | | |
| 3 | −48.419 | 1.50 | 43.3 | 1.84042 |
| 4 | 479.543 | 13.69 | | |
| 5 | 42.228 | 4.30 | 27.8 | 1.69911 |
| 6 | −30.868 | 1.30 | 35.7 | 1.90265 |
| 7 | 218.115 | ($d_7$) | | |

-continued

| 8 | 44.084 | 1.50 | 33.9 | 1.80384 |
|---|---|---|---|---|
| 9 | 18.238 | 4.00 | 65.7 | 1.46450 |
| 10 | −110.754 | 0.10 | | |
| 11 | 36.956 | 4.00 | 54.6 | 1.51454 |
| 12 | −48.126 | ($d_{12}$) | | |
| 13 | −36.432 | 3.00 | 26.1 | 1.78470 |
| 14 | −16.787 | 1.50 | 52.3 | 1.74810 |
| 15 | 164.469 | ($d_{15}$) | | |
| 16 | 21.601 | 2.50 | 60.2 | 1.51835 |
| 17 | 37.689 | 1.00 | | |
| 18 | 23.788 | 2.00 | 25.5 | 1.80458 |
| 19 | 19.149 | 3.70 | | |
| 20 | −285.297 | 4.00 | 54.6 | 1.51454 |
| 21 | −23.565 | 0.20 | | |
| 22 | 115.249 | 7.00 | 82.5 | 1.49782 |
| 23 | −16.557 | 1.50 | 25.5 | 1.80458 |
| 24 | −43.420 | (Bf) | | |

| f | 18.400 | 24.000 | 27.300 |
|---|---|---|---|
| $d_7$ | 9.147 | 2.641 | 0.502 |
| $d_{12}$ | 6.616 | 10.597 | 12.842 |
| $d_{15}$ | 8.058 | 4.076 | 1.832 |
| Bf | 50.193 | 57.567 | 61.723 |

Aspherical Surface (First Surface)

Reference Paraxial Curvature Radius: r = 48.498
Conical Coefficient: k = 1
Aspherical Surface Coefficient
$C_2 = 0.0$, $C_4 = 0.15694E^{-04}$, $C_6 = -0.11607E^{-07}$,
$C_8 = 0.18735E^{-10}$, $C_{10} = 0.28146E^{-13}$ Conditional Formula Corresponding Values $d_{23}/fw = 0.7440$, $|f_1| = 20.000$
$|AS-S|/fw = 0.10283$ ($\phi = 37.59$)
$f_2/fw = 1.9565$, $|f_3|/fw = 2.2581$
$f_4/fw = 2.0841$, $d_{23}/L = 0.40755$
$d_{4p} = 7.0$, $|n_{3n}-n_{3p}| = 0.036603$
$\nu_{3p}-\nu_{3n} = -26.3$, $n_{4n}-n_{4p} = 0.30676$
$\nu_{4p}-\nu_{4n} = 57.0$ where the leftmost numeral in the Table indicates the order from the object, r is the curvature radius of the lens surface, d is the lens surface spacing, ν is the Abbe number, n is the refractive index in the d-line (λ=587.6 nm), f is the focal distance of the whole system, $F_{NO}$ is the f-number, 2ω is the view angle, and $\phi$ is the effective diameter of the aspherical surface lens;

AS-S: the difference in the optical-axis direction between said aspherical surface in an effective diameter outermost periphery and a reference spherical surface having a predetermined vertex curvature radius;

fw: the focal distance of the entire system at the wide angle end;

$d_{23}$: the axial air space between the closest-to-image surface of said second lens element in said first lens group and the closest-to-object surface of said third lens element; and L: the axial thickness (distance between a lens vertex of the close-to-object surface of the closest-to-object lens in said first lens group and a lens vertex of the close-to-image surface of the closest-to-image lens in said first lens group) of said first lens group;

$f_1$: the focal distance of said first lens group;
$f_2$: the focal distance of said second lens group;
$f_3$: the focal distance of said third lens group;
$f_4$: the focal distance of said fourth lens group;
$d_{4p}$: the axial thickness of the positive lens in the joint positive lens element positioned closest to the image in said fourth lens group;
$n_{3n}$: the refractive index to a d-line (587.6 nm) of the negative lens of the joint negative lens element in said third lens group;

$n_{3p}$: the refractive index to the d-line (587.6 nm) of the positive lens of the joint negative lens element in said third lens group;

$\nu_{3p}$: the Abbe number of the positive lens of the joint negative lens element in said third lens group;

$\nu_{3n}$: the Abbe number of the negative lens of the joint negative lens element in said third lens group;

$n_{4n}$: the refractive index to the d-line (587.6 nm) of the negative lens of the joint positive lens element positioned closest to the image in said fourth lens group;

$n_{4p}$: the refractive index to the d-line (587.6 nm) of the positive lens of the joint positive lens element positioned closest to the image in said fourth lens group;

$\nu_{4p}$: the Abbe number of the positive lens of the joint positive lens element positioned closest to the image in said fourth lens group;

$\nu_{4n}$: the Abbe number of the negative lens of the joint positive lens element positioned closest to the image in said fourth lens group, and further, the aspherical surface shown by values of the items is expressed such as:

$$X(h) = (h^2/r)/[1 + (1 - Kh^2/r^2)^{\frac{1}{2}}] + C_2 h^2 + C_4 h^4 + C_6 h^6 + C_8 h^8 + C_{10} h^{10}$$

where X(h) is the distance along the optical-axis direction from the nodal plane of the vertex of each aspherical surface at a height y in the vertical direction from the optical axis, r is the reference paraxial curvature radius, k is the conical coefficient, Cn is the n-order aspherical surface coefficient, and $E^{-n}$ at the left end in the n-order aspherical surface coefficient Cn indicates $10^{-n}$.

9. The super wide angle zoom lens as set forth in claim 3, wherein said zoom lens is constructed based on the data of the following table:

| f = 18.4~27.3, 2ω = 101.4°~76.4°, $F_{NO}$ = 4.1 | | | |
|---|---|---|---|
| r | d | ν | n |
| 1 | 43.716 | 2.00 | 39.8 | 1.86994 |
| 2 | 18.989 | 14.00 | | |
| 3 | −86.359 | 1.60 | 43.4 | 1.84042 |
| 4 | 75.253 | 18.95 | | |
| 5 | 95.685 | 3.00 | 27.8 | 1.69911 |
| 6 | 735.641 | (d$_6$) | | |
| 7 | 24.693 | 1.50 | 35.7 | 1.90265 |
| 8 | 16.576 | 4.50 | 65.8 | 1.46450 |
| 9 | −68.174 | 0.10 | | |
| 10 | 34.470 | 2.75 | 54.6 | 1.51454 |
| 11 | −139.738 | (d$_{11}$) | | |
| 12 | −65.912 | 2.20 | 25.5 | 1.73038 |
| 13 | −16.570 | 1.50 | 52.3 | 1.74810 |
| 14 | 36.691 | (d$_{14}$) | | |
| 15 | 22.288 | 3.00 | 82.5 | 1.49782 |
| 16 | 81.627 | 0.30 | | |
| 17 | 33.611 | 2.00 | 25.5 | 1.80458 |
| 18 | 20.491 | 3.60 | | |
| 19 | −43.822 | 3.50 | 54.6 | 1.51454 |
| 20 | −20.698 | 0.10 | | |
| 21 | 77.825 | 7.00 | 82.5 | 1.49782 |
| 22 | −18.604 | 1.50 | 23.0 | 1.86074 |
| 23 | −38.417 | (Bf) | | |
| f | 18.400 | 24.000 | 27.300 |
| d6 | 18.461 | 5.351 | 0.300 |
| d11 | 4.326 | 6.557 | 7.846 |
| d14 | 8.551 | 6.816 | 5.813 |
| Bf | 42.382 | 46.845 | 49.423 |

Aspherical Surface (First Surface)

Reference Paraxial Curvature Radius: r = 43.716
Conical Coefficient: k = 1

-continued

Aspherical Surface Coefficient
$C_2 = 0.0$, $C_4 = 0.56396E^{-05}$, $C_6 = 0.31551E^{-08}$,
$C_8 = -0.69514E^{-11}$, $C_{10} = 0.14709E^{-13}$ Conditional Formula Corresponding Values $d_{23}/fw = 1.0299$, $|f_1| = 26.262$
$|AS-S|/fw = 0.11679$, ($\phi = 46.16$)
$f_2/fw = 1.576$, $|f_3|/fw$ 32 1.644
$f_4/fw = 2.283$, $d_{23}/L = 0.4791$
$d_{4p} = 7.0$, $|n_{3n}-n_{3p}| = 0.017721$
$\nu_{3p}-\nu_{3n} = -26.8$, $n_{4n}-n_{4p} = 0.36292$
$\nu_{4p}-\nu_{4n} = 59.5$ where the leftmost numeral in the Table indicates the order from the object, r is the curvature radius of the lens surface; d is the lens surface spacing, ν is the Abbe number, n is the refractive index in the d-line (λ=587.6 nm), f is the focal distance of the whole system, $F_{NO}$ is the F-number, 2ω is the view angle, and φ is the effective diameter of the aspherical surface lens;

AS-S: the difference in the optical-axis direction between said aspherical surface in an effective diameter outermost periphery and a reference spherical surface having a predetermined vertex curvature radius;

fw: the focal distance of the entire system at the wide angle end;

$d_{23}$: the axial air space between the closest-to-image surface of said second lens element in said first lens group and the closest-to-object surface of said third lens element; and L: the axial thickness (distance between a lens vertex of the close-to-object surface of the closest-to-object lens in said first lens group and a lens vertex of the close-to-image surface of the closest-to-image lens in said first lens group) of said first lens group;

$f_1$: the focal distance of said first lens group;
$f_2$: the focal distance of said second lens group;
$f_3$: the focal distance of said third lens group;
$f_4$: the focal distance of said fourth lens group;
$d_{4p}$: the axial thickness of the positive lens in the joint positive lens element positioned closest to the image in said fourth lens group;

$n_{3n}$: the refractive index to a d-line (587.6 nm) of the negative lens of the joint negative lens element in said third lens group;

$n_{3p}$: the refractive index to the d-line (587.6 nm) of the positive lens of the joint negative lens element in said third lens group;

$\nu_{3p}$: the Abbe number of the positive lens of the joint negative lens element in said third lens group;

$\nu_{3n}$: the Abbe number of the negative lens of the joint negative lens element in said third lens group;

$n_{4n}$: the refractive index to the d-line (587.6 nm) of the negative lens of the joint positive lens element positioned closest to the image in said fourth lens group;

$n_{4p}$: the refractive index to the d-line (587.6 nm) of the positive lens of the joint positive lens element positioned closest to the image in said fourth lens group;

$\nu_{4p}$: the Abbe number of the positive lens of the joint positive lens element positioned closest to the image in said fourth lens group;

$\nu_{4n}$: the Abbe number of the negative lens of the joint positive lens element positioned closest to the image in said fourth lens group, and further, the aspherical surface shown by values of the items is expressed such as:

$$X(h) = (h^2/r)/[1+(1-Kh^2/r^2)^{\frac{1}{2}}] + C2h^2 + C4\ h^4 + C6h^6 + C8\ h^8 + C10\ h^{10}$$

ps where X(h) is the distance along the optical-axis direction from the nodal plane of the vertex of each aspherical surface at a height y in the vertical direction from the optical axis, r is the reference paraxial curvature radius, k is the conical coefficient, Cn is the n-order aspherical surface coefficient, and $E^{-n}$ at the left end in the n-order aspherical surface coefficient Cn indicates $10^{-n}$.

10. The super wide angle zoom lens as set forth in claim 3, wherein said zoom lens is constructed based on the data of the following table:

| f = 18.4~27.3, 2ω = 101.4°~76.4°, $F_{NO}$ = 4.1 | | | | |
|---|---|---|---|---|
| | r | d | ν | n |
| 1 | 66.171 | 2.50 | 40.9 | 1.79631 |
| 2 | 17.878 | 12.00 | | |
| 3 | −104.815 | 2.00 | 45.4 | 1.79668 |
| 4 | 47.251 | 9.44 | | |
| 5 | 48.413 | 3.00 | 27.8 | 1.69911 |
| 6 | 965.152 | (d₆) | | |
| 7 | 32.559 | 1.50 | 35.7 | 1.90265 |
| 8 | 17.903 | 5.00 | 82.6 | 1.49782 |
| 9 | −46.322 | 0.10 | | |
| 10 | 24.920 | 2.00 | 49.0 | 1.53172 |
| 11 | 38.591 | (d₁₁) | | |
| 12 | −45.932 | 2.20 | 25.5 | 1.73038 |
| 13 | −14.583 | 1.50 | 55.6 | 1.69680 |
| 14 | 111.545 | (d₁₄) | | |
| 15 | 21.650 | 3.00 | 54.6 | 1.51454 |
| 16 | 65.101 | 0.30 | | |
| 17 | 27.419 | 2.00 | 25.5 | 1.80458 |
| 18 | 19.163 | 3.00 | | |
| 19 | 300.132 | 3.70 | 54.6 | 1.51454 |
| 20 | −28.447 | 0.10 | | |
| 21 | −472.607 | 7.50 | 67.9 | 1.59319 |
| 22 | −14.540 | 1.50 | 25.5 | 1.80458 |
| 23 | −41.540 | (Bf) | | |
| f | 18.400 | 24.000 | 27.300 | |
| d6 | 17.683 | 7.495 | 3.887 | |
| d11 | 4.892 | 8.343 | 10.354 | |
| d14 | 9.792 | 6.341 | 4.330 | |
| Bf | 44.471 | 50.862 | 54.586 | |

Aspherical Surface (First Surface)

Reference Paraxial Curvature Radius: r = 66.171
Conical Coefficient: k = 1
Aspherical Surface Coefficient
$C_2 = 0.0$, $C_4 = 0.98928E^{-05}$, $C_6 = -0.63815E^{-08}$,
$C_8 = 0.86133E^{-11}$, $C_{10} = 0.98912E^{-16}$, Conditional Formula Corresponding Values $d_{23}/fw = 0.5132$, $|f_1| = 26.262$
$|AS-S|/fw = 0.12124$ ($\phi = 44.79$)
$f_2/fw = 2.2826$, $|f_3|/fw = 2.7174$
$f_4/fw = 2.1091$, $d_{23}/L = 0.32626$
$d_{4p} = 7.5$, $|n_{3n}-n_{3p}| = 0.03357$
$\nu_{3p}-\nu_{3n} = -30.1$, $n_{4n}-n_{4p} = 0.211392$
$\nu_{4p}-\nu_{4n} = 42.4$ where the leftmost numeral in the Table indicates the order from the object, r is the curvature radius of the lens surface, d is the lens surface spacing, ν is the Abbe number, n is the refractive index in the d-line (λ=587.6 nm), f is the focal distance of the whole system, $F_{NO}$ is the F-number, 2ω is the view angle, and φ is the effective diameter of the aspherical surface lens;

AS-S: the difference in the optical-axis direction between said aspherical surface in an effective diameter outermost periphery and a reference spherical surface having a predetermined vertex curvature radius:

fw: the focal distance of the entire system at the wide angle end;

$d_{23}$: the axial air space between the closest-to-image surface of said second lens element in said first lens group and the closest-to-object surface of said third lens element; and L: the axial thickness (distance between a lens vertex of the close-to-object surface of the closest-to-object lens in said first lens group and a lens vertex of the close-to-image surface of the closest-to-image lens in said first lens group) of said first lens group;

$f_1$: the focal distance of said first lens group;
$f_2$: the focal distance of said second lens group;
$f_3$: the focal distance of said third lens group;
$f_4$: the focal distance of said fourth lens group;

$d_{4p}$: the axial thickness of the positive lens in the joint positive lens element positioned closest to the image in said fourth lens group;

$n_{3n}$: the refractive index to a d-line (587.6 nm) of the negative lens of the joint negative, lens element in said third lens group;

$n_{3p}$: the refractive index to the d-line (587.6 nm) of the positive lens of the joint negative lens element in said third lens group;

$\nu_{3p}$: the Abbe number of the positive lens of the joint negative lens element in said third lens group;

$\nu_{3n}$: the Abbe number of the negative lens of the joint negative lens element in said third lens group;

$n_{4n}$: the refractive index to the d-line (587.6 nm) of the negative lens of the joint positive lens element positioned closest to the image in said fourth lens group;

$n_{4p}$: the refractive index to the d-line (587.6 nm) of the positive lens of the joint positive lens element positioned closest to the image in said fourth lens-group;

$\nu_{4p}$: the Abbe number of the positive lens of the joint positive lens element positioned closest to the image in said fourth lens group;

$\nu_{4n}$: the Abbe number of the negative lens of the joint positive lens element positioned closest to the image in said fourth lens group, and further, the aspherical surface shown by values of the items is expressed such as:

$$X(h) = (h^2/r)/[1+(1-Kh^2/r^2)^{\frac{1}{2}}] + C2\ h^2 + C4\ h^4 + C6\ h^6 + C8\ h^8 + C10\ h^{10}$$

where X(h) is the distance along the optical-axis direction from the nodal plane of the vertex of each aspherical surface at a height y in the vertical direction from the optical axis, r is the reference paraxial curvature radius, k is the conical coefficient, Cn is the n-order aspherical surface coefficient, and $E^{-n}$ at the left end in the n-order aspherical surface coefficient Cn indicates $10^{-n}$.

11. A super wide angle zoom lens comprising:
a front group exhibiting a negative refracting power and including, sequentially from an object, a first lens element having a negative refracting power, a second lens element having a negative refracting power and a third lens element having a positive refracting power, at least one surface of the lens elements of said front group being aspherical; and a rear group having a positive refracting power, disposed closer to the image side than said front group, the rear group including a lens group disposed closest to said front group side;

wherein when variable power operation is performed from the wide angle end side to the telephoto end side, at least one of said front group and said lens group disposed closest to said front group side in said rear group moves to reduce air space on the optical axis between said front group and said rear group, and wherein said front group is constructed to satisfy the following condition:

$$0.25 \leq d_{23}/fw \leq 1.4$$

where $d_{23}$ is the axial air space between the closest-to-image surface of said second lens element and the closest-to-object surface of said third lens element, and fw is the focal distance of the entire system at the wide angle end.

12. The super wide angle zoom lens as set forth in claim 11, wherein said aspherical surface is configured to satisfy the following condition for compensating mainly a negative distortion:

$$0.0 \leq |AS-S|/fw \leq 0.5$$

where
AS-S: the difference in the optical-axis direction between said aspherical surface in an effective diameter outermost periphery and a reference spherical surface having a predetermined vertex curvature radius; and
fw: the focal distance of the entire system at the wide angle end.

13. The super wide angle zoom lens as set forth in claim 11, wherein said aspherical surface is configured to satisfy the following condition for compensating mainly a negative distortion:

$$0.095 \leq |AS-S|/fw \leq 0.5$$

where
AS-S: the difference in the optical-axial direction between said aspherical surface in an effective diameter outermost periphery and a reference spherical surface having a predetermined vertex curvature radius; and
fw: the focal distance of the entire system at the wide angle end.

14. A super wide angle zoom lens comprising:
a front group having a first lens group including, in the order from the object side, a first lens element having a negative refracting power, a second lens element having a negative refracting power, and a third lens element having a positive refracting power, the front group having a negative refracting power as a whole, at least one surface of the lens elements of said front group being aspherical; and
a rear group including, in the order from the object side, a second lens group having a positive refracting power, a third lens group having a negative refracting power and a fourth lens group having a positive refracting power, the rear group having a positive refracting power as a whole;
wherein said front group is constructed to satisfy the following condition:

$$0.12 \leq d_{23}/fw \leq 2.0$$

where $d_{23}$ is the axial air space between a surface, closest to the image, of said second lens element and a surface, closest to the object, of said third lens element, and fw is the focal distance of the entire system at the wide angle end; and
wherein when variable power operation is performed from the wide angle end side to the telephoto end side, at least two lens groups are moved along the optical axis so that air space between said first lens group and said second lens group reduces, air space between said second lens group and said third lens group increases and air space between said third lens group and said fourth lens group reduces.

15. The super wide angle zoom lens as set forth in claim 14, wherein said second negative lens element and said third positive lens element in said first lens group having the negative refracting power are disposed to satisfy the following condition:

$$0.16 \leq d_{23}/L \leq 0.6$$

where
L: the axial thickness (distance between a lens vertex of the close-to-object surface of the closest-to-object lens in said first lens group and a lens vertex of the close-to-image surface of the closest-to-image lens in said first lens group) of said first lens group.

16. The super wide angle zoom lens as set forth in claim 14, wherein said first lens group and said third lens group are constructed to satisfy the following conditions:

$$(300/fw) \leq |f_1| \leq (680/fw)$$

$$1.1 \leq |f_3|/fw \leq 3.5, f_3 \leq 0$$

where
$f_1$: the focal distance of said first lens group; and
$f_3$: the focal distance of said third lens group.

17. The super wide angle zoom lens as set forth in claim 14, wherein said first lens group and said third lens group are constructed to satisfy the following conditions:

$$(300/fw) \leq |f_1| \leq (680/fw)$$

$$1.5 \leq |f_3|/fw \leq 3.2, f_3 \leq 0$$

where
$f_1$: the focal distance of said first lens group; and
$f_3$: the focal distance of said third lens group.

18. The super wide angle zoom lens as set forth in claim 14, wherein said second lens group and said fourth lens group are constructed to satisfy the following conditions:

$$1 \leq f_2/fw \leq 5$$

$$1.4 \leq f_4/fw \leq 4$$

where
$f_2$: the focal distance of said second lens group; and
$f_4$: the focal distance of said fourth lens group.

19. The super wide angle zoom lens as set forth in claim 14, wherein said second lens group and said fourth lens group are constructed to satisfy the following conditions:

$1.45 \leq f_2/fw \leq 3$ $1.7 \leq f_4/fw \leq 3.0$ where
- $f_2$: the focal distance of said second lens group; and
- $f_4$: the focal distance of said fourth lens group.

20. The super wide angle zoom lens as set forth in claim 14, wherein said third lens group having the negative refracting power includes a joint negative lens element consisting of positive and negative lenses joined to each other, said fourth lens group having the positive refracting power includes a joint positive lens element consisting of positive and negative lenses joined to each other on the closest-to-image side, and said third and fourth lens groups are constructed to satisfy the following conditions:

$(60/fw) \leq d_{4p}p \leq (185/fw)$ $|n_{3n} - n_{3p}| \leq 0.13$ $3150 \leq \nu_{3p} - \nu_{3n} \leq -20$ $0.1 \leq n_{4n} - n_{4p} \leq 0.4$ $25\nu_{4p} - \nu_{4n}$ where
- $d_{4p}$: the axial thickness of the positive lens in the joint positive lens element positioned closest to the image in said fourth lens group;
- $n_{3n}$: the refractive index to a d-line (587.6 nm) of the negative lens of the joint negative lens element in said third lens group;
- $n_{3p}$: the refractive index to the d-line (587.6 nm) of the positive lens of the joint negative lens element in said third lens group;
- $\nu_{3p}$: the Abbe number of the positive lens of the joint negative lens element in said third lens group;
- $\nu3n$: The Abbe number of the negative lens of the joint negative lens element in said third lens group;
- $n_{4n}$: the refractive index to the d-line (587.6 nm) of the negative lens of the joint positive lens element positioned closest to the image in said fourth lens group;
- $n_{4p}$: the refractive index to the d-line (587.6 nm) of the positive lens of the joint positive lens element positioned closest to the image in said fourth lens group;
- $\nu_{4p}$: the Abbe number of the positive lens of the joint positive lens element positioned closest to the image in said fourth lens group; and
- $\nu4n$: the Abbe number of the negative lens of the joint positive lens element positioned closest to the image in said fourth lens group.

21. A super wide angle zoom lens comprising:
- a front group having a first lens group including, in the order from the object side, a first negative lens element, a second negative lens element and a third positive lens element, said first lens group exhibiting a negative refracting power and having at least one aspherical surface; and
- a rear group including at least a second lens group sequentially disposed toward an image of said first lens group and exhibiting a positive refracting power, a third lens group exhibiting a negative refracting power and a fourth lens group exhibiting a positive refracting power;
- wherein said first lens group is constructed to satisfy the following condition:

$(300/fw) \leq |f_1| \leq (680/fw)$ where $f_1$ is the focal distance of said first lens group, and fw is the focal distance of the whole system at the wide angle end; and wherein when focusing on object points from infinity to shortest distance is performed, at least one lens group in said second, third and fourth lens groups in said rear group moves along the optical axis, and when variable power operation from the wide angle end side to the telephoto end side is performed, at least two lens groups move along the optical axis so that air space between said first lens group and said second lens group reduces, air space between said second lens group and said third lens group increases and air space between said third lens group and said fourth lens group reduces.

22. The super wide angle zoom lens as set forth in claim 21, wherein said front group is constructed to satisfy the following condition:

$0.12 \leq d_{23}/fw \leq 2.0$ where $d_{23}$ is the axial air space between a surface, closest to the image, of said second lens element and a surface, closest to the object, of said third lens element.

23. The super wide angle zoom lens as set forth in claim 21, wherein said first lens group is constructed to satisfy the following condition:

$0.25 \leq d_{23}/fw \leq 1.4$ where $d_{23}$ is the axial air space between the closest-to-image surface of said second lens element and the closest-to-object surface of said third lens element, and fw is the focal distance of the entire system at the wide angle end.

24. The super wide angle zoom lens as set forth in claim 21, wherein said aspherical surface is configured to satisfy the following condition for compensating mainly a negative distortion:

$0.01 \leq |AS - S|/fw \leq 0.5$ where
- AS-S: the difference in the optical-axis direction between said aspherical surface in an effective diameter outermost periphery and a reference spherical surface having a predetermined vertex curvature radius.

25. The super wide angle zoom lens as set forth in claim 21, wherein said aspherical surface is configured to satisfy the following condition for compensating mainly a negative distortion:

$0.095 \leq |AS - S|/fw\ 0.5$ where
- AS-S: the difference in the optical-axis direction between said aspherical surface in an effective diameter outermost periphery and a reference spherical surface having a predetermined vertex curvature radius.

26. The super wide angle zoom lens as set forth in claim 21, wherein said third lens group is constructed to satisfy the following condition:

$$(300/fw) \leq |f_1| \leq (680/fw)$$

$$1.1 \leq |f_3|/fw \leq 3.5, f_3 < 0$$

where $f_3$: the focal distance of said third lens group.

27. The super wide angle zoom lens as set forth in claim 21, wherein said third lens group is constructed to satisfy the following condition:

$$1.5 \leq |f_3|/fw \leq 3.2, f_3 < 0$$

where $f_3$: the focal distance of said third lens group.

28. The super wide angle zoom lens as set forth in claim 21, wherein said second lens group and said fourth lens group are constructed to satisfy the following conditions:

$$1 \leq f_2/fw \leq 5$$

$$1.4 \leq f_4/fw \leq 4$$

where $f_2$: the focal distance of said second lens group; and
$f_4$: the focal distance of said fourth lens group.

29. The super wide angle zoom lens as set forth in claim 21, wherein said second lens group and said fourth lens group are constructed to satisfy the following conditions:

$$1.45 \leq f_2/fw \leq 3$$

$$1.7 \leq f_4/fw \leq 3.0$$

where $f_2$: the focal distance of said second lens group; and
$f_4$: the focal distance of said fourth lens group.

30. The super wide angle zoom lens as set forth in claim 21, wherein said second negative lens element and said third positive lens element in said first lens group having the negative refracting power are disposed to satisfy the following condition:

$$0.16 \leq d_{23}/L \leq 0.6$$

where $d_{23}$: the axial air space between the closest-to-image surface of said second lens element in said first lens group and the closest-to-object surface of said third lens element; and L: the axial thickness (distance between a lens vertex of the close-to-object surface of the closest-to-object lens in said first lens group and a lens vertex of the close-to-image surface of the closest-to-image lens in said first lens group) of said first lens group.

31. The super wide angle zoom lens as set forth in claim 21, wherein a lens group moved for focusing in said rear group is constructed to satisfy the following condition:

$$\beta w \leq -1.1 \text{ or } \beta w \approx -0.9$$

where $\beta w$ is the image forming magnification at the wide angle end.

32. The super wide angle zoom lens as set forth in claim 21, wherein said third lens group having the negative refracting power in said rear group is moved for focusing and is constructed to move towards the image along the optical axis on the occasion of focusing from the infinity object point to the shortest distance object point, said third lens group being constructed to satisfy the following condition:

$$\beta w \leq -1.1 \text{ or } \beta w \approx -0.9$$

where $\beta w$ is the image forming magnification of said third lens group at the wide angle end.

33. The super wide angle zoom lens as set forth in claim 21, wherein said third lens group and said fourth lens group in said rear group are moved for focusing and are constructed to move toward the object along the optical axis on the occasion of focusing from the infinity object point to the shortest distance object point, said third and fourth lens groups being also constructed to satisfy the following condition:

$$\beta w \leq -1.1 \text{ or } \beta w \approx -0.9$$

where $\beta w$ is the synthetic image forming magnification of said third and fourth lens groups at the wide angle end.

34. The super wide angle zoom lens as set forth in claim 21, wherein said third lens group having the negative refracting power includes a joint negative lens element consisting of positive and negative lenses joined to each other, said fourth lens group having the positive refracting power includes a joint positive lens element consisting of positive and negative lenses joined to each other on the closest-to-image side, and said third and fourth lens groups are constructed to satisfy the following conditions:

$$(60/fw) \leq d_{4p} \leq (185/fw)$$

$$|n_{3n} - n_{3p}| \leq 0.13$$

$$-50 \leq \nu_{3p} - \nu_{3n} \leq -20$$

$$0.1 \leq n_{4n} - n_{4p} \leq 0.4$$

$$25 \leq \nu_{4p} - \nu_{4n}$$

where $d_{4p}$: the axial thickness of the positive lens in the joint positive lens element positioned closest to the image in said fourth lens group;

$n_{3n}$: the refractive index to a d-line (587.6 nm) of the negative lens of the joint negative lens element in said third lens group;

$n_{3p}$: the refractive index to the d-line (587.6 nm) of the positive lens of the joint negative lens element in said third lens group;

$\nu_{3p}$: the Abbe number of the positive lens of the joint negative lens element in said third lens group;

$\nu_{3n}$: the Abbe number of the negative lens of the joint negative lens-element in said third lens group;

$n_{4n}$: the refractive index to the d-line (587.6 nm) of the negative lens of the joint positive lens element positioned closest to the image in said fourth lens group;

$n_{4p}$: the refractive index to the d-line (587.6 nm) of the positive lens of the joint positive lens element positioned closest to the image in said fourth lens group;

$\nu_{4p}$: the Abbe number of the positive lens of the joint positive lens element positioned closest to the image in said fourth lens group; and $\nu_{4n}$: the Abbe number of the negative lens of the joint positive lens element positioned closest to the image in said fourth lens group.

35. The super wide angle zoom lens as set forth in claim 21, wherein said third lens group exhibiting the negative refracting power includes a joint negative lens element consisting of positive and negative lenses joined to each other, and said fourth lens group exhibiting the positive refracting power includes a joint positive lens element consisting of positive and negative lenses joined to each other on the closest-to-image-side.

36. The super wide angle zoom lens as set forth in claim 35, wherein said zoom lens is constructed based on the data of the following table:

| f = 15.5~27.3, 2ω = 111.2°~76.4°, $F_{NO}$ = 4.1 | | | |
|---|---|---|---|
| r | d | ν | n |
| 1 | 69.600 | 2.50 | 45.4 | 1.79668 |
| 2 | 20.275 | 15.50 | | |
| 3 | −80.398 | 2.00 | 45.4 | 1.79668 |
| 4 | 37.112 | 6.00 | | |
| 5 | 46.526 | 5.30 | 35.2 | 1.74950 |
| 6 | −815.420 | ($d_6$) | | |
| 7 | 26.848 | 1.60 | 33.9 | 1.80384 |
| 8 | 14.972 | 4.50 | 65.8 | 1.46450 |
| 9 | 97.280 | 0.20 | | |
| 10 | 38.990 | 3.00 | 41.4 | 1.57501 |
| 11 | −50.400 | ($d_{11}$) | | |
| 12 | −36.378 | 2.30 | 28.3 | 1.72825 |
| 13 | −13.883 | 1.50 | 55.6 | 1.69680 |
| 14 | 128.521 | ($d_{14}$) | | |
| 15 | 24.647 | 3.00 | 54.6 | 1.51454 |
| 16 | 73.993 | 0.50 | | |
| 17 | 41.947 | 2.00 | 26.1 | 1.78470 |
| 18 | 24.197 | 3.20 | | |
| 19 | −103.008 | 3.00 | 67.9 | 1.59319 |
| 20 | −28.765 | 0.10 | | |
| 21 | 217.566 | 8.00 | 65.4 | 1.60300 |
| 22 | −15.505 | 2.00 | 23.0 | 1.86074 |
| 23 | −30.196 | (Bf) | | |
| f | 15.450 | 24.000 | 27.300 | |
| D0 | ∞ | ∞ | ∞ | |
| d6 | 21.412 | 3.704 | 0.398 | |
| d11 | 6.575 | 11.685 | 13.610 | |
| d14 | 7.671 | 2.561 | 0.636 | |
| Bf | 38.211 | 47.501 | 51.002 | |
| β | −0.033 | −0.033 | −0.033 | |
| D0 | 446.493 | 701.446 | 792.896 | |
| d6 | 21.412 | 3.704 | 0.398 | |
| d11 | 6.575 | 10.640 | 12.031 | |
| d14 | 7.117 | 2.445 | 1.000 | |
| Bf | 38.765 | 48.662 | 52.217 | |

Aspherical Surface (First Surface)

Reference Paraxial Curvature Radius: r = 69.600
Conical Coefficient: k = 1
Aspherical Surface Coefficient
$C_2 = 0.0$, $C_4 = 0.79789E^{-05}$, $C_6 = -0.39445E^{-08}$,
$C_8 = 0.24046E^{-11}$, $C_{10} = 0.31560E^{-14}$ Conditional Formula Corresponding Values $d_{23}/fw = 0.388$, $|f_1| = 24.942$
$|AS-S|/fw = 0.25367$ ($\phi = 55.66$)
$\beta w = -0.6702$, $f_2/fw = 2.330$
$|f_3|/fw = 2.773$, $f_4/fw = 2.307$
$d_{23}/L = 0.192$ $d_{4p} = 8.0$
$|n_{3n}-n_{3p}| = 0.03145$ $\nu_{3p}-\nu_{3n} = -27.3$
$n_{4n}-n_{4p} = 0.2577$, $\nu_{4p}-\nu_{4n} = 42.4$ where the leftmost numeral in the Table indicates the order from the object, r is the curvature radius of the lens surface, d is the lens surface spacing, ν is the Abbe number, n is the refractive index in the d-line (λ=587.6 nm), f is the focal distance of the whole system, $F_{NO}$ is the F-number, 2ω is the view angle, and φ is the effective diameter of the aspherical surface lens; DO is the distance from the object to be photographed to the first surface of the lens, and β is the short distance image forming magnification;

AS-S: the difference in the optical-axis direction between said aspherical surface in an effective diameter outermost periphery and a reference spherical surface having a predetermined vertex curvature radius;

$d_{23}$: the axial air spacing between the closest-to-image surface of said second lens element in said first lens group and the closest-to-object surface of said third lens element; and L: the axial thickness (distance between a lens vertex of the close-to-object surface of the closest-to-object lens in said first lens group and a lens vertex of the close-to-image surface of the closest-to-image lens in said first lens group) of said first lens group;

$f_2$: the focal distance of said second lens group;

$f_3$: the focal distance of said third lens group;

$f_4$: the focal distance of said fourth lens group;

$d_{4p}$: the axial thickness of the positive lens in the joint positive lens element positioned closest to the image in said fourth lens group;

$n_{3n}$: the refractive index to a d-line (587.6 nm) of the negative lens of the joint negative lens element in said third lens group;

$n_{3p}$: the refractive index to the d-line (587.6 nm) of the positive lens of the joint negative lens element in said third lens group;

$\nu_{3p}$: the Abbe number of the positive lens of the joint negative lens element in said third lens group;

$\nu_{3n}$: the Abbe number of the negative lens of the joint negative lens element in said third lens group;

$n_{4n}$: the refractive index to the d-line (587.6 nm) of the negative lens of the joint positive lens element positioned closest to the image in said fourth lens group;

$n_{4p}$: the refractive index to the d-line (587.6 nm) of the positive lens of the joint positive lens element positioned closest to the image in said fourth lens group;

$\nu_{4p}$: the Abbe number of the positive lens of the joint positive lens element positioned closest to the image in said fourth lens group;

$\nu_{4n}$: the Abbe number of the negative lens of the joint positive lens element positioned closest to the image in said fourth lens group;

βw: the image forming magnification at the wide angle end, and further, the aspherical surface shown by values of the items is expressed such as:

$$X(h) = (h^2/r)/[1+(1-Kh^2/r^2)^{\frac{1}{2}}] + C2\,h^2 + C4\,h^4 + C6\,h^6 + C8\,h^8 + C10\,h^{10}$$

where X(h) is the distance along the optical-axis direction from the nodal plane of the vertex of each aspherical surface at a height y in the vertical direction from the optical axis, r is the reference paraxial curvature radius, k is the conical coefficient, Cn is the n-order aspherical surface coefficient, and $E^{-n}$ at the left end in the n-order aspherical surface coefficient Cn indicates $10^{-n}$.

37. The super wide angle zoom lens as set forth in claim 35, wherein said zoom lens is constructed based on the data of the following table:

| \multicolumn{5}{c}{$f = 16.4 \sim 27.3$, $2\omega = 108.2° \sim 76.4°$, $F_{NO} = 4.1$} |
|---|---|---|---|---|
| | r | d | ν | n |
| 1 | 56.830 | 2.50 | 45.4 | 1.79668 |
| 2 | 22.588 | 13.00 | | |
| 3 | 203.239 | 2.00 | 43.4 | 1.84042 |
| 4 | 29.159 | 14.20 | | |
| 5 | 29.712 | 3.50 | 25.5 | 1.80458 |
| 6 | 37.859 | (d₆) | | |
| 7 | 35.294 | 1.30 | 33.9 | 1.80384 |
| 8 | 16.316 | 4.00 | 70.4 | 1.48749 |
| 9 | 160.741 | 0.20 | | |
| 10 | 35.749 | 3.00 | 38.0 | 1.60342 |
| 11 | −53.604 | (d₁₁) | | |
| 12 | −30.014 | 2.50 | 27.8 | 1.69911 |
| 13 | −12.979 | 1.50 | 60.0 | 1.64000 |
| 14 | 141.313 | (d₁₄) | | |
| 15 | 29.674 | 3.50 | 58.9 | 1.51823 |
| 16 | −229.981 | 0.10 | | |
| 17 | 92.266 | 2.00 | 28.6 | 1.79504 |
| 18 | 28.825 | 2.50 | | |
| 19 | −150.071 | 3.00 | 65.4 | 1.60300 |
| 20 | −34.756 | 0.10 | | |
| 21 | 205.091 | 8.00 | 57.5 | 1.67025 |
| 22 | −15.837 | 1.80 | 23.0 | 1.86074 |
| 23 | −34.904 | (Bf) | | |

| f | 16.400 | 24.000 | 27.300 |
|---|---|---|---|
| D0 | ∞ | ∞ | ∞ |
| d6 | 18.553 | 4.145 | 0.916 |
| d11 | 8.282 | 13.087 | 15.115 |
| d14 | 7.722 | 2.917 | 0.888 |
| Bf | 39.789 | 47.798 | 51.178 |
| β | −0.033 | −0.033 | −0.033 |
| D0 | 474.300 | 695.693 | 786.445 |
| d6 | 18.553 | 4.145 | 0.916 |
| d11 | 8.276 | 11.785 | 13.299 |
| d14 | 7.127 | 3.035 | 1.493 |
| Bf | 40.389 | 48.979 | 52.388 |

Aspherical Surface (First Surface)

Reference Paraxial Curvature Radius: r = 56.830
Conical Coefficient: k = 1
Aspherical Surface Coefficient
$C_2 = 0.0$, $C_4 = 0.41777E^{-05}$, $C_6 = 0.36563E^{-09}$,
$C_8 = -0.98160E^{-12}$, $C_{10} = 0.21972E^{-14}$ Conditional Formula Corresponding Values $d_{23}/fw = 0.8659$, $|f_1| = 24.941$
$|AS-S|/fw = 0.1800$ ($\phi = 55.73$)
$\beta w = -0.6557$, $f_2/fw = 2.195$
$|f_3|/fw = 2.612$, $f_4/fw = 2.174$
$d_{23}/L = 0.4034$, $d_{4p} = 8.0$
$|n_{3n}-n_{3p}| = 0.05911$, $\nu_{3p}-\nu_{3n} = -32.2$
$n_{4n}-n_{4p} = 0.19049$, $\nu_{4p}-\nu_{4n} = 34.5$ where the leftmost numeral in the Table indicates the order from the object, r is the curvature radius of the lens surface, d is the lens surface spacing, ν is the Abbe number, n is the refractive index in the d-line (λ=587.6 nm), f is the focal distance of the whole system, $F_{NO}$ is the F-number, 2ω is the view angle, and φ is the effective diameter of the aspherical surface lens; DO is the distance from the object to be photographed to the first surface of the lens, and β is the short distance image forming magnification;

AS-S: the difference in the optical-axis direction between said aspherical surface in an effective diameter outermost periphery and a reference spherical surface having a predetermined vertex curvature radius;

$d_{23}$: the axial air space between the closest-to-image surface of said second lens element in said first lens group and the closest-to-object surface of said third lens element; and L: the axial thickness (distance between a lens vertex of the close-to-object surface of the closest-to-object lens in said first lens group and a lens vertex of the close-to-image surface of the closest-to-image lens in said first lens group) of said first lens group;

$f_2$: the focal distance of said second lens group;

$f_3$: the focal distance of said third lens group;

$f_4$: the focal distance of said fourth lens group;

$d_{4p}$: the axial thickness of the positive lens in the joint positive lens element positioned closest to the image in said fourth lens group;

$n_{3n}$: the refractive index to a d-line (587.6 nm) of the negative lens of the joint negative lens element in said third lens group;

$n_{3p}$: the refractive index to the d-line (587.6 nm) of the positive lens of the joint negative lens element in said third lens group;

$\nu_{3p}$: the Abbe number of the positive lens of the joint negative lens element in said third lens group;

$\nu_{3n}$: the Abbe number of the negative lens of the joint negative lens element in said third lens group;

$n_{4n}$: the refractive index to the d-line (587.6 nm) of the negative lens of the joint positive lens element positioned closest to the image in said fourth lens group;

$n_{4p}$: the refractive index to the d-line (587.6 nm) of the positive lens of the joint positive lens element positioned closest to the image in said fourth lens group;

$\nu_{4p}$: the Abbe number of the positive lens of the joint positive lens element positioned closest to the image in said fourth lens group;

$\nu_{4n}$: the Abbe number of the negative lens of the joint positive lens element positioned closest to the image in said fourth lens group;

βw: the image forming magnification at the wide angle end, and further, the aspherical surface shown by values of the items is expressed such as:

$$X(h) = (h^2/r)/[1+(1-Kh^2/r^2)^{\frac{1}{2}}] + C2\ h^2 + C4\ h^4 + C6\ h^6 + C8\ h^8 + C10\ h^{10}$$

where X(h) is the distance along the optical-axis direction from the nodal plane of the vertex of each aspherical surface at a height y in the vertical direction from the optical axis, r is the reference paraxial curvature radius, k is the conical coefficient, Cn is the n-order aspherical surface coefficient, and $E^{-n}$ at the left end in the n-order aspherical surface coefficient Cn indicates $10^{-n}$.

38. The super wide angle zoom lens as set forth in claim 35, wherein said zoom lens is constructed based on the data of the following table:

| \multicolumn{5}{c}{$f = 18.4 \sim 27.3$, $2\omega = 101.2° \sim 76.4°$, $F_{NO} = 4.1$} |
|---|---|---|---|---|
| | r | d | ν | n |
| 1 | 49.794 | 2.50 | 40.9 | 1.79631 |
| 2 | 17.702 | 12.00 | | |
| 3 | −83.638 | 2.00 | 45.4 | 1.79668 |
| 4 | 47.407 | 10.70 | | |
| 5 | 50.613 | 3.00 | 27.8 | 1.69911 |
| 6 | 511.053 | (d₆) | | |
| 7 | 28.622 | 1.50 | 35.7 | 1.90265 |
| 8 | 17.512 | 5.00 | 65.8 | 1.46450 |

-continued

| | | | | |
|---|---|---|---|---|
| 9 | −37.213 | 0.10 | | |
| 10 | 28.185 | 2.00 | 54.6 | 1.51454 |
| 11 | 54.221 | (d$_{11}$) | | |
| 12 | −50.475 | 2.00 | 25.5 | 1.73038 |
| 13 | −17.366 | 1.50 | 52.3 | 1.74810 |
| 14 | 90.015 | (d$_{14}$) | | |
| 15 | 21.344 | 3.00 | 60.3 | 1.51835 |
| 16 | 47.510 | 1.00 | | |
| 17 | 25.698 | 2.00 | 25.5 | 1.80458 |
| 18 | 19.106 | 3.20 | | |
| 19 | −108.848 | 3.50 | 54.6 | 1.51454 |
| 20 | −24.560 | 0.10 | | |
| 21 | −1489.718 | 6.50 | 60.6 | 1.60311 |
| 22 | −13.865 | 1.50 | 25.5 | 1.80458 |
| 23 | −34.842 | (Bf) | | |

| f | 18.400 | 24.000 | 27.300 |
|---|---|---|---|
| D0 | ∞ | ∞ | ∞ |
| d6 | 17.323 | 6.811 | 2.987 |
| d11 | 4.870 | 7.898 | 9.649 |
| d14 | 8.112 | 5.084 | 3.333 |
| Bf | 42.968 | 48.575 | 51.818 |
| β | −0.033 | −0.033 | −0.033 |
| D0 | 538.530 | 700.241 | 786.818 |
| d6 | 17.323 | 6.811 | 2.987 |
| d11 | 4.869 | 6.528 | 7.240 |
| d14 | 7.414 | 4.932 | 3.889 |
| Bf | 43.668 | 50.098 | 53.671 |

Aspherical Surface (First Surface)

Reference Paraxial Curvature Radius: r = 49.794
Conical Coefficient: k = 1
Aspherical Surface Coefficient
$C_2 = 0.0$, $C_4 = 0.89224E^{-05}$, $C_6 = -0.57558E^{-08}$,
$C_8 = 0.82136E^{-11}$, $C_{10} = 0.33662E^{-14}$ Conditional Formula Corresponding Values $d_{23}/fw = 0.5816$, $|f_1| = 26.262$
$|AS-S|/fw = 0.10589$, ($\phi = 43.33$)
$\beta w = -0.7518$, $f_2/fw = 1.9565$
$|f_3|/fw = 2.2581$, $f_4/fw = 2.0842$
$d_{23}/L = 0.3543$, $d_{4p} = 6.5$
$|n_{3n}-n_{3p}| = 0.017721$, $\nu_{3p}-\nu_{3n} = -26.8$
$n_{4n}-n_{4p} = 0.20147$, $\nu_{4p}-\nu_{4n} = 35.1$ where the leftmost numeral in the Table indicates the order from the object, r is the curvature radius of the lens surface, d is the lens surface spacing, $\nu$ is the Abbe number, n is the refractive index in the d-line ($\lambda = 587.6$ nm), f is the focal distance of the whole system, $F_{NO}$ is the F-number, $2\omega$ is the view angle, and $\phi$ is the effective diameter of the aspherical surface lens; DO is the distance from the object to be photographed to the first surface of the lens, and $\beta$ is the short distance image forming magnification;

AS-S: the difference in the optical-axis direction between said aspherical surface in an effective diameter outermost periphery and a reference spherical surface having a predetermined vertex curvature radius;

$d_{23}$: the axial air space between the closest-to-image surface of said second lens element in said first lens group and the closest-to-object surface of said third lens element; and L: the axial thickness (distance between a lens vertex of the close-to-object surface of the closest-to-object lens in said first lens group and a lens vertex of the close-to-image surface of the closest-to-image lens in said first lens group) of said first lens group;

$f_2$: the focal distance of said second lens group;
$f_3$: the focal distance of said third lens group;
$f_4$: the focal distance of said fourth lens group;

$d_{4p}$: the axial thickness of the positive lens in the joint positive lens element positioned closest to the image in said fourth lens group;

$n_{3n}$: the refractive index to a d-line (587.6 nm) of the negative lens of the joint negative lens element in said third lens group;

$n_{3p}$: the refractive index to the d-line (587.6 nm) of the positive lens of the joint negative lens element in said third lens group;

$\nu_{3p}$: the Abbe number of the positive lens of the joint negative lens element in said third lens group;

$\nu_{3n}$: the Abbe number of the negative lens of the joint negative lens element in said third lens group;

$n_{4n}$: the refractive index to the d-line (587.6 nm) of the negative lens of the joint positive lens element positioned closest to the image in said fourth lens group;

$n_{4p}$: the refractive index to the d-line (587.6 nm) of the positive lens of the joint positive lens element positioned closest to the image in said fourth lens group;

$\nu_{4p}$: the Abbe number of the positive lens of the joint positive lens element positioned closest to the image in said fourth lens group;

$\nu_{4n}$: the Abbe number of the negative lens of the joint positive lens element positioned closest to the image in said fourth lens group, $\beta w$: the image forming magnification at the wide angle end, and further, the aspherical surface shown by values of the items is expressed such as:

$$X(h) = (h^2/r)/[1+(1-Kh^2/r^2)^{\frac{1}{2}}] + C2\ h^2 + C4\ h^4 + C6\ h^6 + C8\ h^8 + C10\ h^{10}$$

where X(h) is the distance along the optical-axis direction from the nodal plane of the vertex of each aspherical surface at a height y in the vertical direction from the optical axis, r is the reference paraxial curvature radius, k is the conical coefficient, Cn is the n-order aspherical surface coefficient, and $E^{-n}$ at the left end in the n-order aspherical surface coefficient Cn indicates $10^{-n}$.

39. The super wide angle zoom lens as set forth in claim 35, wherein said zoom lens is constructed based on the data of the following table:

| f = 18.4~27.3, 2ω = 101.5°~76.4°, $F_{NO}$ = 4.7~4.60 | | | |
|---|---|---|---|
| r | d | ν | n |
| 1 | 90.937 | 2.50 | 45.4 | 1.79668 |
| 2 | 31.382 | 13.00 | | |
| 3 | −278.297 | 1.50 | 43.4 | 1.84042 |
| 4 | 27.974 | 4.00 | 49.5 | 1.77279 |
| 5 | 30.032 | 8.01 | | |
| 6 | 43.281 | 4.70 | 25.5 | 1.80458 |
| 7 | 215.269 | (d$_7$) | | |
| 8 | 22.602 | 1.50 | 2.76 | 1.75520 |
| 9 | 12.892 | 5.00 | 65.8 | 1.46450 |
| 10 | −42.867 | 0.10 | | |
| 11 | 27.354 | 2.00 | 70.0 | 1.51860 |
| 12 | 41.149 | (d$_{12}$) | | |
| 13 | −55.604 | 1.50 | 55.6 | 1.69680 |
| 14 | 16.631 | 2.00 | 25.5 | 1.73038 |
| 15 | 66.434 | (d$_{15}$) | | |
| 16 | 17.545 | 3.00 | 25.5 | 1.73038 |
| 17 | 17.053 | 3.00 | | |
| 18 | −27.216 | 3.00 | 58.5 | 1.65160 |
| 19 | −19.139 | 0.10 | | |
| 20 | 97.697 | 9.00 | 65.4 | 1.60300 |
| 21 | −11.988 | 1.50 | 25.5 | 1.73038 |
| 22 | −33.438 | (Bf) | | |

| f | 18.399 | 24.000 | 27.300 |
|---|---|---|---|

| -continued | | | |
|---|---|---|---|
| D0 | ∞ | ∞ | ∞ |
| d7 | 20.808 | 7.653 | 2.694 |
| d12 | 3.914 | 6.449 | 7.934 |
| d15 | 5.867 | 3.333 | 1.847 |
| Bf | 35.003 | 39.227 | 41.703 |
| β | −0.033 | −0.033 | −0.033 |
| D0 | 533.258 | 693.544 | 780.668 |
| d7 | 20.808 | 7.653 | 2.694 |
| d12 | 3.908 | 4.835 | 5.121 |
| d15 | 5.246 | 3.479 | 2.785 |
| Bf | 35.630 | 40.693 | 43.578 |

Aspherical Surface (First Surface)

Reference Paraxial Curvature Radius: r = 90.937
Conical Coefficient: k = 1
Aspherical Surface Coefficient
$C_2 = 0.0$, $C_4 = 0.41120E^{-05}$, $C_6 = -0.10463E^{-08}$,
$C_8 = 0.26766E^{-12}$, $C_{10} = 0.94821E^{-15}$ Conditional Formula Corresponding Values $d_{23}/fw = 0.4352$, $|f_1| = 33.000$
$|AS-S|/fw = 0.12817$ ($\phi = 55.75$)
$\beta w = -0.7116$, $f_2/fw = 1.9293$
$|f_3|/fw = 2.5000$, $f_4/fw = 1.9567$
$d_{23}/L = 0.2376$, $d_{4p} = 9.0$
$|n_{3n}-n_{3p}| = 0.033578$, $\nu_{3p}-\nu_{3n} = -30.1$
$n_{4n}-n_{4p} = 0.12738$, $\nu_{4p}-\nu_{4n} = 39.9$ where the leftmost numeral in the Table indicates the order from the object, r is the curvature radius of the lens surface, d is the lens surface spacing, ν is the Abbe number, n is the refractive index in the d-line (λ=587.6 nm), f is the focal distance of the whole system, $F_{NO}$ is the F-number, 2ω is the view angle, and φ is the effective diameter of the aspherical surface lens; DO is the distance from the object to be photographed to the first surface of the lens, and β is the short distance image forming magnification;

AS-S: the difference in the optical-axis direction between said aspherical surface in an effective diameter outermost periphery and a reference spherical surface having a predetermined vertex curvature radius;

$d_{23}$: the axial air space between the closest-to-image surface of said second lens element in said first lens group and the closest-to-object surface of said third lens element; and L: the axial thickness (distance between a lens vertex of the close-to-object surface of the closest-to-object lens in said first lens group and a lens vertex of the close-to-image surface of the closest-to-image lens in said first lens group) of said first lens group;

$f_2$: the focal distance of said second lens group;
$f_3$: the focal distance of said third lens group;
$f_4$: the focal distance of said fourth lens group;
$d_{4p}$: the axial thickness of the positive lens in the joint positive lens element positioned closest to the image in said fourth lens group;
$n_{3n}$: the refractive index to a d-line (587.6 nm) of the negative lens of the joint negative lens element in said third lens group;
$n_{3p}$: the refractive index to the d-line (587.6 nm) of the positive lens of the joint negative lens element in said third lens group;
$\nu_{3p}$: the Abbe number of the positive lens of the joint negative lens element in said third lens group;
$\nu_{3n}$: the Abbe number of the negative lens of the joint negative lens element in said third lens group;
n4n: the refractive index to the d-line (587.6 nm) of the negative lens of the joint positive lens element positioned closest to the image in said fourth lens group;
$n_{4p}$: the refractive index to the d-line (587.6 nm) of the positive lens of the joint positive lens element positioned closest to the image in said fourth lens group;
$\nu_{4p}$: the Abbe number of the positive lens of the joint positive lens element positioned closest to the image in said fourth lens group;
$\nu_{4n}$: the Abbe number of the negative lens of the joint positive lens element positioned closest to the image in said fourth lens group;
βw: the image forming magnification at the wide angle end, and further, the aspherical surface shown by values of the items is expressed such as:

$$X(h) = (h^2/r)/[1+(1-Kh^2/r^2)^{\frac{1}{2}}] + C2\ h^2 + C4\ h^4 + C6\ h^6 + C8\ h^8 + C10\ h^{10}$$

where X(h) is the distance along the optical-axis direction from the nodal plane of the vertex of each aspherical surface at a height y in the vertical direction from the optical axis, r is the reference paraxial curvature radius, k is the conical coefficient, Cn is the n-order aspherical surface coefficient, and $E^{-n}$ at the left end in the n-order aspherical surface coefficient Cn indicates $10^{-n}$.

40. The super wide angle zoom lens as set forth in claim 35, wherein said zoom lens is constructed based on the data of the following table:

| f = 18.4~27.3, 2ω = 101.3°~76.4°, $F_{NO}$ = 4.6 | | | |
|---|---|---|---|
| | r | d | ν | n |
| 1 | 48.498 | 1.80 | 39.8 | 1.86994 |
| 2 | 15.829 | 11.00 | | |
| 3 | −48.419 | 1.50 | 43.3 | 1.84042 |
| 4 | 479.543 | 13.69 | | |
| 5 | 42.228 | 4.30 | 27.8 | 1.69911 |
| 6 | −30.868 | 1.30 | 35.7 | 1.90265 |
| 7 | 218.115 | (d7) | | |
| 8 | 44.084 | 1.50 | 33.9 | 1.80384 |
| 9 | 18.238 | 4.00 | 65.7 | 1.46450 |
| 10 | −110.754 | 0.10 | | |
| 11 | 36.956 | 4.00 | 54.6 | 1.51454 |
| 12 | −48.126 | (d12) | | |
| 13 | −36.432 | 3.00 | 26.1 | 1.78470 |
| 14 | −16.787 | 1.50 | 52.3 | 1.74810 |
| 15 | 164.469 | (d15) | | |
| 16 | 21.601 | 2.50 | 60.2 | 1.51835 |
| 17 | 37.689 | 1.00 | | |
| 18 | 23.788 | 2.00 | 25.5 | 1.80458 |
| 19 | 19.149 | 3.70 | | |
| 20 | −285.297 | 4.00 | 54.6 | 1.51454 |
| 21 | −23.565 | 0.20 | | |
| 22 | 115.249 | 7.00 | 82.5 | 1.49782 |
| 23 | −16.557 | 1.50 | 25.5 | 1.80458 |
| 24 | −43.420 | (Bf) | | |
| f | 18.400 | 24.000 | 27.300 |
| D0 | ∞ | ∞ | ∞ |
| d7 | 9.147 | 2.641 | 0.502 |
| d12 | 6.616 | 10.597 | 12.842 |
| d15 | 8.058 | 4.076 | 1.832 |
| Bf | 50.193 | 57.567 | 61.723 |
| β | −0.033 | −0.033 | −0.033 |
| D0 | 546.246 | 705.614 | 792.210 |
| d7 | 9.147 | 2.641 | 0.502 |
| d12 | 6.607 | 9.414 | 11.227 |
| d15 | 7.135 | 3.944 | 2.370 |
| Bf | 51.125 | 58.882 | 62.799 |

Aspherical Surface (First Surface)

Reference Paraxial Curvature Radius: r = 48.498
Conical Coefficient: k = 1
Aspherical Surface Coefficient -continued $C_2 = 0.0$, $C_4 = 0.15694E^{-04}$, $C_6 = -0.11607E^{-07}$,
$C_8 = 0.18735E^{-10}$, $C_{10} = 0.28146E^{-13}$ Conditional Formula Corresponding Values $d_{23}/fw = 0.7440$, $|f_1| = 20.000$
$|AS\text{-}S|/fw = 0.10283$ ($\phi = 37.59$)
$\beta w = -0.6355$, $f_2/fw = 1.9565$
$|f_3|/fw = 2.2581$, $f_4/fw = 2.0841$
$d_{23}/L = 0.40755$, $d_{4p} = 7.0$
$|n_{3n} - n_{3p}| = 0.036603$, $\nu_{3p} - \nu_{3n} = -26.3$
$n_{4n} - n_{4p} = 0.30676$ $\nu_{4p} - \nu_{4n} = 57.0$ where the leftmost numeral in the Table indicates the order from the object, r is the curvature radius of the lens surface, d is the lens surface spacing, $\nu$ is the Abbe number, n is the refractive index in the d-line ($\lambda = 587.6$ nm), f is the focal distance of the whole system, $F_{NO}$ is the F-number, $2\omega$ is the view angle, and $\phi$ is the effective diameter of the aspherical surface lens; DO is the distance from the object to be photographed to the first surface of the lens, and $\beta$ is the short distance image forming magnification;

AS-S: the difference in the optical-axis direction between said aspherical surface in an effective diameter outermost periphery and a reference spherical surface having a predetermined vertex curvature radius;

$d_{23}$: the axial between the closest-to-image surface of said second lens element in said first lens group and the closest-to-object surface of said third lens element; and L: the axial thickness (distance between a lens vertex of the close-to-object surface of the closest-to-object lens in said first lens group and a lens vertex of the close-to-image surface of the closest-to-image lens in said first lens group) of said first lens group;

$f_2$: the focal distance of said second lens group;
$f_3$: the focal distance of said third lens group;
$f_4$: the focal distance of said fourth lens group;
$d_{4p}$: the axial thickness of the positive lens in the joint positive lens element positioned closest to the image in said fourth lens group;

$n_{3n}$: the refractive index to a d-line (587.6 nm) of the negative lens of the joint negative-lens element in said third lens group;

$n_{3p}$: the refractive index to the d-line (587.6 nm) of the positive lens of the joint negative lens element in said third lens group;

$\nu_{3p}$: the Abbe number of the positive lens of the joint negative lens element in said third lens group;

$\nu_{3n}$: the Abbe number of the negative lens of the joint negative lens element in said third lens group;

$n_{4n}$: the refractive index to the d-line (587.6 nm) of the negative lens of the joint positive lens element positioned closest to the image in said fourth lens group;

$n_{4p}$: the refractive index to the d-line (587.6 nm) of the positive lens of the joint positive lens element positioned closest to the image in said fourth lens group;

$\nu_{4p}$: the Abbe number of the positive lens of the joint positive lens element positioned closest to the image in said fourth lens group;

$\nu_{4n}$: the Abbe number of the negative lens of the joint positive lens element positioned closest to the image in said fourth lens group;

$\beta w$: the image forming magnification at the wide angle end, and further, the aspherical surface shown by values of the items is expressed such as:

$$X(h) = (h^2/r)/[1+(1-Kh^2/r^2)^{\frac{1}{2}}] + C_2 h^2 + C_4 h^4 + C_6 h^6 + C_8 h^8 + C_{10} h^{10}$$

where X(h) is the distance along the optical-axis direction from the nodal plane of the vertex of each aspherical surface at a height y in the vertical direction from the optical axis, r is the reference paraxial curvature radius, k is the conical coefficient, Cn is the n-order aspherical surface coefficient, and $E^{-n}$ at the left end in the n-order aspherical surface coefficient Cn indicates $10^{-n}$.

41. The super wide angle zoom lens as set forth in claim 25, wherein said zoom lens is constructed based on the data of the following table:

| $f = 18.4 \sim 27.3$, $2\omega = 101.4° \sim 76.4°$, $F_{NO} = 4.1$ | | | | |
|---|---|---|---|---|
| | r | d | $\nu$ | n |
| 1 | 43.716 | 2.00 | 39.8 | 1.86994 |
| 2 | 18.989 | 14.00 | | |
| 3 | −86.359 | 1.60 | 43.4 | 1.84042 |
| 4 | 75.253 | 18.95 | | |
| 5 | 95.685 | 3.00 | 27.8 | 1.69911 |
| 6 | 735.641 | (d$_6$) | | |
| 7 | 24.693 | 1.50 | 35.7 | 1.90265 |
| 8 | 16.576 | 4.50 | 65.8 | 1.46450 |
| 9 | −68.174 | 0.10 | | |
| 10 | 34.470 | 2.75 | 54.6 | 1.51454 |
| 11 | −139.738 | (d$_{11}$) | | |
| 12 | −65.912 | 2.20 | 25.5 | 1.73038 |
| 13 | −16.570 | 1.50 | 52.3 | 1.74810 |
| 14 | 36.691 | (d$_{14}$) | | |
| 15 | 22.288 | 3.00 | 82.5 | 1.49782 |
| 16 | 81.627 | 0.30 | | |
| 17 | 33.611 | 2.00 | 25.5 | 1.80458 |
| 18 | 20.491 | 3.60 | | |
| 19 | −43.822 | 3.50 | 54.6 | 1.51454 |
| 20 | −20.698 | 0.10 | | |
| 21 | 77.825 | 7.00 | 82.5 | 1.49782 |
| 22 | −18.604 | 1.50 | 23.0 | 1.86074 |
| 23 | −38.417 | (Bf) | | |
| f | 18.400 | 24.000 | 27.300 | |
| DO | ∞ | ∞ | ∞ | |
| d7 | 18.461 | 5.351 | 0.300 | |
| d11 | 4.326 | 6.557 | 7.846 | |
| d14 | 8.551 | 6.816 | 5.813 | |
| Bf | 42.382 | 46.845 | 49.423 | |
| $\beta$ | −0.033 | −0.033 | −0.033 | |
| DO | 535.971 | 709.394 | 812.035 | |
| d6 | 18.461 | 5.351 | 0.300 | |
| d11 | 4.671 | 7.023 | 8.385 | |
| d14 | 8.206 | 6.350 | 5.274 | |
| Bf | 42.382 | 46.845 | 49.423 | |

Aspherical Surface (First Surface)

Reference Paraxial Curvature Radius: r = 43.716
Conical Coefficient: k = 1
Aspherical Surface Coefficient
$C_2 = 0.0$, $C_4 = 0.56396E^{-05}$, $C_6 = 0.31551E^{-08}$,
$C_8 = -0.69514E^{-11}$, $C_{10} = 0.14709E^{-13}$ Conditional Formula Corresponding Values $d_{23}/fw = 1.0299$, $|f_1| = 26.262$
$|AS\text{-}S|/fw = 0.11679$ ($\phi = 46.16$)
$\beta w = -6.5185$, $f_2/fw = 1.576$
$|f_3|/fw = 1.644$, $f_4/fw = 2.283$
$d_{23}/L = 0.4791$, $d_{4p} = 7.0$
$|n_{3n} - n_{3p}| = 0.017721$, $\nu_{3p} - \nu_{3n} = -26.8$
$n_{4n} - n_{4p} = 0.36292$, $\nu_{4p} - \nu_{4n} = 59.5$ where the left most numeral in the Table indicates the order from the object, r is the curvature radius of the lens surface, d is the lens surface spacing, ν is the Abbe number, n is the refractive index in the d-line (λ=587.6 nm), f is the focal distance of the whole system, $F_{NO}$ is the F-number, 2ω is the view angle, and φ is the effective diameter of the aspherical surface lens; DO is the distance from the object to be photographed to the first surface of the lens, and β is the short distance image forming magnification;

AS-S: the difference in the optical-axis direction between said aspherical surface in an effective diameter outermost periphery and a reference spherical surface having a predetermined vertex curvature radius;

$d_{23}$: the axial air space between the closest-to-image surface of said second lens element in said first lens group and the closest-to-object surface of said third lens element; and L: the axial thickness (distance between a lens vertex of the close-to-object surface of the closest-to-object lens in said first lens group and a lens vertex of the close-to-image surface of the closest-to-image lens in said first lens group) of said first lens group;

$f_1$: the focal distance of said first lens group;
$f_2$: the focal distance of said second lens group;
$f_3$: the focal distance of said third lens group;
$f_4$: the focal distance of said fourth lens group;
$d_{4p}$: the axial thickness of the positive lens in the joint positive lens element positioned closest to the image in said fourth lens group;
$n_{3n}$: the refractive index to a d-line (587.6 nm) of the negative lens of the joint negative lens element in said third lens group;
$n_{3p}$: the refractive index to the d-line (587.6 nm) of the positive lens of the joint negative lens element in said third lens group;
$\nu_{3p}$: the Abbe number of the positive lens of the joint negative lens element in said third lens group;
$\nu_{3n}$: the Abbe number of the negative lens of the joint negative lens element in said third lens group;
$n_{4n}$: the refractive index to the d-line (587.6 nm) of the negative lens of the joint positive lens element positioned closest to the image in said fourth lens group;
$n_{4p}$: the refractive index to the d-line (587.6 nm) of the positive lens of the joint positive lens element positioned closest to the image in said fourth lens group;
$\nu_{4p}$: the Abbe number of the positive lens of the joint positive lens element positioned closest to the image in said fourth lens group;
84 $_{4n}$: the Abbe number of the negative lens of the joint positive lens element positioned closest to the image in said fourth lens group;
βw: the image forming magnification at the wide angle end, and further, the aspherical surface shown by values of the items is expressed such as:

$$X(h) = (h^2/r)/[1+(1-Kh^2/r^2)^{\frac{1}{2}}] + C_2 h^2 + C_4 h^4 + C_6 h^6 + C_8 h^8 + C_{10} h^{10}$$

where X(h) is the distance along the optical-axis direction from the nodal plane of the vertex of each aspherical surface at a height y in the vertical direction from the optical axis, r is the reference paraxial curvature radius, k is the conical coefficient, Cn is the n-order aspherical surface coefficient, and $E^{-n}$ at the left end in the n-order aspherical surface coefficient Cn indicates $10^{-n}$.

42. The super wide angle zoom lens as set forth in claim 35, wherein said zoom lens is constructed based on the data of the following table:

| f = 18.4~27.3, 2ω = 101.4°~76.4°, $F_{NO}$ = 4.1 | | | |
|---|---|---|---|
| | r | d | ν | n |
| 1 | 66.171 | 2.50 | 40.9 | 1.79631 |
| 2 | 17.878 | 12.00 | | |
| 3 | −104.815 | 2.00 | 45.4 | 1.79668 |
| 4 | 47.251 | 9.44 | | |
| 5 | 48.413 | 3.00 | 27.8 | 1.69911 |
| 6 | 965.152 | ($d_6$) | | |
| 7 | 32.559 | 1.50 | 35.7 | 1.90265 |
| 8 | 17.903 | 5.00 | 82.6 | 1.49782 |
| 9 | −46.322 | 0.10 | | |
| 10 | 24.920 | 2.00 | 49.0 | 1.53172 |
| 11 | 38.591 | ($d_{11}$) | | |
| 12 | −45.932 | 2.20 | 25.5 | 1.73038 |
| 13 | −14.583 | 1.50 | 55.6 | 1.69680 |
| 14 | 111.545 | ($d_{14}$) | | |
| 15 | 21.650 | 3.00 | 54.6 | 1.51454 |
| 16 | 65.101 | 0.30 | | |
| 17 | 27.419 | 2.00 | 25.5 | 1.80458 |
| 18 | 19.163 | 3.00 | | |
| 19 | 300.132 | 3.70 | 54.6 | 1.51454 |
| 20 | −28.447 | 0.10 | | |
| 21 | −472.607 | 7.50 | 67.9 | 1.59319 |
| 22 | −14.540 | 1.50 | 25.5 | 1.80458 |
| 23 | −41.540 | (Bf) | | |

| f | 18.400 | 24.000 | 27.300 |
|---|---|---|---|
| D0 | ∞ | ∞ | ∞ |
| d6 | 17.683 | 7.495 | 3.887 |
| d11 | 4.892 | 8.343 | 10.354 |
| d14 | 9.792 | 6.341 | 4.330 |
| Bf | 44.471 | 50.862 | 54.586 |
| β | −0.033 | −0.033 | −0.033 |
| D0 | 541.063 | 699.052 | 793.913 |
| d6 | 17.683 | 7.495 | 3.887 |
| d11 | 4.885 | 7.045 | 8.805 |
| d14 | 9.060 | 6.640 | 4.911 |
| Bf | 45.210 | 51.861 | 55.554 |

Aspherical Surface (First Surface)

Reference Paraxial Curvature Radius: r = 66.171
Conical Coefficient: k = 1
Aspherical Surface Coefficient
$C_2 = 0.0$, $C_4 = 0.98928E^{-05}$, $C_6 = -0.63815E^{-08}$,
$C_8 = 0.86133E^{-11}$, $C_{10} = 0.98912E^{-16}$ Conditional Formula Corresponding Values $d_{23}/fw = 0.5132$, $|f_1| = 26.262$
$|AS-S|/fw = 0.12124$ ($\phi = 44.79$)
$\beta w = -0.5443$, $f_2/fw = 2.2826$
$|f_3|/fw = 2.7174$, $f_4/fw = 2.1091$
$d_{23}/L = 0.32626$, $d_{4p} = 7.5$
$|n_{3n}-n_{3p}| = 0.03357$, $\nu_{3p}-\nu_{3n} = -30.1$
$n_{4n}-n_{4p} = 0.211392$, $\nu_{4p}-\nu_{4n} = 42.4$ where the left most numeral in the Table indicates the order from the object, r is the curvature radius of the lens surface, d is the lens surface spacing, ν is the Abbe number, n is the refractive index in the d-line (λ=587.6 nm), f is the focal distance of the whole system, $F_{NO}$ is the F-number, 2ω is the view angle, and φ is the effective diameter of the aspherical surface lens; DO is the distance from the object to be photographed to the first surface of the lens, and β is the short distance image forming magnification;

AS-S: the difference in the optical-axis direction between said aspherical surface in an effective diameter outermost periphery and a reference spherical surface having a predetermined vertex curvature radius;

$d_{23}$: the axial air space between the closest-to-image surface of said second lens element in said first lens group and the closest-to-object surface of said third lens element; and L: the axial thickness (distance between a lens vertex of the close-to-object surface of the closest-to-object lens in said first lens group and a lens vertex of the close-to-image surface of the closest-to-image lens in said first lens group) of said first lens group;

$f_2$: the focal distance of said second lens group;

$f_3$: the focal distance of said third lens group;

$f_4$: the focal distance of said fourth lens group;

$d_{4p}$: the axial thickness of the positive lens in the joint positive lens element positioned closest to the image in said fourth lens group;

$n_{3n}$: the refractive index to a d-line (587.6 nm) of the negative lens of the joint negative lens element in said third lens group;

$n_{3p}$: the refractive index to the d-line (587.6 nm) of the positive lens of the joint negative lens element in said third lens group;

$\nu_{3p}$: the Abbe number of the positive lens of the joint negative lens element in said third lens group;

$\nu_{3n}$: the Abbe number of the negative lens of the joint negative lens element in said third lens group;

$n_{4n}$: the refractive index to the d-line (587.6 nm) of the negative lens of the joint positive lens element positioned closest to the image in said fourth lens group;

$n_{4p}$: the refractive index to the d-line (587.6 nm) of the positive lens of the joint positive lens element positioned closest to the image in said fourth lens, group;

$\nu_{4p}$: the Abbe number of the positive lens of the joint positive lens element positioned closest to the image in said fourth lens group;

$\nu_{4n}$: the Abbe number of the negative lens of the joint positive lens element positioned closest to the image in said fourth lens group;

$\beta w$: the image forming magnification at the wide angle end, and further, the aspherical surface shown by values of the items is expressed such as:

$$X(h) = (h^2/r)/[1 + (1 - Kh^2/r^2)^{\frac{1}{2}}] + C2\, h^2 + C4\, h^4 + C6\, h^6 + C8\, h^8 + C10\, h^{10}$$

where X(h) is the distance along the optical-axis direction from the nodal plane of the vertex of each aspherical surface at a height y in the vertical direction from the optical axis, r is the reference paraxial curvature radius, k is the conical coefficient, Cn is the n-order aspherical surface coefficient, and $E^{-n}$ at the left end in the n-order aspherical surface coefficient Cn indicates $10^{-n}$.

* * * * *